US009971766B2

(12) United States Patent
Pasupalak et al.

(10) Patent No.: US 9,971,766 B2
(45) Date of Patent: *May 15, 2018

(54) CONVERSATIONAL AGENT

(71) Applicant: MALUUBA INC., Waterloo (CA)

(72) Inventors: Sam Pasupalak, Waterloo (CA); Joshua R. Pantony, Long Island, NY (US); Wilson Hsu, Waterloo (CA); Zhiyuan Wu, Waterloo (CA); Phil Tregenza, Waterloo (CA); Kaheer Suleman, Cambridge (CA); James Simpson, Waterloo (CA); Andrew McNamara, Kitchener (CA); Tareq Ismail, Nepean (CA)

(73) Assignee: Maluuba Inc., Waterloo (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/436,429

(22) Filed: Feb. 17, 2017

(65) Prior Publication Data

US 2017/0228367 A1    Aug. 10, 2017

Related U.S. Application Data

(63) Continuation of application No. 14/394,824, filed as application No. PCT/CA2013/000391 on Apr. 22, 2013, now Pat. No. 9,575,963.

(Continued)

(51) Int. Cl.
*G06F 17/27* (2006.01)
*G06F 17/21* (2006.01)
(Continued)

(52) U.S. Cl.
CPC .......... *G06F 17/279* (2013.01); *G06F 17/278* (2013.01); *G06F 17/30867* (2013.01);
(Continued)

(58) Field of Classification Search
None
See application file for complete search history.

(56) References Cited

U.S. PATENT DOCUMENTS 7,302,383 B2 * 11/2007 Valles ................... G06F 17/271
704/231
7,987,188 B2 * 7/2011 Neylon ............. G06F 17/30616
706/12
(Continued)

FOREIGN PATENT DOCUMENTS

EP       1783744 A1      5/2007
WO   WO 2007064496 A1   6/2007
(Continued)

OTHER PUBLICATIONS

European Search Report dated Jan. 5, 2016 for European Patent Application No. 13777880.9, 7 pages.
(Continued)

*Primary Examiner* — Satwant Singh

(57) ABSTRACT

A method, system, and computer program product provide a conversation agent to process natural language queries expressed by a user and perform commands according to the derived intention of the user. A natural language processing (NLP) engine derives intent using conditional random fields to identify a domain and at least one task embodied in the query. The NLP may further identify one or more subdomains, and one or more entities related to the identified command. A template system creates a data structure for information relevant to the derived intent and passes a template to a services manager for interfacing with one or more services capable of accomplishing the task. A dialog manager may elicit more entities from the user if required by the services manager and otherwise engage in conversation
(Continued)

with the user. In one embodiment, the conversational agent allows a user to engage in multiple conversations simultaneously.

20 Claims, 30 Drawing Sheets

Related U.S. Application Data

(60) Provisional application No. 61/636,444, filed on Apr. 20, 2012.

(51) Int. Cl.
*G10L 15/00* (2013.01)
*G10L 15/26* (2006.01)
*G10L 15/30* (2013.01)
*G06F 17/30* (2006.01)

(52) U.S. Cl.
CPC ...... *G06F 17/30976* (2013.01); *G10L 15/265* (2013.01); *G10L 15/30* (2013.01)

(56) References Cited

U.S. PATENT DOCUMENTS

| | | | |
|---|---|---|---|
| 8,010,539 B2* | 8/2011 | Blair-Goldensohn | G06F 17/30719 704/9 |
| 8,892,446 B2* | 11/2014 | Cheyer | G06F 17/3087 704/246 |
| 8,903,716 B2* | 12/2014 | Chen | G06F 17/3087 704/10 |
| 8,930,191 B2* | 1/2015 | Gruber | G06F 17/3087 704/246 |
| 8,942,986 B2* | 1/2015 | Cheyer | G06F 17/3087 704/231 |
| 9,171,541 B2* | 10/2015 | Kennewick | G10L 15/18 |
| 9,292,254 B2 | 3/2016 | Simpson | |
| 9,300,784 B2 | 3/2016 | Roberts | |
| 9,575,963 B2* | 2/2017 | Pasupalak | G06F 17/27 |
| 2008/0249764 A1 | 10/2008 | Huang et al. | |
| 2009/0198671 A1* | 8/2009 | Zhang | G06F 17/30672 |
| 2011/0112827 A1 | 5/2011 | Kennewick et al. | |
| 2011/0112921 A1* | 5/2011 | Kennewick | G06Q 30/0601 705/26.1 |
| 2011/0184981 A1* | 7/2011 | Lu | G06F 17/3087 707/774 |
| 2012/0030228 A1* | 2/2012 | Naidu | G06F 17/30864 707/767 |
| 2012/0254143 A1* | 10/2012 | Varma | G06F 17/30401 707/706 |
| 2013/0031113 A1* | 1/2013 | Feng | G06F 17/3087 707/755 |
| 2013/0080145 A1* | 3/2013 | Yamasaki | G06F 17/2809 704/2 |
| 2014/0012574 A1* | 1/2014 | Pasupalak | G06F 17/30554 704/235 |
| 2014/0163959 A1* | 6/2014 | Hebert | G06F 17/2785 704/9 |
| 2014/0207776 A1* | 7/2014 | Harris | G06F 17/30976 707/737 |
| 2014/0343950 A1* | 11/2014 | Simpson | G06F 3/167 704/275 |
| 2014/0365215 A1* | 12/2014 | Kim | G10L 15/22 704/235 |
| 2015/0032443 A1 | 1/2015 | Karov | |
| 2015/0039292 A1* | 2/2015 | Suleman | G06F 17/289 704/9 |
| 2015/0079554 A1* | 3/2015 | Lee | G09B 7/00 434/157 |
| 2015/0081279 A1* | 3/2015 | Suleman | G06F 17/27 704/9 |
| 2015/0081711 A1* | 3/2015 | Harris | G06F 17/3043 707/737 |
| 2015/0170641 A1* | 6/2015 | Kennewick | G06Q 30/0601 704/249 |
| 2015/0220511 A1* | 8/2015 | Yang | G06F 17/30684 704/9 |

FOREIGN PATENT DOCUMENTS

| | | |
|---|---|---|
| WO | WO 2011088053 A3 | 7/2011 |
| WO | WO 2013010262 A1 | 1/2013 |

OTHER PUBLICATIONS

Fritsch, Jan Nikolaus, "Towards Gestural Understanding for Intelligent Robots", Jan. 1, 2012, Retrieved from the Internet: URL: http://pub.uni-bielefeld.de/luur/download?func=downloadFile&recordOId=2515054&fileOId=2515059, [retrieved on Aug. 31, 2015], 232 pages.
PCT International Preliminary Report on Patentability in International Application No. PCT/CA2013/000391, dated Oct. 21, 2014, 6 pages.
PCT International Search Report in International Application No. PCT/CA2013/00039, dated Jul. 15, 2013, 3 pages.
PCT Written Opinion dated Jul. 15, 2013 for International Application No. PCT/CA2013/000391, 5 pages.
U.S. Appl. No. 14/394,824, Amendment and Response filed Mar. 11, 2016, 11 pages.
U.S. Appl. No. 14/394,824, Amendment and Response filed Sep. 19, 2016, 10 pages.
U.S. Appl. No. 14/394,824, Notice of Allowance dted Oct. 5, 2016, 9 pages.
U.S. Appl. No. 14/394,824, Office Action dated Dec. 18, 2015, 12 pages.
U.S. Appl. No. 14/394,824, Office Action dated May 18, 2016, 12 pages.

\* cited by examiner

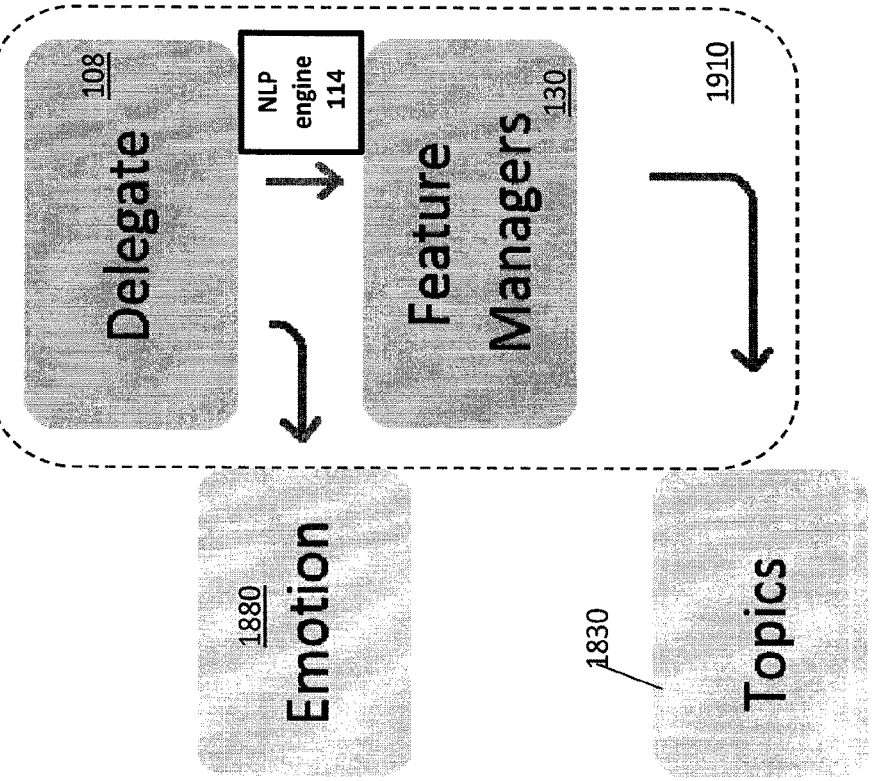
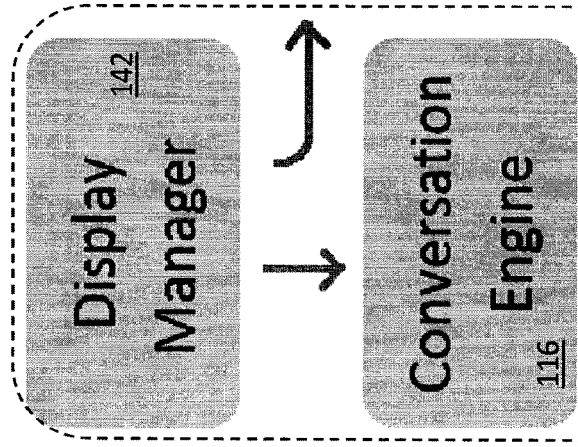
Figure 19 Multiple Threads of Conversation

Asking for Clarification

Low initiative

Low initiative

High Initiative

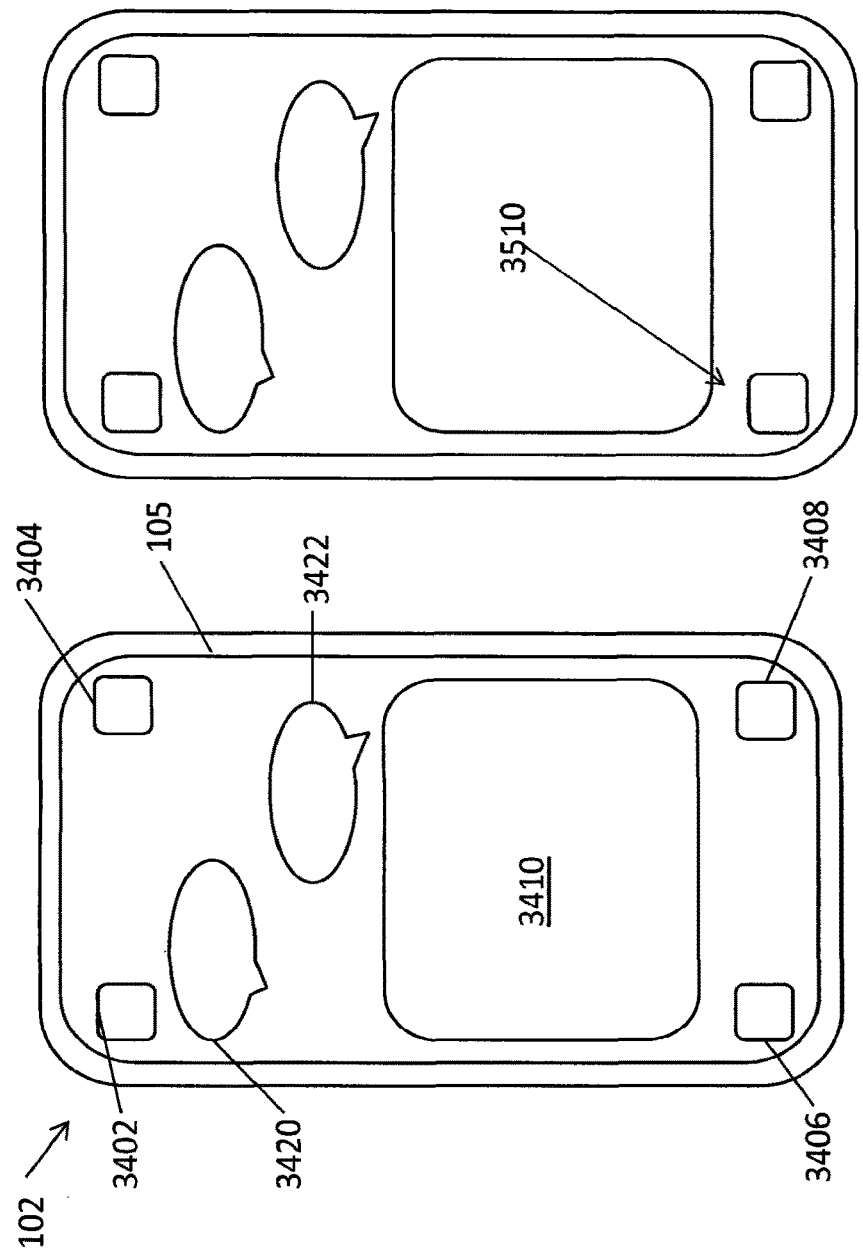

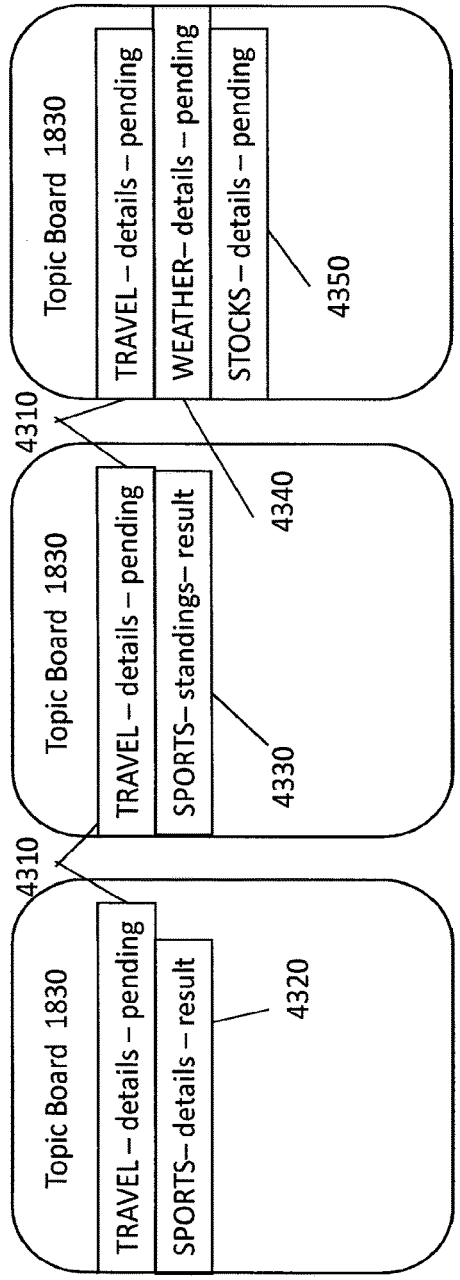
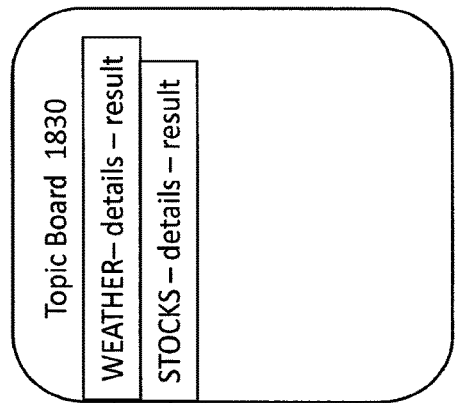
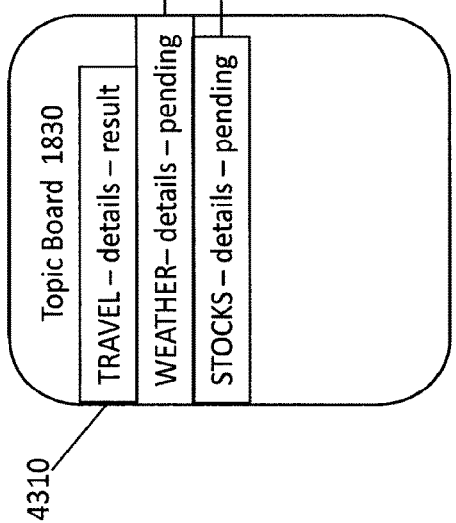
Figure 43a
Figure 43b
Figure 43c
Figure 43d
Figure 43e

CONVERSATIONAL AGENT

CROSS REFERENCE

This application is a continuation of U.S. patent application Ser. No. 14/394,824 (now U.S. Pat. No. 9,575,963), entitled "Conversational Agent," filed on Oct. 16, 2014, which application is a national stage entry of International Application No. PCT/CA2013/000391, filed Apr. 22, 2013, which application claims the benefit of (or priority to) U.S. provisional application No. 61/636,444, filed Apr. 20, 2012, the entire disclosures of which are incorporated herein by reference.

TECHNICAL FIELD

The present disclosure relates to user interfaces for a computing device, and more particularly, to a user interface that conversationally interacts with a user of a computing device such as a smartphone.

BACKGROUND

User interfaces for electronic and other devices are evolving to include speech-based inputs in a natural language such as English. A user may voice a command to control the operation of a device such as a smartphone, tablet computer, personal computer, appliance, television, robot and the like. Natural language processing, a type of machine learning using statistics, may be used to interpret and act upon speech inputs. Speech recognition may convert the input to text. The text may be analyzed for meaning to determine the command to be performed.

Processing speech inputs in a natural language may be difficult because speech commands may be ambiguous and require clarification. More than one speech input may be used or even required to complete a specific command. Thus, sequential speech inputs may be related to one specific command or to different commands.

When speaking to conventional speech recognition systems, users often feel the need to modify their natural way of speaking so that a machine may understand the user's intention. This can be cumbersome and annoying which may cause users to abandon such a system.

SUMMARY

A method, system/device, and computer program product provide a conversation agent to process natural language queries expressed by a user and perform commands according to the derived intention of the user. A natural language processing (NLP) engine derives intent using conditional random fields to identify a domain and at least one task embodied in the query. The NLP may further identify one or more subdomains, and one or more entities related to the identified command. A template system creates a data structure for information relevant to the derived intent and passes a template to a services manager for interfacing with one or more services capable of accomplishing the task. A dialogue manager may elicit more entities from the user if required by the services manager and otherwise engage in conversation with the user. In one embodiment, the conversational agent allows a user to engage in multiple conversations simultaneously. In one aspect, there is described a computing device comprising one or more processors and one or more non-transitory storage devices storing instructions that, when executed by the one or more processors, configure the computing device to provide: a natural language processing (NLP) engine for deriving a user intent from at least one user query, the NLP engine configured to identify at least one domain and at least one command associated with the user intent derived; and wherein the NLP engine includes at least one conditional random field for performing entity extraction on the at least one user query to identify at least one entity associated with the at least one command and wherein the command is for performing by a service associated with the domain. The NLP engine may select the at least one conditional random field in response to the at least one domain identified. The computing device may store at least one optimized feature set associated with the at least one domain identified and the at least one conditional random field may be configured to access the at least one feature set. The at least one user query may be received as an audio input comprising speech received from a user communication device. The computing device may provide a speech recognition engine for generating a text representation of the at least one query, the text representation comprising a digital format and said audio input comprising a sound wave. The at least one command and at least one entity may be provided to a services component for identifying at least one service capable of performing the at least one command and for instructing at least one service to perform the at least one command, the at least one service configured to return a service result to the services component in response to performing. The computing device may provide a dialogue manager for identifying at least one dialogue response to the at least one query. The computing device may provide a display manager for formatting an output comprising the at least one dialogue response. The at least one dialogue response may be at least partly based on said service result. The at least one dialogue response may include a confirmation question. The at least one dialogue response may include a clarification question. The at least one dialogue response may include an invitation to one or more services. The dialogue manager may be configured to define the at least one dialogue response in a conversational manner. The NLP engine may be configured to create a list of candidate interpretations of the user query and the dialogue manager may be configured to define the at least one dialogue response to present the list for selection. The dialogue manager may be configured to identify at least one unfilled entity relating to said at least one command and generate at least one dialogue response comprising a prompt to present to a user to obtain the at least one unfilled entity. A respective prompt may be generated for each of the at least one unfilled entity.

In one aspect, there is described a computing device comprising one or more processors and one or more non-transitory storage devices storing instructions that, when executed by the one or more processors, configure the computing device to provide: a natural language processing (NLP) engine for deriving a user intent from at least one user query, the NLP engine configured to identify at least one domain and at least one command associated with the user intent derived; and wherein the NLP engine includes at least one conditional random field for performing entity extraction on the at least one user query to identify at least one entity associated with the at least one command and wherein the command is for performing by a service associated with the domain. The NLP engine may select the at least one conditional random field in response to the at least one domain identified. The computing device may store at least one optimized feature set associated with the at least one domain identified and the at least one conditional random field may be configured to access the at least one feature set. The at least one conditional random field may comprise a base-labeled conditional random field configured to extract the at least one entity. The at least one conditional random field may comprise an expanded conditional random field configured to identify a subset of entities for selection by a user. The at least one user query may be received as an audio input comprising speech received from a user communication device. The computing device may provide a speech recognition engine for generating a text representation of the at least one query, the text representation comprising a digital format and said audio input comprising a sound wave. The at least one command and at least one entity may be provided to a services component for identifying at least one service capable of performing the at least one command and for instructing at least one service to perform the at least one command, the at least one service configured to return a service result to the services component in response to performing. The computing device may provide a dialogue manager for identifying at least one dialogue response to the at least one query. The computing device may provide a display manager for formatting an output comprising the at least one dialogue response. The at least one dialogue response may be at least partly based on said service result. The at least one dialogue response may include a confirmation question. The at least one dialogue response may include a clarification question. The at least one dialogue response may include an invitation to one or more services. The dialogue manager may be configured to define the at least one dialogue response in a conversational manner. The NLP engine may be configured to create a list of candidate interpretations of the user query and the dialogue manager may be configured to define the at least one dialogue response to present the list for selection. The dialogue manager may be configured to identify at least one unfilled entity relating to said at least one command and generate at least one dialogue response comprising a prompt to present to a user to obtain the at least one unfilled entity. A respective prompt may be generated for each of the at least one unfilled entity. Related method and computer program product aspects will also be apparent to those of ordinary skill in the art.

BRIEF DESCRIPTION OF THE DRAWINGS

FIG. 19 illustrates a block diagram of an input pipeline and an output pipeline in accordance with one embodiment;

FIGS. 34 to 38 show example user interfaces according to an example embodiment;

FIGS. 43a-43e shows operations (methods) performed using a Topic Board of a Conversational Agent according to one embodiment.

For convenience, like reference numerals and designations indicate like parts, components, modules, process steps, etc. in the various drawings.

DETAILED DESCRIPTION

Overview

Headings of sections provided in this patent application and the title of this patent application are for convenience only, and are not to be taken as limiting the disclosure in any way.

Figure 1:
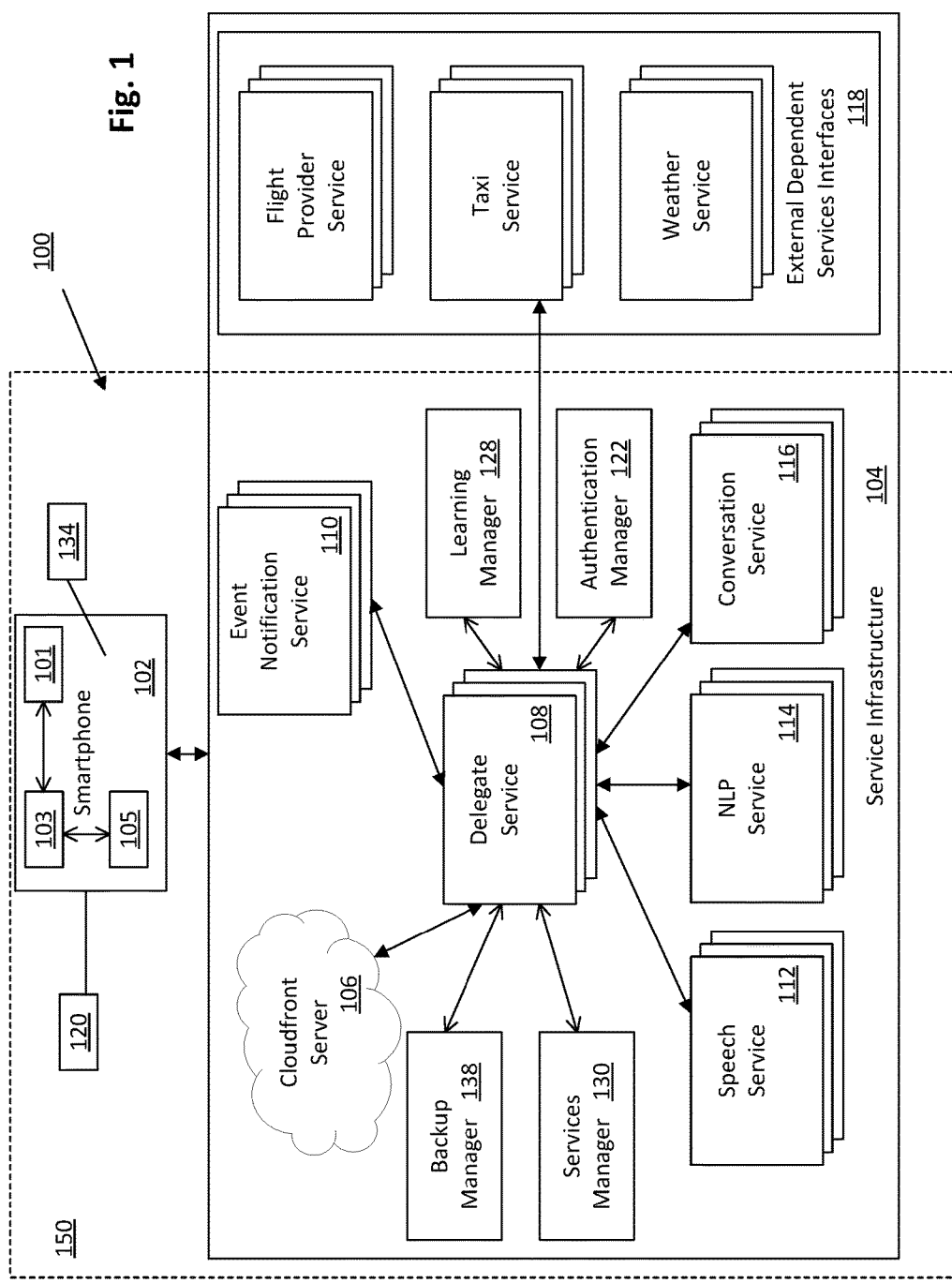
FIG. 1 is a block diagram of a top level architecture of a communication system including a smartphone and a cloud-based service in accordance with one example embodiment.
Figure 2:
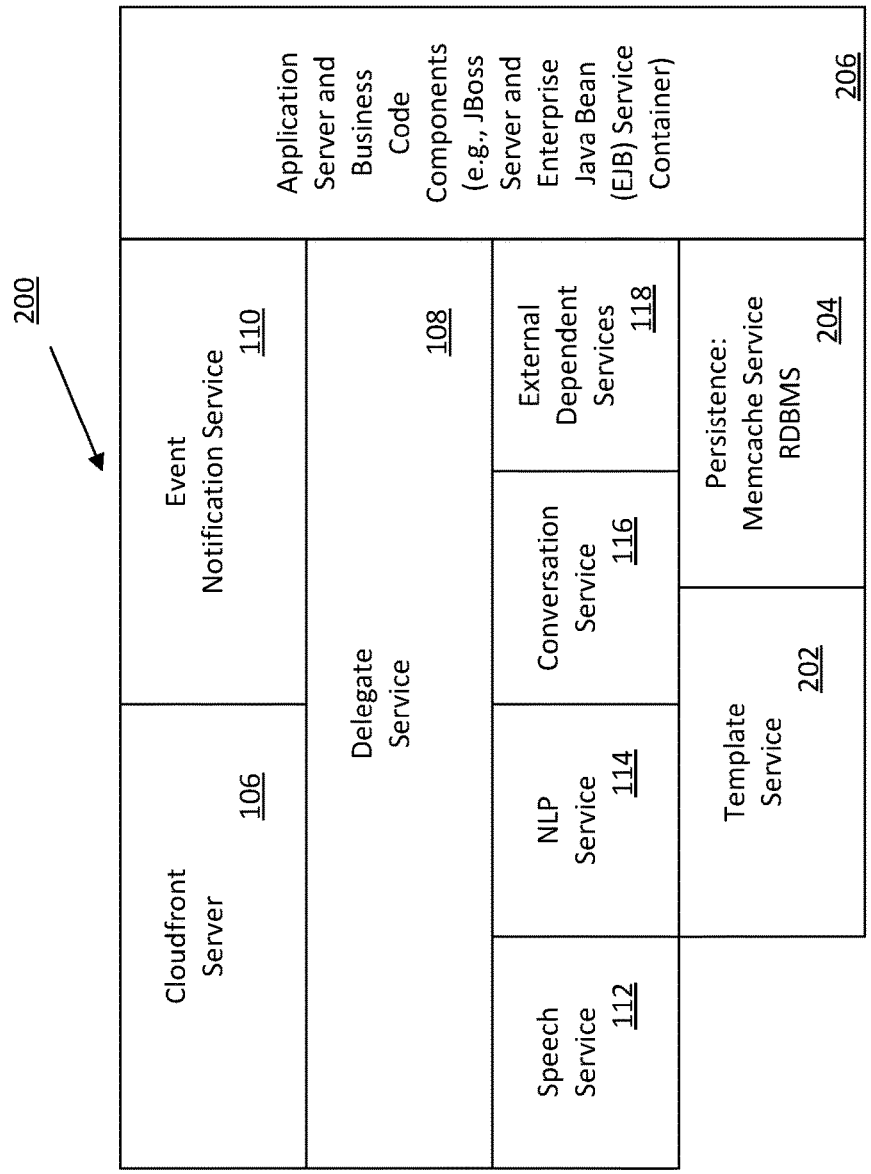
FIG. 2 is a block diagram that shows software architecture of the cloud-based service in accordance with one embodiment.

FIG. 1 is a block diagram of a top level architecture, in accordance with one example embodiment, of a communication system 100 including a smartphone 102 and components of a cloud-based service infrastructure 104 providing a voice-based interface to one or more services. FIG. 2 is a block diagram that shows software architecture of the cloud-based service infrastructure 104 in accordance with one embodiment. In the present example embodiment, cloud-based service infrastructure 104 is configured to permit a user of smartphone 102 to provide speech inputs defining commands to obtain a desired user experience that may include the provision of one or more services.

Figure 8:
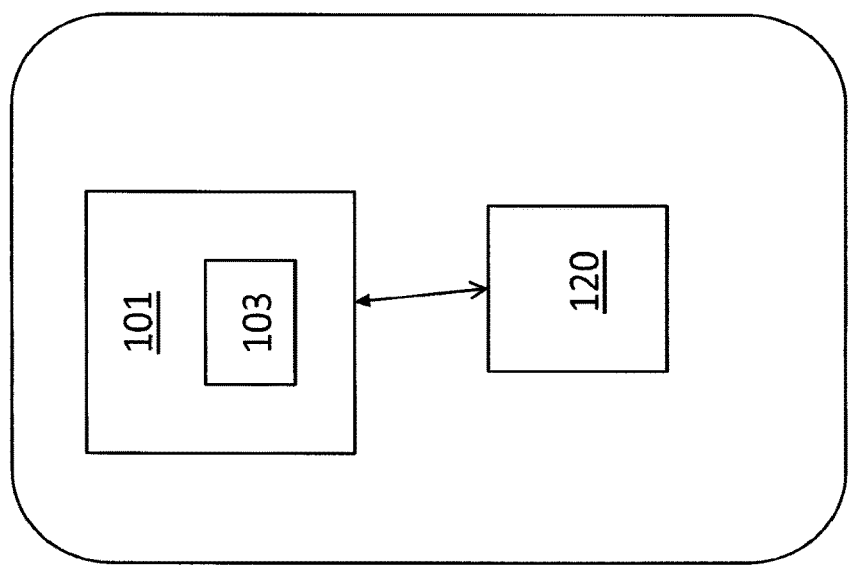
FIG. 8 illustrates a block diagram of hardware and/or software modules on a smartphone, including a conversational app according to one example embodiment.

FIG. 8 is a block diagram of smartphone 102 in accordance with one example embodiment. Smartphone 102 is a computing device having one or more processors, long-term and short-term electronic data storage media, an operating system, a display screen which may include a touchscreen interface, at least one antenna for transmitting and receiving data, a general positioning system (GPS), a microphone for receiving audio input, at least one speaker for providing audio output, a camera which may include one or more flashes, and the like (not shown). The Conversational Agent 150 of the invention includes an App 101 that resides on smartphone 102 (other components may reside on cloud-based infrastructure 104). App 101 communicates with an input queue 107, the input queue 107 receiving formatted output messages provided by cloud-base service infrastructure 104. In one embodiment, App 101 processes messages received in the input queue 107, and together with a user interface manager 103 (also referred to herein as Ux Manager 103), provides a user interface 105 for displaying a formatted output to the user. Ux Manager 103 may provide the user interface 105 for receiving input from the user (for example, voice, touchscreen, and the like) for receiving input queries and presenting output in an interactive conversational manner. In an embodiment, Ux Manager 103 formats the user interface 105 (including output received from cloud-based service infrastructure) depending on the display capabilities of the smartphone 102. As will be described, App 101 may interface with one or more internal service interfaces 120 that provide access to internal hardware and/or software services such as GPS, calendars and alarms, address books contacts, and the like.

A user may interact with the Conversational Agent 150 via App 101 to perform one or more commands. A command may comprise an action and generally at least one associated parameter or other data. For example, a user query 302 such as "I want to book a meeting" indicates a calendar related action (i.e. command) but does not include associate parameters such as date, time, location, invitees, etc. A user query 302 "I want to fly to San Francisco next Tuesday" indicates a travel related command and provides some associated parameters such as destination and travel date. A user query 302 such as "How are you today?" is a chat related command and does not have any associated parameter. Such user queries 302 may be expressed by the user to carry on a conversation with the App 101 which is adapted to recognize the intention of the user and to respond accordingly.

Services in the context of this specification may include internal services 120 or external services 118. Internal services 120 relate to one or more functions of the user's device (e.g. smartphone 102) such as voice and data communication services, personal information management (PIM) by way of example, telephone, email, instant messaging (IM), text of short message service (SM), calendar, contacts, notes, music, alarm, and the like. Internal services 120 may incorporate any application already installed on the device as well as system information such as user information, current time, hardware and software information and the like. External services 118 relate to those provided by another party, typically via a web connection, such as a travel booking service, weather information services, taxi service, shopping service, information retrieval service, social networking service, news service, online marketplace service, and the like. The term "interfaces" and "services" may be used interchangeably in this specification to refer to services 118, 120.

In some contexts, the user input may be a speech input query 302, but responses (output) from the services for presentation to the user by user interface manager 103 on smartphone may be any one or combination of speech (e.g. synthesized automated voice), text, graphical, audio, animation responses, and the like. Output may include text or other types of responses such as image, sounds and the like. In addition to speech input queries 302, a user may interact with the intelligent user interface using a keyboard, touch screen, mouse, and the like and any combination thereof. For example, a speech input "Send an email to Bob" defining a command to email a particular contact may initiate a draft email on smartphone 102. The user may manually edit the email using a keyboard (not shown), a touchscreen keyboard or other input means of smartphone 102. Furthermore, some input commands may be inputted using a combination of two or more input modes, for example by combining a voice command with a touchscreen input. For example, a user may increase the zoom level of the display screen on smartphone 102 by placing one finger on the screen and expressing a command such as "zoom 4 times". In a further example, a user may touch in the vicinity of a certain input field (such as the field for entering recipients of an email message) and say names such as "Bob, Sam, Neal" etc. The Conversational Agent 150 may interface with several services 120 (such as microphone service, speech recognition service, touchscreen service, etc.) to receive and process multi-modal user inputs to perform the desired command according to derived intent of the user.

Techniques and mechanisms described or reference herein will sometimes be described in singular form for clarity. However, it should be noted that particular embodiments include multiple iterations of a technique or multiple instantiations of a mechanism unless noted otherwise.

Example Hardware, Software Environment

With reference to FIGS. 1 and 2, components of cloud based service infrastructure 104 include cloudfront server 106, Delegate Service 108, event notification service 110, speech service 112, natural language processing (NLP) engine service 114, dialogue service 116, domain manager 126, backup manager 138, authentication service 122, Display Manager service 142, Services Manager 130, learning manager 128, external dependent service interfaces 118 providing access to one or more external services such as flight provider service 118A, taxi service 118B and weather service 118C. It is apparent that there may be a plurality of each of these respective service components within the infrastructure which is scalably, reliably and dynamically able to handle service requests from a plurality of communication devices, of which only one (smartphone 102) is illustrated. Though shown as a client (smartphone 102) and server model, certain functions and features may be performed on the client.

Cloudfront server 106 may provide connection, load balancing and other communication related services to a plurality of communication devices such as smartphone 102. Delegate Service 108 may be chiefly responsible for handling and/or coordinating processing of the speech input, natural language processing of the speech input, the resulting commands for the applicable services and any responses. It will be appreciated that each of the services shown in FIG. 1 may also have a load balancer that allocates, instantiates and destroys its respective services dynamically depending on the demand for a particular service by plurality of smartphones 102. Load balancing of any service or group of services of the Conversational Agent 150 may be accomplished though a server administration account, and may incorporate performance metrics such as queries per second, number of user accessing the Conversational Agent 150 and/or a particular module (108, 142, 118, 120, 114, 130, etc.), processing resources being consumed, etc.

As will be appreciated by one of skilled in the art, examples herein described may be embodied as a method, system, apparatus or computer program product. Accordingly, the examples may take the form of an entirely hardware embodiment, an entirely software embodiment (including firmware, resident software, micro-code, etc.) or an embodiment combining software and hardware aspects all generally referred to herein as a "circuit", "module", "library" and the like. Furthermore, the present invention may take the form of a computer program product on a computer-usable storage medium having computer-usable program code embodied in the medium.

Devices that are in communication with each other need not be in continuous communication with each other, unless expressly specified otherwise. In addition, devices that are in communication with each other may communicate directly or indirectly through one or more intermediaries.

Computer storage media includes volatile and nonvolatile, removable and non-removable media implemented in any method or technology for storage of information such as computer readable instructions, data structures, program modules or other data. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, managers, engines, resources, data structures, etc. that perform particular tasks or implement particular abstract data types. Typically, the functionality of the program modules may be combined or distributed as desired in various embodiments.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/module/component/service/article (collectively referred to as components), whether or not they cooperate, may be used in place of a single component. Similarly, where more than one component is described (whether or not they cooperate), it will be readily apparent that a single component may be used in place of the more than one component.

The functionality and/or the features of a device may be alternatively embodied by one or more other devices that are not explicitly described as having such functionality/features. Thus, other embodiments of one or more of the invention(s) need not include the device itself.

Although described within the context of conversational technology for a computing device such as a smartphone 102, it may be understood that the various aspects and techniques described herein (such as those associated with natural language processing, for example) may also be deployed and/or applied in other fields of technology involving human and/or computerized interaction with software. For example, the Conversational Agent 150 of the invention may be used with web-enabled televisions, set-top boxes, voice-enabled appliances in a smart home, interactive voice response systems, voice-enabled automobile interfaces, as well as with other technologies where voice interaction and/or natural language understanding of a user's intent is useful.

Event notification service 110 provides event-related messages to smartphone 102, for example, data communications such as calendar reminders, recommendations, previously used external services, daily deals and daily updates, social media events such as status updates, follow-ups, survey requests and the like. In another embodiment, smartphone 102 also includes a device event service 134 for processing device-specific events such as battery low on power, automatic processing of images taken by the camera of the smartphone 102, location reminder based on real-time GPS coordinates of the device 102, as well as any or all of the calendar/alarm reminders that may also be handled by event notification service 110. Cloud-based event notification service 180 may provide information on events related to a user of a smartphone 102 from external services such as a social media service, email service, new service and the like. In one embodiment, cloud-based event notification service 180 uses push technology to notify the Conversational Agent 150 when certain events occur that may be of interest to a user.

For example, a user may want to know when a friend has changed their status on a social media website. Cloud-based event notification service 180 may periodically scan for events, and when such an event occurs (such as a friend changing their status) notify the Conversational Agent 150 using push and/or pull technology so that the change of status may be communicated to the user.

Speech service 112 performs speech-to-text conversion, receiving speech input for defining a command, such as in the form of a digital audio file, from smartphone 102 and provides text output in the form of a user query 302. In an embodiment, the speech service may reside wholly or in part on the client device 102. Speech service 112 may take as an input the raw audio file (in lossy or lossless format, examples of which include PCM, ASR, mp3 and the like). Speech service may interact with one or more language grammars which may correspond with specific domains, languages, subtopics, etc. In one embodiment, the Conversational Agent 150 interacts with user-specific grammars which may include audio and/or grammar models that correspond to the user's accent, intonation patterns, as well as user-specific terms such as the names from the user's address book, geographic terms commonly expressed by the user, and the like. Speech service 112 is described in more detail with respect to FIG. 9. In this description, the term user query 302 may refer either to spoken input queries or the text translation of a given spoken input. Natural language processing of an input query 302 is generally performed with a text input string representation of a user query 302. User queries voiced by the user are made up of sound waves. Sound is a mechanical wave that is an oscillation of pressure transmitted through a solid, liquid, or gas, composed of frequencies within the range of hearing. The speech recognition module 112 may employ one or many techniques for converting the inputted audio signals from the user into a digital format for further processing. The digital format may be an audio file, a text file, or any other digital format or combination of digital formats. The speech recognition service 112 transforms the substance of the input from an audio query (wherein the user intent is embodied in a sound wave) to a digital format such as text string (wherein the user intent is embodied in an electronic digital medium) which can then be processed by an electronic device such as a computer or smartphone 102.

NLP Engine 114 analyzes the user query 302 to derive the user's intention and specific commands with which to provide the services desired by the user, and may create a representation of the desired user intent. Dialogue service 116 assists with the user interface 105 between the user and the services, for example, by engaging in natural language dialogue with the user. The dialogue may include questions clarifying one or more aspects of a specific command as discussed further herein below. The dialogue service's (116) responses to speech inputs from smartphone 102 need not be in spoken audio format but may be in a text-based, visual, audio or other format as previously mentioned. Dialogue service 116 may also receive general conversational queries 302 and engage in a continuous conversation (i.e. CHAT) with the user. General chat queries 302 do not necessarily relate to a particular command and NLP Engine 114 may determine that the intention of the user is to converse with the Conversational Agent 150.

Domain manager 126 may dynamically manage, update and make available domain corpora to NLP Engine 114 and other services. In one embodiment, domain manager 126 may dynamically switch domain corpora to maximize the accuracy of NLP Engine 114 recognition of the user's intent (for example, to increase the precision and recall of the Conversational Agent 150). In one embodiment, domain manager 126 manages the incorporation of new domain functionality into the Conversational Agent 150 (see FIG. 20). For example, as discussed herein, the range of knowledge available to the Conversational Agent 150 may be expanded by adding new domains (including domain models and corpora) to the Conversational Agent dynamically to provide a broader user experience.

Interfaces 118 are interfaces to particular web-based services (e.g. Web Services) or other external services. External services typically utilize well-defined interfaces (e.g. application programming interfaces—APIs) for receiving requests and returning responses. Cloud-based service infrastructure 104 provides a manner for receiving natural language commands for such services, determining the applicable external service request based on the derived user intent and any associated data (parameters) to make the request and invoking the request. Cloud-based service infrastructure 104 is also configured to receive the applicable response and provide same to smartphone 102 on user interface 105. Similar operations may be performed to invoke internal services and provide the response(s) to smartphone 102.

Internal and external services such as via interfaces 118, 120 may be invoked in any one of several ways. Any service call mechanism can be used. Examples include REST, SOAP, COBRA and the like. Non-service call, passive mechanisms can also be used. In this case, data is placed at a digital location that is accessible by the invoked service. The invoked service checks this digital location. The passive mechanism is also effective as an invocation mechanism.

Software components 200 further include template service 718 to assist with the dialogue service 116, persistence memcache service/relational database management service (RDBMS) 204 for storing and managing data and application server and business code components 206 such as components of an object oriented Jboss Server and Enterprise Java Beans (EJB) contain service in accordance with an example implementation Smartphone 102 is configured, such as via one more applications, to send language information to cloud-based service infrastructure 104 and receive a response based on language understanding and the derived intent of the user. In an embodiment, an automatic speech recognition service (ASR Service 112) available to smartphone 102 receives an audio user query from the user and converts the audio user query into a text format which is then communicated to cloud-based service infrastructure 104. ASR service may reside entirely or in part in cloud-based service infrastructure 104 and/or smartphone 102. One or more applications on smartphone 102 may be configured to accept and process one or more user interface commands into an execution command which is then communicated to cloud-based service infrastructure 104. By way of example, a user may voice a command such as "Tell Bob I will be late for the meeting" while pressing an icon on a touch screen that corresponds to a text message. Application 101 may receive the input query and the input touch command and process these two commands into a single command which is passed on to cloud-based service infrastructure 104 for further processing by modules of Conversational Agent 150, such as Services Manager 130 to perform according to the derived intent of the user as determined by NLP Engine 114.

Smartphone 102 is also configured to receive notifications from event notification service 110. In some embodiments, smartphone 102 may be configured to perform natural language understanding without the use of cloud-based service infrastructure 104, for example, when understanding requires sensitive information that a user prefers is not sent off the smartphone 102 or if cloud-based service infrastructure 104 is unavailable for any reasons. In an embodiment, the natural language processing of user query may be partially performed on smartphone 102 and by cloud-based service infrastructure 104. In some embodiments, user devices need not be limited to smartphones only. Other communication devices can be supported such as "dumb" phones via any communication protocol including TTY and SMS. Non-phone clients such as laptops, tablet computers, personal computers, set top boxes, televisions, kiosks, etc. can also be supported as well.

In one embodiment, the Conversational Agent 150 employs an encryption manager (not shown) to encrypt and decrypt information sent between smartphone 102 and cloud-based service infrastructure 104. Any encryption method or combination of encryption techniques may be used such as public key encryption. Certain information relating to users of the Conversational Agent 150 may also be anonymized, for example, financial information and addresses and contact information of contacts.

NLP Engine 114

Figure 3:
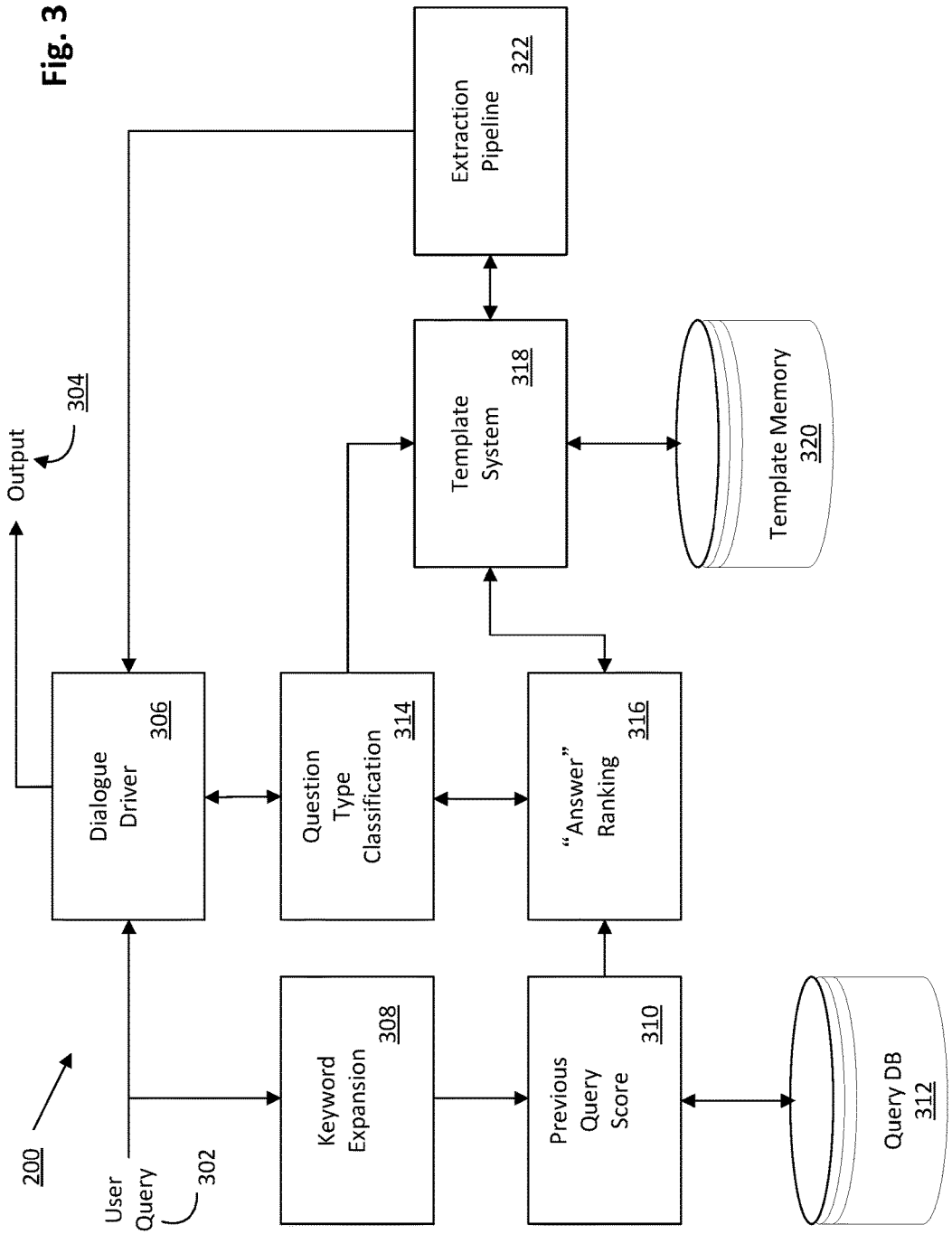
FIG. 3 illustrates a block diagram of modules performing operations (methods) of the service of FIGS. 1 and 2.

FIG. 3 illustrates a general overview flow of selected operations (methods) 300 of the NLP Engine 114 of the invention according FIGS. 1 and 2. A user query 302 is input to such operations 300 and operations 300 provides output 304 as discussed further herein below.

A user interacts with App 101 on their smartphone 102 to perform commands and/or to engage in a conversational dialogue with their smartphone 102. App 101 is a component of the Conversational Agent 150 and provides a user interface 105 for allowing the user to interface with the functionality provided by Conversational Agent 150. A user query 302 is a text representation of a voiced (or typed) user query provided by the user. In general, a user query 302 relates to a domain of functionality. A domain in the context of this specification refers generally to a field of action, thought, topic, conversation, etc. Example domains include CHAT, TRAVEL, WEATHER, SPORTS, CALENDAR, SOCIAL MEDIA and the like. Domains are general categories of classifying dialogue, interaction and intended functionality and may be as specific or as general as makes sense for a given implementation of the Conversational Agent 150.

In one embodiment, NLP Engine 114 receives a user query 302 as described below and derives the intention of the user. NLP Engine 114 may identify a domain, a subgroup (also referred to as a subdomain), one or more tasks (also referred to as actions and/or commands) according to the derived intention of the user, and one or more entities (also referred to as parameters) that may be useful to accomplish the one or more tasks. As an example interaction, a user expresses the query 302 "Find me a flight from Toronto to New York leaving in a week". The above query 302 may be classified by NLP Engine 114 as relating to the domain TRAVEL, the subgroup of flights. NLP Engine 114 may further relate the user query 302 to tasks to be performed such as "find flights" and maybe "book flights", and may further identify the entities "Toronto", "New York", as well as the departure date. The process of identifying the domain, subgroup, one or more task, and entities associated with a user query 302 is generally referred to herein as deriving the user intent. NLP Engine 114 may create a representation of the derived user intent by creating a software object such as a template 719 and/or by saving the intent to temporary and/or permanent memory. As described further in this specification, the Conversational Agent 150 may attempt to elicit additional entity information from the user, such as in this example interaction, a particular airline, the return date, the class of the ticket, number of tickets, number of stops allowed, time of the departure and return flights, and the like.

Dialogue driver 306 (i.e. Delegate Service 108), which may be a component of Dialogue Manager 116, receives user query 302 for processing and provides user query 302 to question type classifier 314. User query 302 is also provided to keyword expansion unit 308. The user query 302 and expanded keywords (not shown) are provided to previous query score determiner 310 which references prior queries (not shown) stored in query database 312. Previous query score determiner 310 performs statistical analysis and provides candidate answers (i.e. commands) for ranking by answer ranking unit 316.

Figure 21:
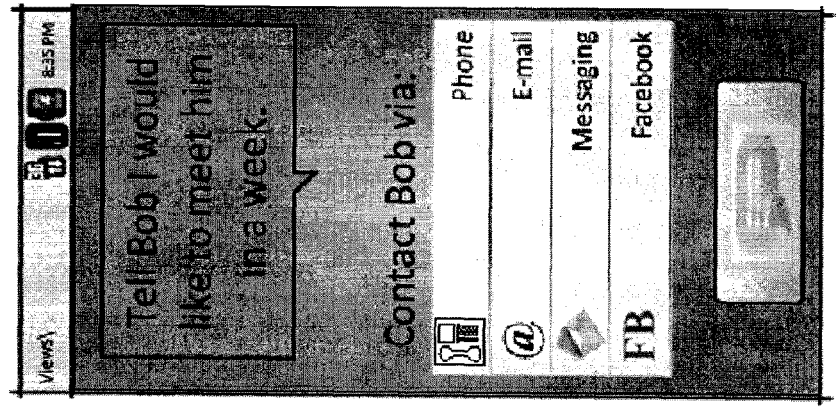
FIGS. 21 to 23 show an example interaction using clarification questions on an example user interface according to one embodiment.
Figure 22:
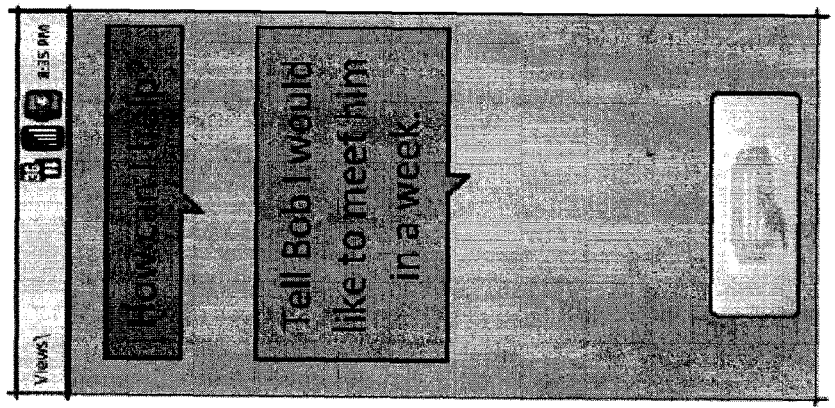
Figure 23:
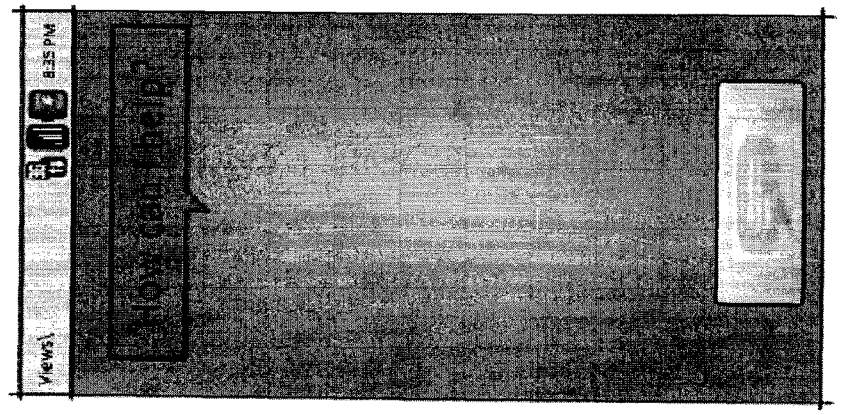
Figure 25:
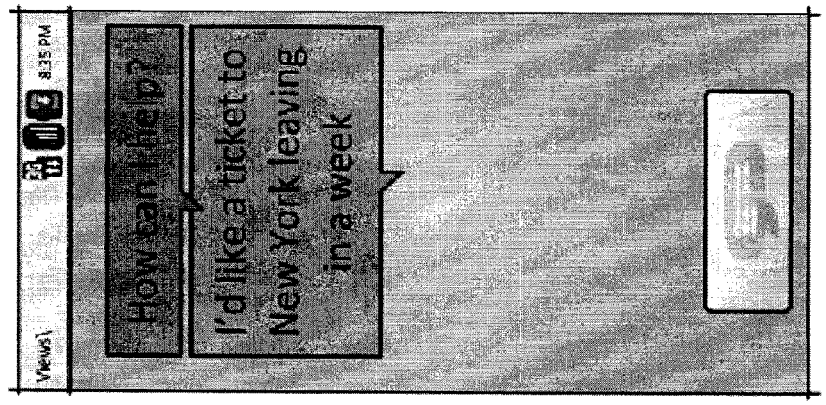
FIGS. 24 to 26 show another example interaction on an example user interface in accordance with one example embodiment.
Figure 24:
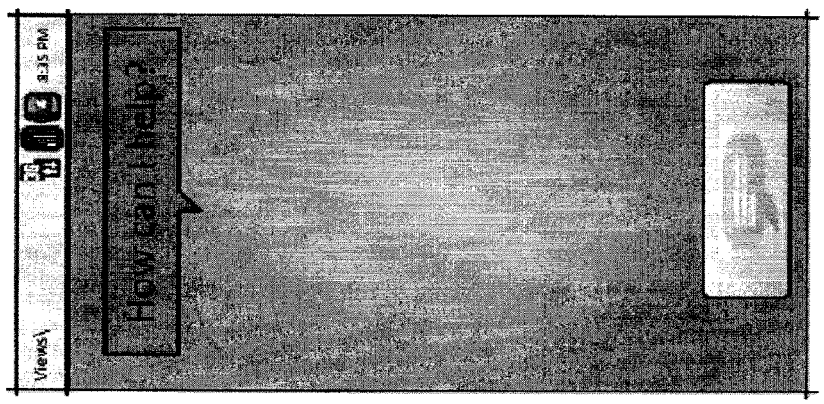
Figure 28:
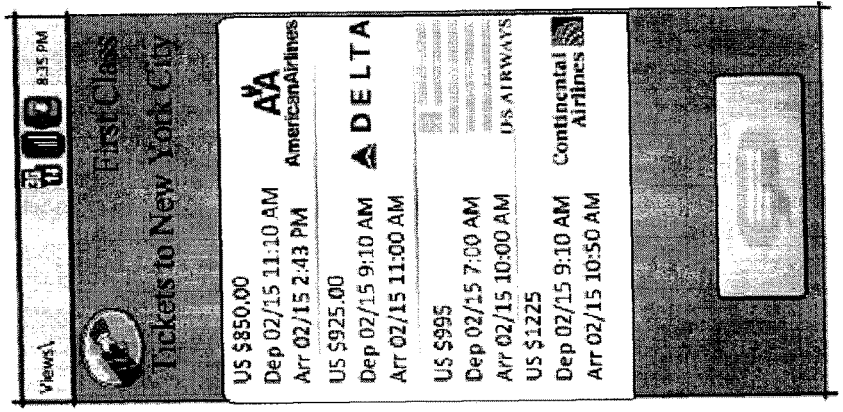
FIGS. 27 and 28 show an example interaction in which one embodiment of the Conversational Agent operates with a low-level of initiative.
Figure 27:
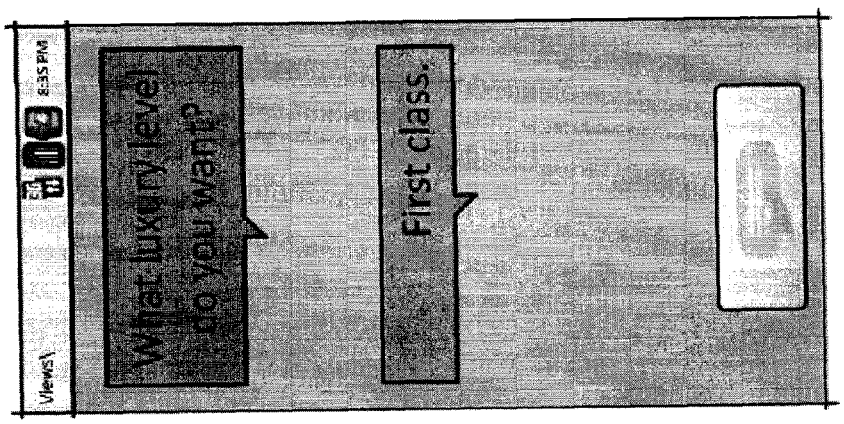
Figure 26:
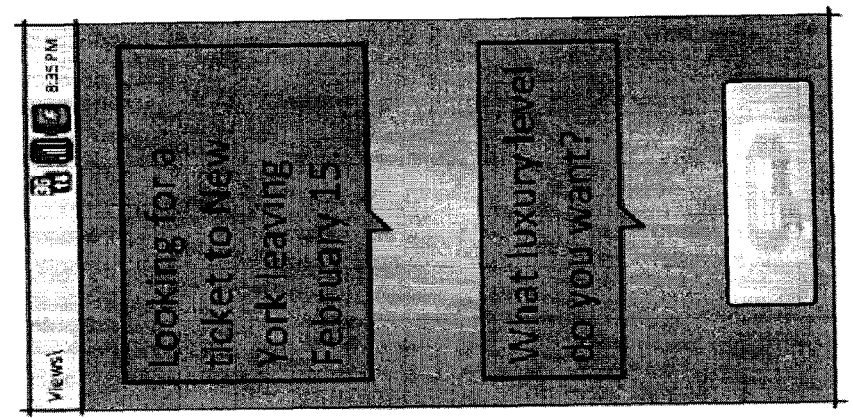
Figures 29, 30:
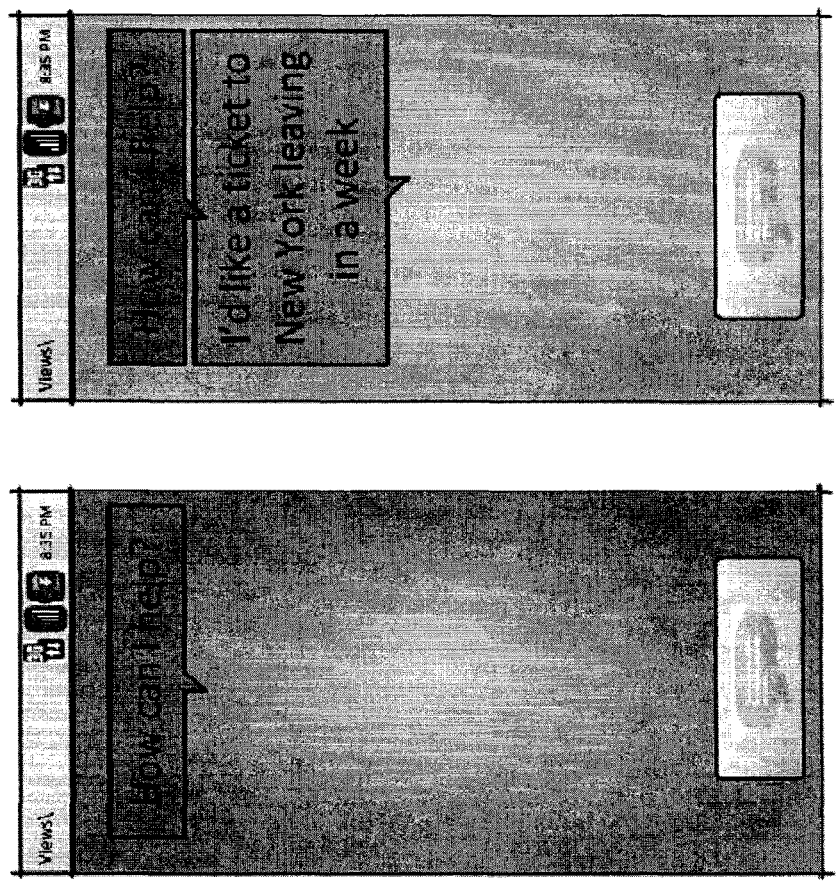
FIGS. 29 to 32 show an example interaction in which one embodiment of the Conversational Agent operates with a high-level of initiative.
Figure 31:
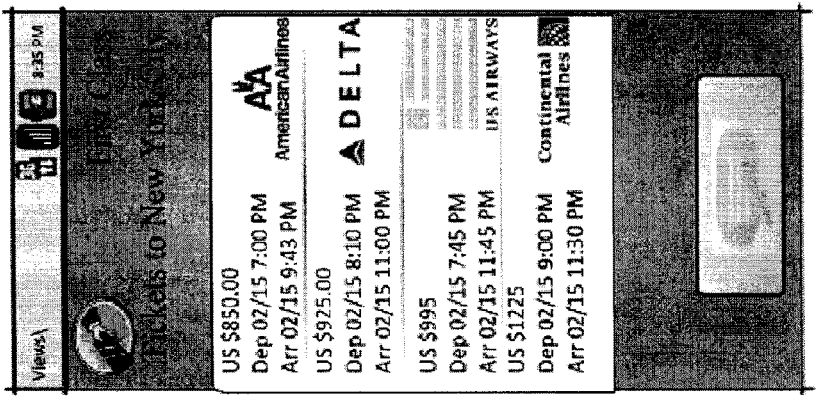
Figure 32:
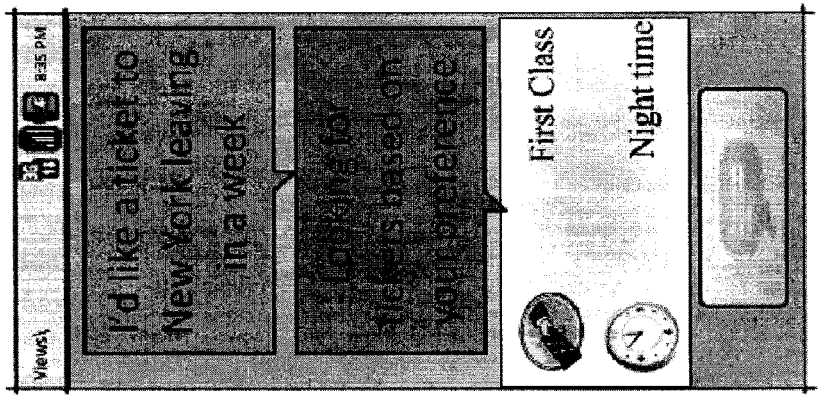

Query database 312 may store, such as in a machine learning manner, a history of user queries and the associated commands and additional data such as keywords determined by cloud-based service infrastructure 104. The query database 312 may store a complete history (or subset) of a particular user's query and associated commands to build user-centric preferences. For example, a particular user's query "Tell Bob I want a meeting" may result in a command to telephone Bob, send a text message to Bob or email Bob. In an embodiment, the Conversational Agent 150 may ask the user to clarify the command by offering a series of choices for communicating the message to the recipient (in this case Bob). For example, the Conversational Agent 150 may provide a list on the user interface that includes "send email", "send text" and "phone"; the user may simply select the option desired and the Conversational Agent 150 will automatically perform the desired command (see for example FIGS. 21-23). In an embodiment, the Conversational Agent 150 may simply express a clarification question such as "Would you like to phone, email, or text Bob?" The user may simply say "phone Bob" or "phone" or "phone him", and other related command to initiate a phone command. The Conversational Agent 150 may also provide a clarification list together with an audio clarification question to provide a range of options to the user for selecting the desired command.

In an embodiment, the Conversational Agent 150 may map a specific command to one or more words contained in a user query. In the above example, the Conversational Agent 150 may map the word "tell" or the phrase "tell Bob" with one or more commands such as an internal phone service. The Conversational Agent 150 may learn over time the behavior patterns and/or preferences of the user in relation to many commands. The Conversational Agent 150 may also learn the preferences and/or behavior patterns of a user in relation to performing a command for a specific parameter or class of parameters. For example, the Conversational Agent 150 may associate the word "Tell" with the parameter "Bob" to the command "phone". However, in the case of another parameter, for example the contact "Ann", the Conversational Agent 150 may associate the word "Tell" with email. For a class of parameters, such as work contacts, the Conversational Agent 150 may associate the word "Tell" also with email. It will be appreciated that the learning ability of the Conversational Agent 150 of the invention may be leveraged in a variety of other ways. The Conversational Agent 150 may recognize that the word "Tell" is associated with "email" most often during the week and with "phone" during the weekend. In an embodiment, the Conversational Agent 150 may present a list of command choices where one command is presented as a default command based on the learned behavior and/or user preferences, and other commands are presented as an ordered list of commands where the order is also learned.

In addition to providing a source of user-centric preferences and learned user behavior, query database 312 may also be useful to store and provide access to user queries 302, associated commands and the like from all users, such as via an aggregated subset of queries 302 and associated commands. The aggregated data may define a broader corpus from which statistics and other data may be gleaned and be useful when determining expanded keywords, classification of user queries, mapping words to certain commands, determining classes of users based on recognized user types, and/or the like.

Question type classifier 314 evaluates user query 302 to determine whether the user query is a function type query, an entity type query, or a clarification type query. A function type query establishes a new command (also referred to herein as a topic). An example of a functional type query is "Book a meeting for next Friday at 2:00 pm" or "Send a message to Bob".

An entity type query is in relation to a current command (topic) and adds or changes an entity in such a command. For example, "Actually, move that to 3:00 pm" or "Add James to the message" or "Make that a return ticket".

A clarification type query is in relation to a current command and is responsive to one or more clarification questions posed by the Conversational Agent 150 to elicit more information (such as entities and/or parameters) or to determine which domain the user is referring to with a specific query. Clarification type queries may occur when the Dialogue Manager 116 asks the user a clarification style question. For example, for the user query 302 "Tell Bob I want to book a meeting", Conversational Agent 150 may formulate an output 304 comprising a clarification questions from Dialogue Manager 116 such as "Did you want to text or email Bob". These clarification questions are formulated to elicit more information regarding the communication method the user wishes to employ to communicate the message to Bob. In the above example, a user query such as "Text him" in response to the clarification question would be classified as a clarification query 302.

In response to some queries the Conversational Agent 150 may formulate a clarification question to determine which domain the user is referring to. For example, for the user query "Get me tickets to Rome", the Conversational Agent 150 may recognize that Rome is a city, there are several restaurants with the word "Rome" in the name, and that Rome is also the name of a movie. Conversational Agent 150 may formulate and present as output 304 a clarification question such as: "Did you want a flight to Rome, tickets to the movie Rome, reservations for a restaurant, or something else?." The Conversational Agent 150 may learn over time that the user prefers a certain mapping for queries with the word "Rome" and may take corresponding action (i.e.—perform a command) based on the user behavior and/or user preferences. For example, the Conversational Agent 150 may default to the option of finding flights for queries that contain city names where user behavior indicates that a particular user is a frequent traveler. As another example, the Conversational Agent 150 may default to movies when a particular user query 302 may relate to movies or restaurants (or other domains) because a particular user of Conversational Agent 150 frequently searches for movies.

Function type queries may be directed by question type classifier 314 to answer ranking unit 316 for determining the new command, if possible. Question type classifier 314 may direct entity type queries and clarification type queries to Template System 318 for additional processing to obtain further meaning from the user query with a view to also initiating appropriate output, for example, by formulating a clarification question. Template System 318 may also receive function type queries from answer ranking unit 316. Template System 318 may access template memory store 320 to define or refine a command and to define applicable output 304.

Some user queries may be more than one type of query and/or may be compound queries that specify several commands. For example, a user may express a user query 302 such as "Change my return date to September 16 and give me the weather while I am there". Such a user query 302 may be processed in several ways. For example, user query 302 may be divided into separate queries by NLP Engine 114 (i.e. "Change my return date to September 16" and "Give me the weather for destination between departure date and return date"). Furthermore, NLP Engine 114 may also assign the destination location to the word "there" so that the weather may be obtained. NLP Engine 114 may include a query preprocessor (not shown) that is adapted to separate compound queries into individual queries, and also to assign specific entities to anaphora terms in a given query 302.

Extraction Pipeline 322 may receive user query 302 and conversation features and extract entities from the user query 302 to build up the command and its associated data as described further herein below with reference to FIG. 7. The entities extracted from a given user query 302 may be populated into template object 319 which is passed to services manager 130 to accomplish the derived user intent. Dialogue Manager 116 and Display Manager 142 provide output 304 for smartphone 102 also as described below. Smartphone 102 may have a queue manager 107 that receives output 304 from cloud-based service infrastructure 104.

Figure 4:
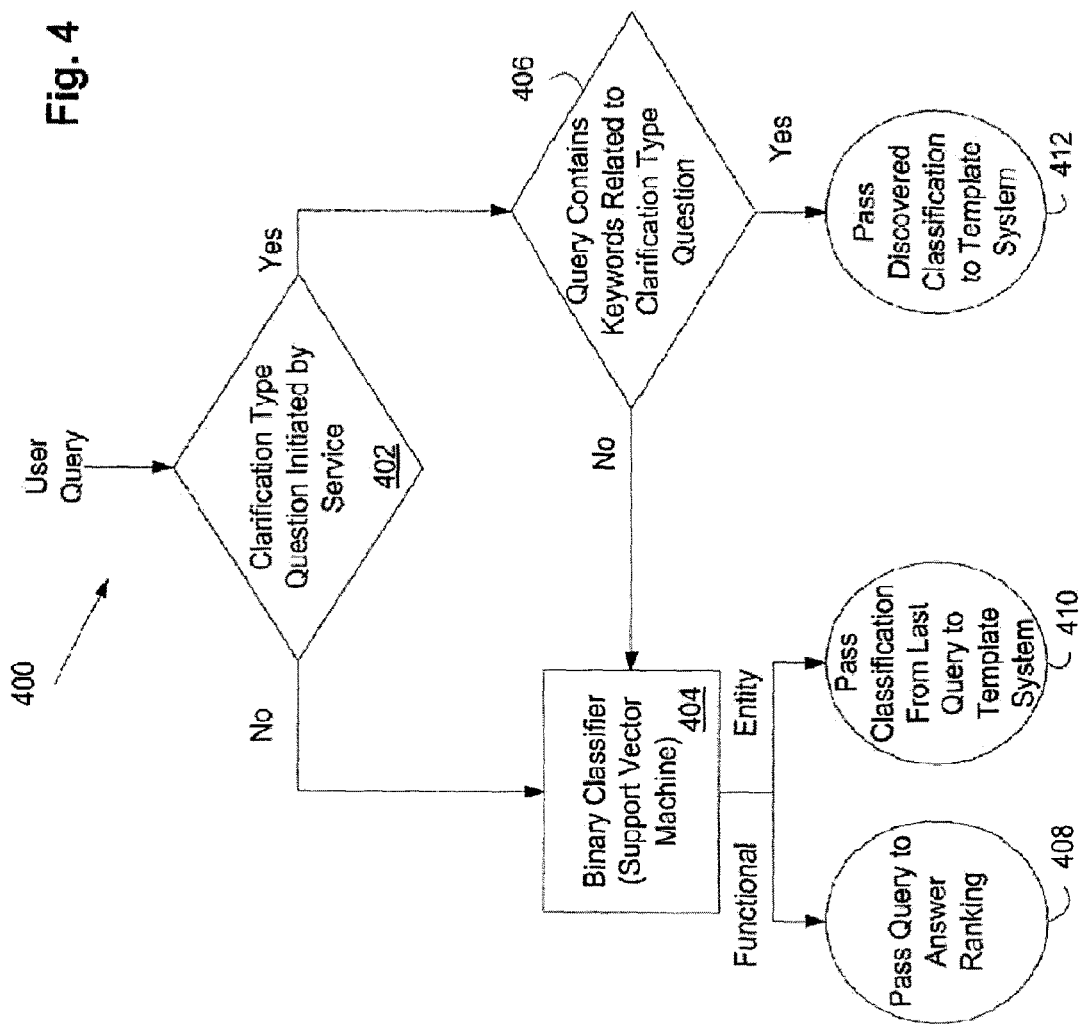
FIG. 4 illustrates a block diagram of modules performing operations (methods) of question-type classification.

FIG. 4 illustrates a flow chart of a method 400 of question type classifier 314 in accordance with an example embodiment. In one embodiment user query 302 is provided to method 400 from speech service 112. At 402, a determination is made whether a clarification type question was initiated (i.e. whether the most recent output 304 or a recent output was a clarification question to the smartphone 102 via delegate service 108,306). If a clarification question is not pending, operations continue at step 406. If a clarification question is pending, operations continue at 406.

At step 404 in one embodiment, user query 302 may be subjected to binary classification such as via a support vector machine (SVM) for analysis. Other known types of binary classification may also be used alone or in combination such as decision trees, Bayesian networks, support vector machines, and neural networks. A support vector machine (SVM) is a concept in statistics and computer science for a set of related supervised learning methods that analyze data and recognize patterns, used for classification and regression analysis. The standard SVM takes a set of input data and predicts, for each given input, which of two possible classes forms the input, making the SVM a non-probabilistic binary linear classifier. Given a set of training examples, each marked as belonging to one of two categories, an SVM training algorithm builds a model that assigns new examples into one category or the other. In one embodiment of the Conversational Agent 150, the two categories are functional-type query and entity-type query. The classifier (i.e. the SVM) may be trained by providing a set of queries identified as belonging to the category of entity-type queries, and another set of queries belonging to the category of functional-type queries.

User query 302 is applied to the SVM at step 404, and SVM may perform analysis of the user query 302 to determine whether the query is an entity type query related to current command (topic), or not (i.e. the user query is a function type query). Functional type queries are passed at step 408 to answer ranking module 316. Entity type queries may be passed at step 410 to Template System 318.

As described above, a training algorithm may build a model for the SVM for assigning new queries to either the functional-type query category or the entity-type query category. An SVM is a representation of the examples as points in space (hyperplane), mapped so that the examples of the separate categories are divided by a clear "gap" that is as wide as possible. New queries are then mapped into that same space and predicted to belong to a category based on the side of the gap on which reach respective query falls. When preparing the SVM and when passing in new queries for classification, it may be useful to selectively provide certain words, terms and metadata and/or other features related to the query 302. Using all words from a query 302 may be problematic because common words may skew results incorrectly. Services, application programming interfaces or other means (such as Extraction Pipeline 322 illustrated in FIG. 7) which perform entity extraction may be useful to extract entities (parameters) such as people, places, dates, specific things, contacts, times, etc. For example, the following is an example of features which may be determined and provided by a query preprocessor (not shown) and passed to the SVM:

Presence of keywords: TF-IDF (term frequency—inverse document frequency) scores for each domain may be calculated for each word in the entire corpus. The words are then sorted and a selection of the words with the top 50 scores (as an example) is made.
  Question type keywords: This represents the words that often begin or identify questions, such as: how, where, when, why, who, what followed by obvious keywords that related to the domains (e.g. commands related to functions provided by a user interface) such as call, text, message, book, and the like.
  Presence of key entities: Examples include places/addresses, person names, restaurant types and names, food dish names, date, etc. As new domains may be added to the Conversational Agent 150, key entities may also be added. These key entities may be retrieved using named entity recognition and extraction as described herein.
  Potential features: For example, the current action that the user is performing on the device, the previous domain the user requested, etc.
  Presence of regular expressions: whether the query matches a pattern known to be found in data for each domain. Patterns may have be handcrafted and/or partly learned from data for each domain. For example, a query 302 beginning with the phrase "Find me . . . " may commonly indicate a functional-type query related to flights, internet search, music, and the like.

When a clarification query has been posed and is pending (i.e. the clarification question has not been answered), at 406 a determination may be made whether the user query 302 contains keywords related to the clarification question posed (i.e. whether the query 302 is responsive to a clarification query). For example, in the case where a clarification question offers a list of options, such as "Would you like to phone, text, or email Bob", Conversational Agent 150 may look for the words "phone", "text" and "email" in the response user query 302. As another example, where the clarification question asks for the specific name of an entity such as "What city would you like to depart from?", the Conversational Agent 150 may look for the name of a specific city in the response query. If it is determined that the query contains keywords related to the clarification question posed, then the query is a clarification type query and the classification of the user query (and its association with the current command) may be passed to Template System 318 for further processing. If such keywords are not present, the user query may comprise a new functional type query or an entity type query (such as where the entity/entities were not the focus of the clarification question posed). The user query may be then forwarded to step 404 via the 'no' branch from 406.

In one embodiment, NLP Engine 114 uses a clarification-question SVM to determine if a particular query 302 is responsive to a pending clarification question. In an embodiment, keyword identification may be performed in the context of operations 406 enable the determination of whether the user query 302 is an answer to the clarification question posed. Statistics may be defined for particular terms to identify their relative frequency of appearance in user queries 302 associated with a particular category (e.g. each respective category may represent a specific command).

Figure 5:
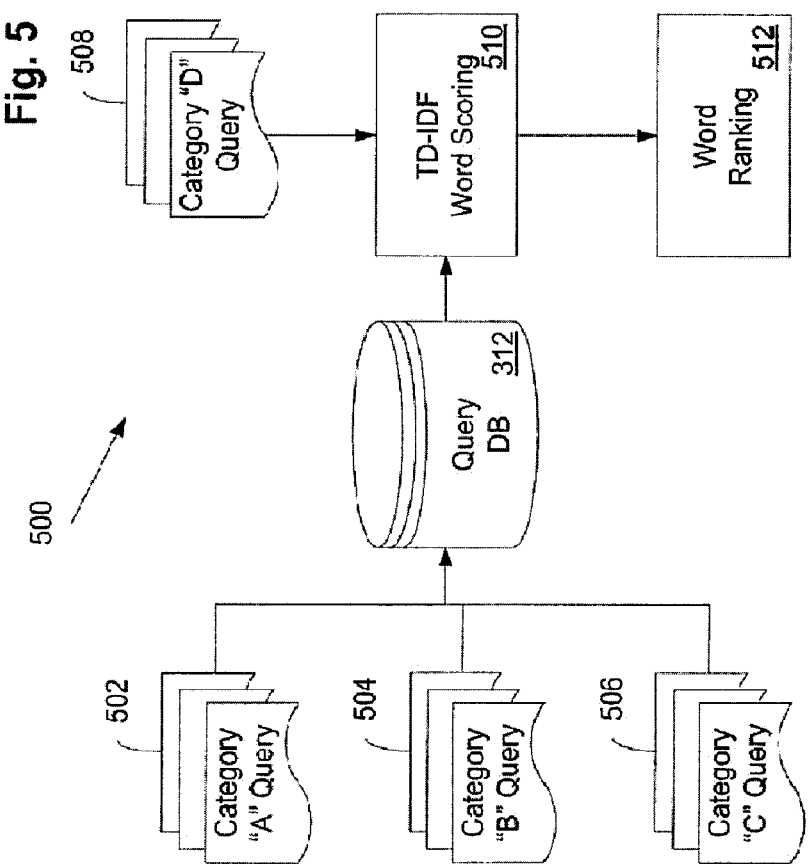
FIG. 5 illustrates a block diagram of modules performing operations (methods) of keyword identification.

FIG. 5 illustrates a flow chart of a method 500 of keyword identification such as may be useful for processing a user query 302 to determine the set of keywords related to the command and/or entities in the query. A database 312 of queries and associated categories and commands may be defined and made available for keyword expansion. For example, in the context of a smartphone 302, a subset of categories may represent functions/commands such as "email", "telephone", "book meeting", "set alarm", "short message service (SMS)/text" amongst others. In FIG. 5, the user queries grouped by associated categories are represented as Category "A" queries 502, Category "B" queries 504, Category "C" queries 506, and Category "D" queries 508. It is understood that more or less categories may exist in an actual implementation, and that the categories available together with their associated queries may dynamically updated, added, deleted, and the like by the Conversational Agent 150.

In an embodiment, the relative frequency of a term in a category is comparatively determined in relation to the terms' infrequency in the other categories as well. In step 510, TF-IDF word scoring is used to determine keywords for each category. A document is defined as the set of queries that belong to the same category (e.g. 502,504,506,508). Specifically, a separate corpus may be maintained and utilized for each domain such as TRAVEL, MUSIC, SOCIAL MEDIA, CALENDAR, TIME, and the like. The corpus related to the TRAVEL domain, for example, may include queries with relevant travel-related keywords such as "flight", "trip", "vacation", "hotel", "attractions", city names, airline names, airport names, airport codes, "rental", rental car companies, and the like. The corpus related to the SOCIAL MEDIA domain may include queries with relevant social-related keywords such as, for example, "friends", "wall", "news fee", "message", the name of common social media sties, the names of friends and business associates, the name of application integrated with social media websites, and the like.

The corpus (within query database 312) is the set of queries (502, 504, 506, etc.) that are not the category where we are finding the keywords. In this specification, the term category(ies) may be used synonymously with the term domain(s). A term (keyword) which is relatively unique to category "D" is also less frequently occurring in the corpus of category "A", B" and "C" queries. This database of queries, related commands and associated statistics may be maintained (e.g. pre-calculated) so that the statistics are available for use in real-time when processing the user query 302. These statistics may be updated by a learning manager module 128 as described further in the specification. A word ranking for words in the current user query 302 may be determined (at 512) to identify unique words indicative of keyword status for determining the domain to which the user query 302 relates.

The user query 302 may be analyzed for keywords from the category or categories associated to the user query 302. Given that a clarification type question may have elicited the current user query, one or more categories may have been previously associated with the current user query 302 as determined from processing the prior user query which occasioned the clarification. These one or more categories related to the current command. It is understood that because individual user queries may be vague and/or ambiguous, more than one category (command) may be associated with the use query (e.g. as respective commands). As the dialogue develops, a specific command can be determined.

The classification of the query 302 type is useful to perform a new command (via answer ranking unit 316 and Template System 318) or to further process a current command by eliciting more information from the user (via Dialogue Manager 116 and Template System 318).

Figure 6:
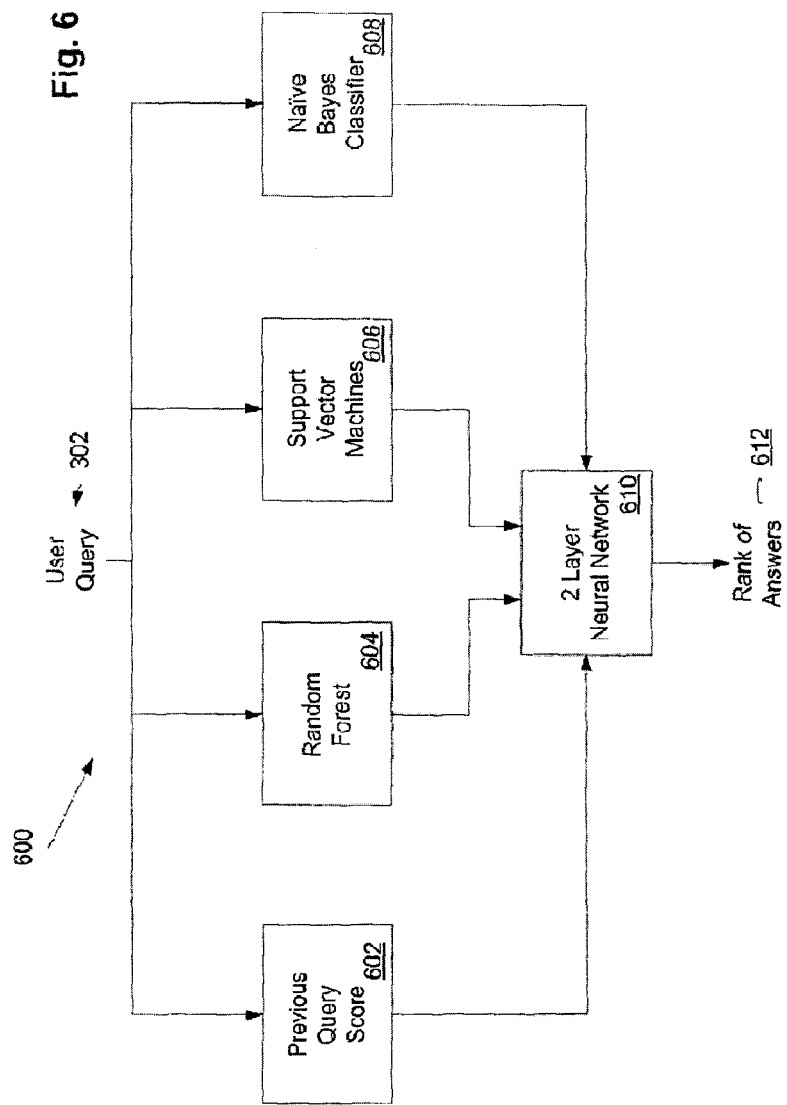
FIG. 6 illustrates a block diagram of modules performing operations (methods) of answer ranking.

With reference to FIG. 6, there is illustrated a flow chart of a method 600 of an answer ranking module 316 that may be used according to a Conversational Agent 150 of the invention. Answer ranking may be performed to assist with the identification of the specific command to which the user query 302 relates. In the context of FIG. 6, answer ranking module 316 is configured to identify an appropriate command that relates to the derived intent of the user. For example, a user may voice a query such as "I want to buy a ticket to San Francisco". Speech service 112 may process the audio input and (incorrectly) produce the user query 302 of "I want to tickets in San Francisco" which is provided to answer ranking module 316. Answer ranking module 316 evaluates the user query 302 with operations (methods) shown in FIG. 3 and may correctly determine that the correct command (i.e. according to the user intent) is related to finding a flight to San Francisco.

As described above, answer ranking may be performed when the question type classifier 314 determines that a user query 302 is likely a function type query. In the present example embodiment, answer ranking method 600 performs four types of analyses (602, 604, 606 and 608) on user query 302 and combines the results (via a two-layer neural network 610) to drive a rank of answers 612. A neural network is a mathematical model or computational model that is inspired by the structure and/or functional aspects of biological neural networks. A neural network consists of an interconnected group of artificial neurons, and it processes information using a connectionist approach to computation. In most cases an artificial neural network (ANN) is an adaptive system that changes its structure based on external or internal information that flows through the network during the learning phase. Modern neural networks are non-linear statistical data modeling tools. They are usually used to model complex relationships between inputs and outputs or to find patterns in data.

Though a plurality of four natural language processing techniques are used in the example embodiment, few or additional techniques may be used and the respective results of same combined to drive a rank of answers. In some embodiments, a means other than two-layer neural network may be used to combine such results.

In one of the analyses, user history is examined to define a previous score (602). Previous query score 602 may be used, for example, as an indication that the current query 302 is related to the same or a similar command to that used in relation to a previous user query. For example, for a given user query 302a such as "Find me the weather outside now", there may be a strong likelihood that similar queries (for example, query 302b "What is the weather like right now") relate to the same or similar commands as was previously associated with query 302a. In this way, an association between a given command and the same or similar user queries 302 may be reinforced by the previous query score 602 according to one embodiment.

Keywords may be extracted from user query 302 such as by TF-IDF techniques as described herein. Previous user queries and their respective associated commands form a corpus for comparative purposes. Keywords may be expanded with related words (e.g. synonyms and/or words with similar meanings) such as via WordNet™ expansion (WordNet is a registered trademark of Princeton University <http://wordnet.princeton.edu>) or using other keyword generation methods.

The extracted and expanded keywords may form the basis of a comparison or search applied against the query corpus and a relevance score calculated (e.g. retrieval and ranking functions) to rate search results. The search results (i.e. each respective candidate command and its associated ranking score) are made available to operations of two-layer neural network 610. The ranking function applied at 602 may comprise a BM25 of similar ranking function (e.g. BM25-F taking into account document format, length, etc.). BM25 relies upon IDF statistics to determine relevance of keywords in a document set.

In one of the analyses (random forest 604 in this embodiment), the user query 302 is applied to a set of decision trees where each decision tree assigns (i.e. determines) a command to which the user query relates. A rank (or mode) may be calculated to determine which command (or commands) results most frequently by the decision trees. Let N(c) represent the number of decision trees that classify the user query 302 as command 'c'. R(c) is the score for class 'c' calculated as N(c) divided by the sum of N(c) for all c's derived by the decision trees. The scores and associated candidate commands are made available to operations of two-layer neural network 610. A two layer neural network (see 610 discussed below) may be trained in order to determine the probability that the query was relevant to a given command. From this a rank for each of the classes can be determined according to this probability.

In one set of analyses (e.g. multiclass Support Vector Machines 606), the query is applied to a set of SVMs to determine a command. In one embodiment, each SVM is a binary classifier configured to determine whether the user query is associated with a particular command or any of the other commands (i.e. a oneversus-all determination). An example one-versus-one determination is email vs. telephone. In another embodiment, an SVM is configured for each pair of commands to determine whether the user query 302 is associated with one of the two particular commands (e.g. email vs. telephone) (i.e. a one-versus-one determination). It is noted that in a one-versus-one embodiment, SVMs may be configured for a pairing of particular commands to a null class.

In a one-versus-all determination, if the SVM approach is the sole classifier, a winner takes all approach is often adopted, selecting the highest score from the SVMs. The SVMs require calibration to produce comparable scores. In the one-versus-one approach, a command selected most frequently by the set of SVMs is the candidate command if the SVM approach is the sole classifier. In this example environment where the SVM approach is one of four inputs, scores for each candidate command are provided for operations of two-layer neural network 610.

In one of the analyses (naïve Bayes classifier 608), the user query 302 is provided to a Bayes-theorem based classifier with strong independence assumptions to perform document classification. The naïve Bayes classifier determines a probability that a particular user query (set of features) belongs (i.e. is associated with) a particular class (i.e. command). The classifier naïve Bayes classifier may be trained using a training set of known queries and associated commands. It may be assumed that words of a user query 302 are independent. Frequency of appearance (count) of a word in a given class (command) may be used to determine a probability that a particular word is in a particular class. The score for a particular class is a multiplier of the score (probability) for each word in the query relative to the particular class. Care must be taken when a word never appears in a particular class to avoid multiplying by zero. A smoothing technique can be used to eliminate the effects of zero probabilities in the data.

The Conversational Agent 150 may employ one or more aggregation modules for combining classifiers 602, 604, 606, and 608 and for providing generating a result therefrom. In one embodiment, a two-layer neural network 601 is used to combine scores from classifiers 602, 604, 606, and 608 and to define a single score for each command. More particularly, the scores from the classifiers are used as input nodes to a two-layer neural network which represents a rank function. The set of classifier scores for a single candidate command represents a single input vector. This vector is scored, via the neural network 610, according to its relevance to the user query. Here a score of 1 is considered highly relevant to the user query and a score of 0 is considered irrelevant. Each of the vectors for each command are scored via the rank function and sorted according to their score. Finally, the scores are normalized by dividing each of the scores by the maximum number of scores.

Other aggregation modules may be employed in place of or in conjunction with two-layer neural network 601. In one embodiment, answer ranking module 316 uses a logistic regression analysis to combine classifier scores 602,605, 606,608 and generate a combined ranking result for each candidate command. Logistic regression is a type of regression analysis used for predicting the outcome of a binary dependent variable (a variable which can take only two possible outcomes, e.g. "yes" vs. "no" or "success" vs. "failure") based on one or more predictor variables. For example, in one embodiment, logistic regression analysis takes classifier scores 602,605,606,608 and determines whether candidate command is likely to be correct or not.

In another embodiment, answer ranking module 316 uses a reciprocal rank fusion analysis to combine classifier scores 602,605,606,608 and to generate a combined ranking result (i.e. score) for each candidate command.

Conditional Random Fields

Figure 7:
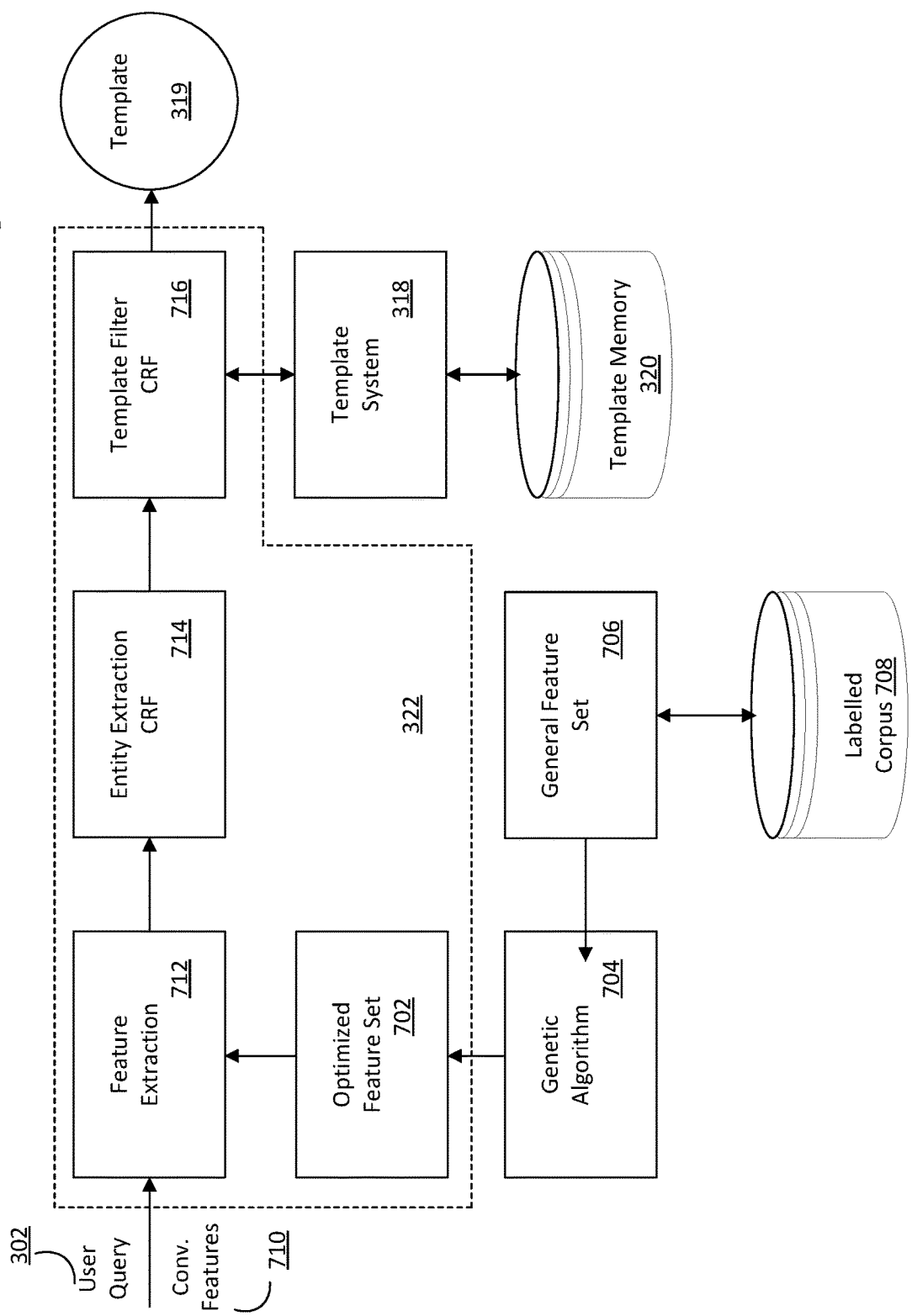
FIG. 7 illustrates a block diagram of modules of an entity Extraction Pipeline performing operations (methods) of entity extraction.

According to one embodiment, the Conversational Agent 150 of the invention may employ one or more Conditional Random Fields ("CRF"s), such as, for example, template filler CRF 716 and entity extraction CRF 714 as shown in FIG. 7. CRFs are a type of discriminative undirected probabilistic graphical model. They are used to encode known relationships between observations and construct consistent interpretations.

In one embodiment, each word in a given user query 302 is evaluated according to at least one CRF to determine whether each word is likely to represent a particular feature. A feature in this context is a property that a given word either has or doesn't have. Examples of features are "Is this word a noun?", "Is this word a city?", "Is this word a song?", "Is this word a preposition" and the like. A CRF decides upon whether a given word has a particular feature according to the following formula:

$$P(\text{Entity}(E)|\text{Feature}(F)) = \alpha e W(T/E) F$$

Where Alpha is the normalization constant and W is the weight vector for the specific entity. Each weight will be associated with a feature.

A CRF for a specific domain requires specific features and entities that are relevant to be identified. As an example, take a scenario of buying a flight ticket. A user may express the query "Find me a ticket from Toronto to New York, leaving on Monday, coming back on Friday". The Conversational Agent 150 processes this user query 302 to identify entities that may be necessary for the Services manager 130 to call an external flight service to process the request. In this particular example, Services Manager 130 may require DEPARTURE_CITY (Toronto), DESTINATION_CITY (New York), DEPARTURE_DATE (coming Monday) AND RETURN_DATE (Friday after the coming Monday). Services Manager 130 may also use TIME, LUXURY_CLASS, COST, CARRIER, STOPOVERS, NUMBER_OF_TICKETS, PRICE, SPECIFIC_GROUP, HOTEL, as well as other entities.

Within the Conversational Agent 150, recognized features may be passed along to a Template Tagger (i.e. Template System 318) which further breaks down the recognized entities into more precise entities. In one embodiment, the first CRF recognizes general features (such as, this word is a city) and the second CRF recognizes specifics of the features (such as, this city is San Francisco).

Once a set of features has been decided for a particular domain, it is necessary to acquire training data, and then have the data labeled with correct entities. The labeled data 708 and general features set 706 are passed along to a genetic algorithm 704 and both conditional random fields (714,716). One a set of training data has been labeled with the correct entities, training of the one or more CRFs is a matter of maximum likelihood learning for P(Ei|Fi; W).

Figure 20:
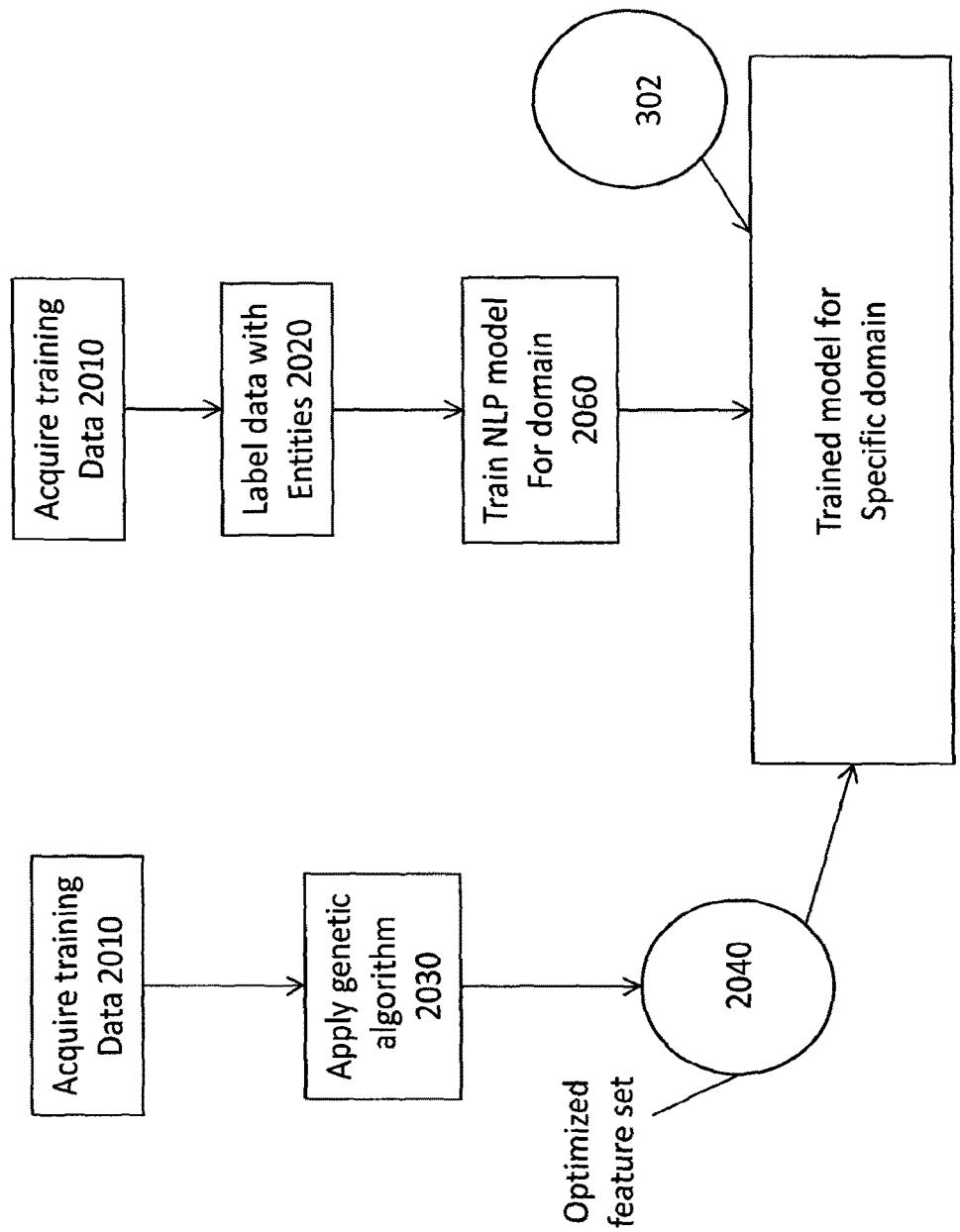
FIG. 20 illustrates a block diagram of adding new domain functionality to the Conversational Agent according to one example embodiment.
Figure 33:
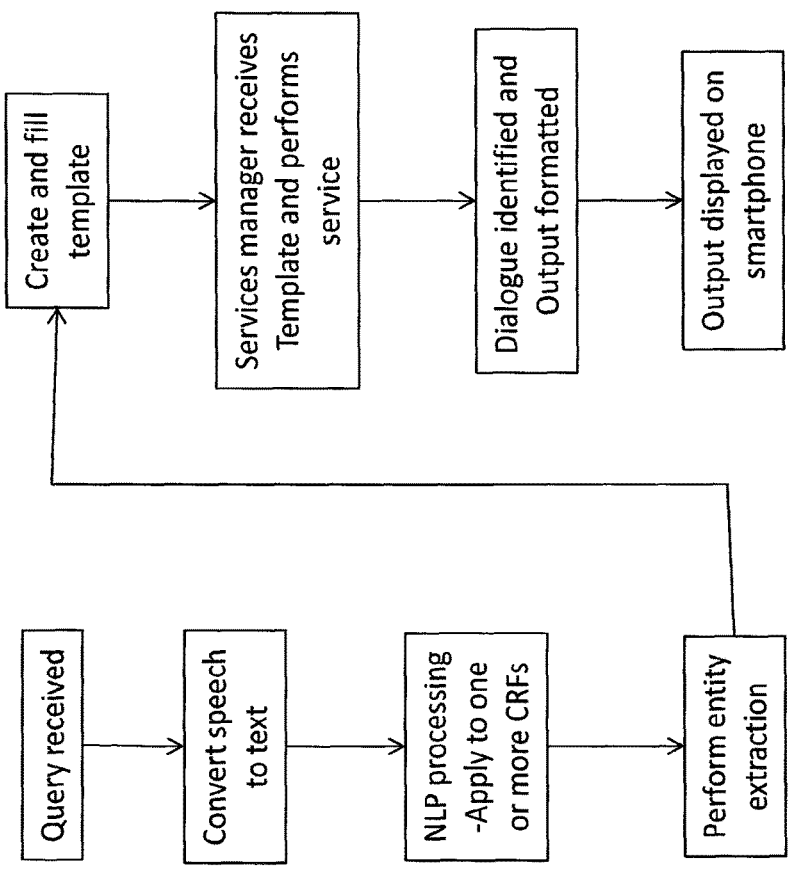
FIG. 33 shows example workflow of processing a user query according to an example embodiment.

Once training has been complete, any new sentence (i.e. user query 302) can be processed by first extracting out features, and then feeding that sentence and the feature set though the one or more CRFs. The process used by the NLP Engine 114 for processing queries 302 according to one embodiment is illustrated in FIG. 20 and FIG. 33.

Genetic Algorithm

Feature selection, and hence optimizing the operation of conditional random fields 714,716 are done via 305. Any combination of features can be used to perform the task of Named Entity Recognition using a CRF. However, the use of a particular feature set may have a dramatic effect on the accuracy of the results. The Conversational Agent may use a genetic algorithm 305 to determine the optimal feature set for a given domain. The challenge of finding the optimal feature set may be thought of as searching the entire space of feature sets for the optimal answer. In order to apply the genetic algorithm, the following mapping from the feature set space to a binary vector space is applied:

Let F be the set of all
features Let V be a
binary vector space Let
f be a particular feature
set Let S be a mapping
F→V
V=S(f) st
V[i]=1 if f contains F[i]
V[i]=0 if f does not contain F[i]

An example of a potential fitness function is made of the f=measure+log(n) where n is the number of features in the feature set. The f-measure is a common accuracy measure for named entity recognition and the log(n) term is added so that the system favors smaller models.

Template System 318

With reference to FIG. 7, a genetic algorithm 702 working on a general feature set 704 determined from a labeled corpus 706 generates (e.g. off-line, in advance of its use in a particular classification instance) optimized feature sets 708 for respective specific domains. Each domain may have its own Extraction Pipeline 322 for extracting entities for the specific domain. For example, the Extraction Pipeline 322 for the RESTAURANT domain is adapted to identify entities related to restaurants such as name, location, cuisine, price, atmosphere, rankings, and the like. Each pipeline instance 322 receives the user query 302 and its conversation features 710. Examples of conversational features 710 include question ID, results of pronoun resolution and/or anaphora resolution with previous sentences, and other related information.

A feature extraction module 712 expands the features associated with the user query 302 and conversation features 710. Examples include date lists, number lists, city lists, time lists, name lists, among others.

The expanded user query 302 and its specific conversation features 712 are fed through the filter created by the genetic algorithm and provided to a previously defined conditional random field (CRF). CRF is a statistical modeling method applied for pattern recognition. Optimized feature sets are used to define the filter and to train the CRF. The CRF is trained with specific features decided by the genetic algorithm. After it is trained with specific features, the CRF is configured (i.e. biased) to expect those features in the future. The system ensures that the CRF only gets the features it is expecting.

In the illustrated embodiment, two layers of CRF are employed. A first layer determines general entities (e.g. an entity extraction CRF 714). For example, in a travel booking user interface, general entities may include date, place, time, etc. A second layer determines more specific template entities (e.g. a template filler extraction CRF 716) such as destination, departure location, departure date to fill templates of the Template System 318. In some embodiment, a single layer CRF may be employed. Template System 318 may store (e.g. to template memory store 320) the filled or partially filled template for a particular command as user queries are processed.

Services Manager 130

A Services Manager 130 may be provided for executing and/or performing a command according to the derived user intent. Services Manager 130 may interface with one or several internal 120 and/or external services 118 via an application programming interface, a predefined protocol, and/or the like. In an embodiment, Services Manager 130 performs a requested command (or groups of commands) based on a filled or partially filled template 319 provided by NLP Engine 114. In one embodiment, template 319 is filled with entity information by the NLP Engine 114 as described above with respect to named entity recognition and entity extraction, which then passes template 319 to the Services Manager 130. The derived user intent may be combined with some or all of the rich information described herein to further complete template 319. Services Manager 130 in one embodiment evaluates the content of template 319 to determine if the command requested (according to derived user intent) can be performed. In one embodiment, Services Manager 130 may select a service from a collection of services that are able to perform substantially the same command (i.e. offer substantially similar functionality).

By way of example, a user may express the query 302 "Show me the weather for Singapore for the next two weeks". Natural language processing engine 114 may receive the query 302 from the delegate 108, and fill out a template 319 with the entities that can be extracted from the query 302, as well as from rich information (described further below). NLP Engine 114 may pass the template 319 back to the Delegate Service 108 for routing to the Services Manager 130 and/or directly route the template 319 to the Services Manager 130. In an embodiment, Services Manager 130 evaluates template 319 to determine several pieces of information. First, Services Manager 130 obtains the domain that the query 302 relates to (in this example, WEATHER) as well as any subdomains if applicable. A subdomain of the domain WEATHER may be for example "weather forecast", "weather history", "weather maps", etc. In this case, Services Manager 130 may identify the query as relating to the subdomain "weather forecast". Services Manager 130 may then refer to a list of applicable services that related to the domain/subdomain to determine which of the services are operable to perform the desired command and/or similar commands. Services Manager 130 and/or another module of Conversational Agent 150 may maintain the list of applicable services and their related domains/subdomain as well as interfacing instructions for each applicable service 118, 120. The list of services categorized by domain and/or subdomain may be stored in memory by Services Manager 130 and updated accordingly. In an embodiment, Services Manager 130 dynamically creates, updates, stores, optimizes, etc. the list of services 118,120 as new domains are added to the functionality of Conversational Agent 150 and/or as new third-party functionality is integrated into the Conversational Agent 150 by interfaces 118,120.

Once the Services Manager 130 has identified the service(s) 118,120 that are available to perform the command according to the derived user intent, Services Manager 130 may select an appropriate service to execute the command. Services Manager 130 may select the appropriate service based on one or more criteria such as user satisfaction with a particular service, traffic load on services, amount of information contained (i.e. the entities available) in the template 319, etc. As an example, a user may express a query 302 "Get me a flight to San Francisco leaving on Friday". NLP Engine 114 identifies the user query 302 as a query relating to the TRAVEL domain and flight booking subdomain, extracts the relevant entities from the user query, and fills out template 319 with the extracted entities. As an example, template 319 filled in with relevant entities may be illustrated as follows:

```
        <Template name="flight">
        <TemplateObject slotKey="TO" value="San Francisco"/>
        <TemplateObject slotKey="DEPARTUREDAY"
priorityGroup=0 groupTogether=true value="March 16, 2012" />
        <TemplateObject slotKey="RETURNDAY" priorityGroup=0
groupTogether=true />
        <TemplateObject slotKey="FROM" priorityGroup=1
groupTogether=true value="Toronto" />
        <TemplateObject slotKey="LUXURY" priorityGroup=2
groupTogether=false />
        <TemplateObject slotKey="RETURNTIME" priorityGroup=3
groupTogether=true />
        <TemplateObject slotKey="DEPARTURETIME"
priorityGroup=4 groupTogether=true />
        <TemplateObject slotKey="PRICE" priorityGroup=4
groupTogether=false />
        <TemplateObject slotKey="SPECIFICGROUP"
priorityGroup=5 groupTogether=false />
        <TemplateObject slotKey="CARRIER" priorityGroup=5
groupTogether=false />
        <TemplateObject slotKey="NUMBERATICKETS"
priorityGroup=5 groupTogether=false />
        <TemplateObject slotKey="NUMBERCTICKETS"
priorityGroup=5 groupTogether=false />
      <TemplateObject slotKey="NUMBERSTICKETS" priorityGroup=5
groupTogether=false />
        </Template>
```

In the example template 319, NLP Engine 114 is able to extract the entities directly out of the user query 302, for example, the destination city of "San Francisco" and the departure date of "Mar. 16, 2012". In an embodiment, NLP Engine 114 may apply user settings and/or preferences such as "Look for one-way tickets if return date not entered" and "Use current GPS location for departure city", in this case, Toronto. NLP Engine 114 may pass this partially completed template 319 to Services Manager 130 for handling as described herein. When Services Manager 130 receives template 319, Services Manager 130 selects appropriate services 118,120 from a services list for the TRAVEL domain, flight subdomain, and may apply additional logic to select the appropriate service. For example, Services Manager 130 may determine that four external services are available for booking flights. In this example, these services are labeled S1, S2, S3 and S4 for convenience. Services Manager 130 may then apply logic to determine which of S1, S2, S3 and S4 are most appropriate to call according to the derived user intent, as well as to provide a high level of user satisfaction. Continuing this example, Services Manager 130 may determine that service S1 does not list flights for San Francisco and is therefore not an appropriate service to call; Services Manager 130 may also determine that service S2 is currently down (i.e. not available), and therefore is not an appropriate service to call. Because only service S3 and service S4 are appropriate for executing a command according to the derived user intent, Services Manager 130 may analyze user satisfaction ratings for S3 and S4. In finding that S3 has a higher user satisfaction rating, and/or that S3 is preferred to S4 by the current user, Services Manager then calls S3 which returns a result to the Services Manager. In one embodiment, Services Manager 130 analyses other user preferences such as "Default to dates are flexible" to determine the appropriate service. For example, if "Dates are flexible" is set or defaulted to be TRUE, Services Manager 130 evaluates the appropriate services 118,120 to determine if they are capable of executing a command according to the derived user intent and user preferences. Continuing with the above example, Services Manager 130 has already determined that only services S3 and S4 are available and/or capable of executing the desired user command. Services Manager 130 then determines that service S3 is not capable of searching for flights with flexible dates, and therefore after applying logic, Services Manager calls service S4 which returns a result. If for example, both S3 and S4 are incapable of searching for flights by flexible dates, Services Manager 130 may still select one or both services S3 and S4 to call by providing default dates.

Clarification type questions may be generated by Dialogue Manager 116. Each class (i.e. command) may have a predefined clarification dialogue or multiple dialogues that are assembled using natural language generation. Dialogue Manager 116 generates questions providing specific alternatives among the classes, e.g. Did you want to <class 1>, <class 2>, <class 3>? Continuing the example, for the user query "Tell Bob I want a meeting on Thursday" a possible clarification response question generated by dialogue driver may be "Did you want to text, email or book a meeting?" Dialogue Manager 116 passes the desired command and extracted entities to the Delegate Service 108 for example, to invoke a particular function via Services Manager 130.

Dialogue Manager 116 and Topic Board 1830

Figure 18:
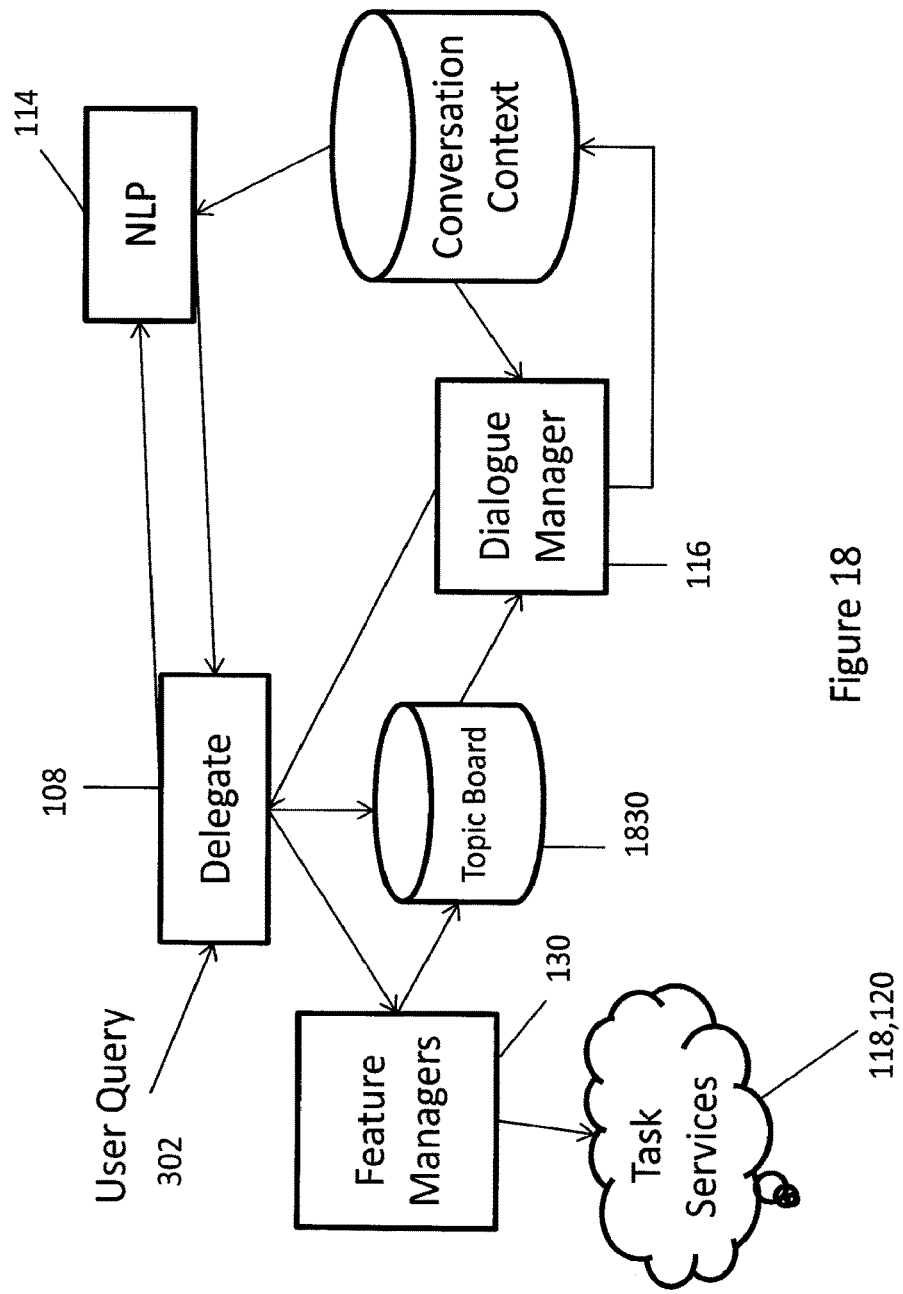
FIG. 18 illustrates a block diagram of dialogue workflow in accordance with one embodiment.

Dialogue Manager 116 is operable to provide a variety of functions such as, but not including, domain modularization, disambiguation, mixed initiative, Personalization/recommendation/intent recognition, subtask (resumption), confirmation, each of which is described in more detail below (see too FIG. 18).

Dialogue Manager 116 maintains conversation/system state and generates responses (output 304) based on the state of the conversation, the current domain being discussed by the user, entities that may need to be filled (by eliciting clarification questions), response from services 118,120, and the like. Dialogue Manager 116 may be configured as a finite state machine. Markov decision process (MDP) or partially observable MDP (POMDP) techniques may be used for determining actions of the Dialogue Manager 116. States may comprise entity, clarification, speech error, NLP error, unknown request, informative response and the like. The operation of Dialogue Manager 116 will be described in more detail below.

As mentioned above, Delegate Service 108 may receive user query 302 and may communicate user query 302, relevant metadata and/or a modified user query 302 to other modules/managers/services of the present invention. In one embodiment, Delegate Service 108 directs user query 302 to NLP Engine 114 to extract a representation of the intent of user, an associated command, and one or more parameters. NLP Engine 114 may return the derived information representing the user intent back to the Delegate Service 108 for further processing and/or store the information in the Topic Board 1830. In one embodiment, NLP Engine 114 uses a Template Tagger (i.e. Extraction Pipeline 322) to create and populate template object 319 and then communicates (directly or via Delegate Service 108) the template 319 to Services Manager 130 for accomplishing the command according to the derived user intent.

Topic Board 1830 may be a database, a data structure, instantiated objects, a log file, and the like. Topic Board 1830 may be used by the Delegate Service 108 to store rich information about a user conversation, user session, and/or user history. In an embodiment, Topic Board may store the following information: user query 302, entire conversation transcript, NLP domain classification, identified task, filled entities, etc. Topic Board 1830 may be adapted to act as a parallel agenda in that Topic Board 1830 may keep track of, monitor, detect events, etc related. to any number of simultaneous conversations that the user is engaging in with the smartphone 102.

Figure 41:
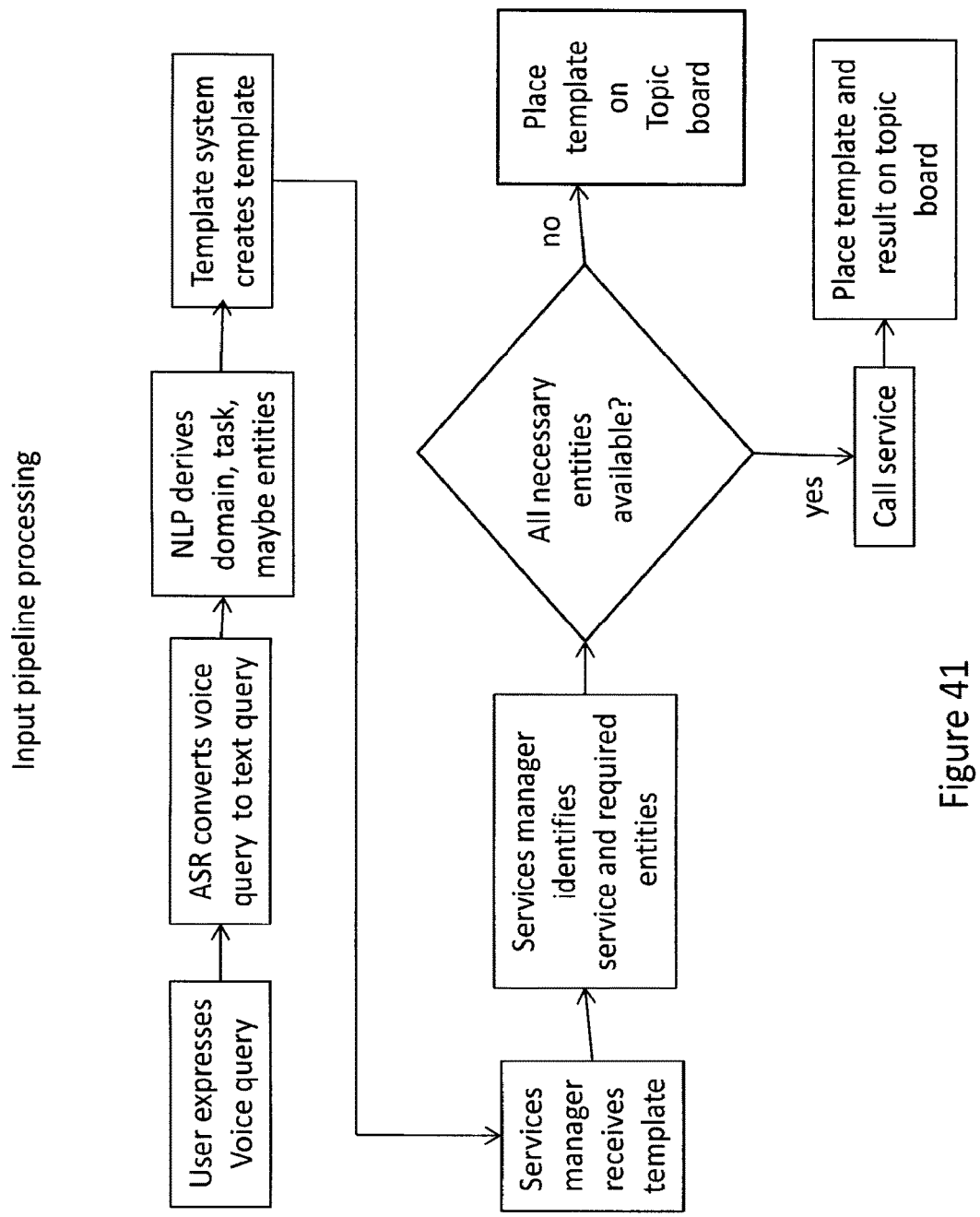
FIG. 41 shows a block diagram of an input pipeline of a Conversational Agent performing operations (methods) according to one embodiment.
Figure 42:
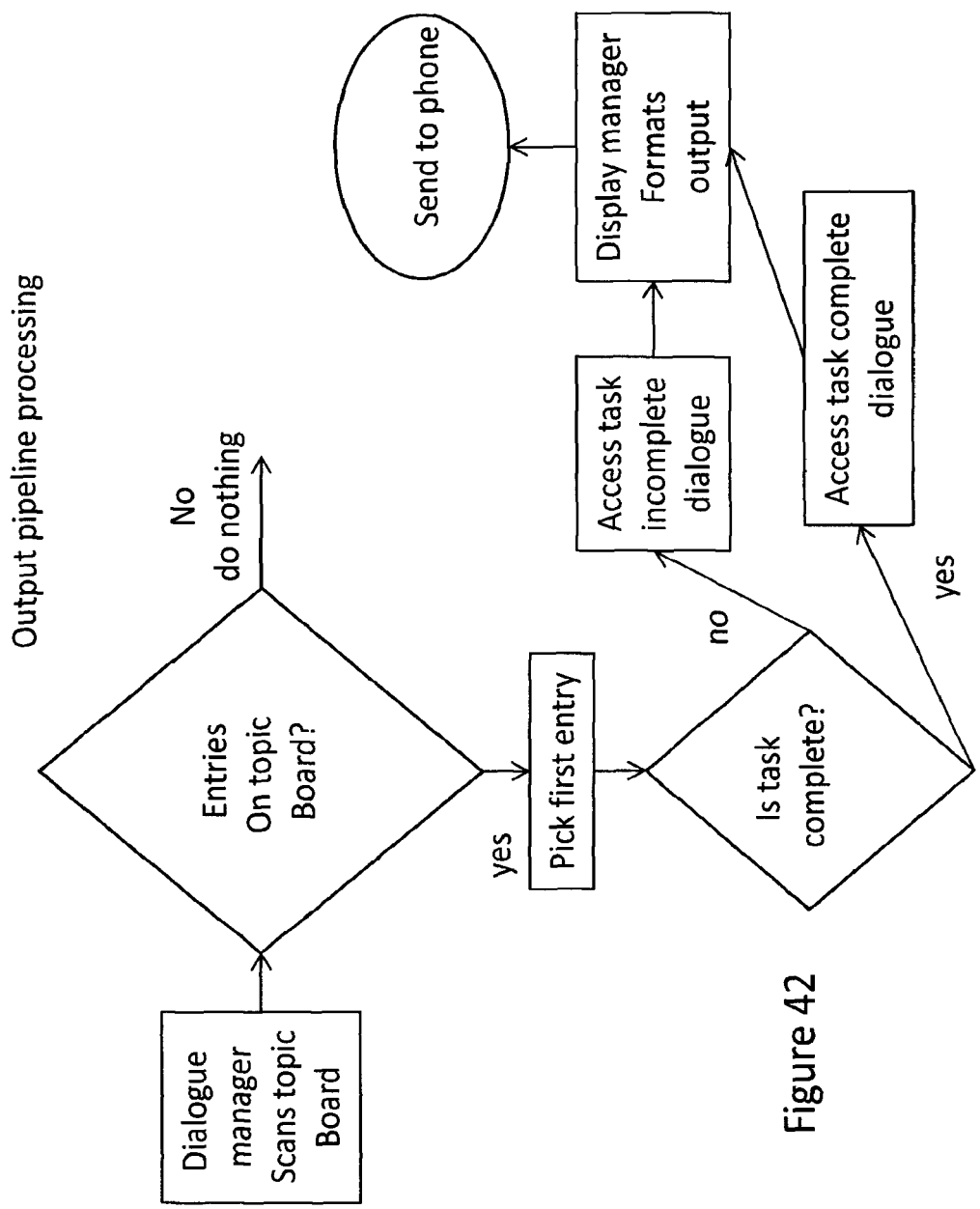
FIG. 42 shows a block diagram of an output pipeline of a Conversational Agent performing operations (methods) according to one embodiment.

FIG. 19 illustrates the conversation flow between a user of a smartphone 102 and the Conversational Agent 150. Conversational Agent 150 may include an input pipeline 1910 for managing input queries 302 from the user as well as commands coordinated by Services Manager 130. Additional details of input pipeline 1910 processing are illustrated in FIG. 41 in accordance with one embodiment. Output pipeline 1920 manages the dialogue interaction (as well as other Ux modes) between the user and Conversational Agent 150 as well as the rendering output to be presented on the smartphone 102. Additional details of output pipeline 1920 processing are illustrated in FIG. 42 in accordance with one embodiment. Topic Board 1830 may be an organized electronic data storage collection (such as a database), which acts a link between input pipeline 1910 and output pipeline 1920. Topic Board 1830 may include, for example, incomplete templates (i.e. templates that do not have enough entities filled in to make an internal and/or external service call) as well as result information from templates 319 that were successfully executed via external/internal services 118, 120. Topic Board 1830 thus allows modules in the input pipeline 1910 (for example, Delegate Service 108, Services Manager 130, NLP Engine 114, etc.) to process an input query 302, save the state of the command according to the intention derived from the input query 302 (for example, if more information needed in template 319 to perform a command, or the command has been completed by services 118,120) and to release any data the modules 108,130,114 may be storing and the modules may then be destroyed and/or released. The architecture illustrated in FIG. 19 allows modules 108, 130, 114, 116, etc. as well as other services spawned by the modules, to be lightweight and use a minimum amount of memory, as data is quickly gathered and stored in Topic Board 1830, and the modules are then released.

Dialogue Manager 116 may be operable to periodically scan Topic Board 1830 to determine an appropriate presentation order of results received from services 118,120 and the associated conversational and/or output dialogue to be presented on the App 101 of smartphone 102. For example, Dialogue Manager 116 may scan Topic Board 1830 and see a single entry which is an incomplete template 319. The template 319 is incomplete in the sense that template 319 did not have the required entities filled in so that Services Manager 130 could not perform a command via internal and/or external services 118,120 according to a derived intention of the user. Continuing the example, Dialogue Manager 116 accesses Topic Board 1830 and determines that more information (i.e. entities) are needed from the user so that Services Manager 130 can perform a command according to derived user intent. Dialogue Manager 116 may have access (via a dialogue database) to a predetermined collection of dialogue statements (i.e. clarification questions) designed to elicit entities from a user so that a given template 319 may be populated. In one embodiment, Dialogue Manager 116 may generate dialogue using natural language generation technology to elicit additional entities from the user.

In an example interaction, a user expresses a user query 302 such as "Get me a flight from Toronto to New York, leaving on April 9th coming back on April 15th". NLP Engine 114 receives the user query 302 via the Delegate Service 108 and processes the user query 302 as described herein. NLP Engine 114 recognizes the user intention relates to a domain such as TRAVEL, subgroup flights, and recognizes certain entities such as Toronto, New York, April 9th, and April 15th. A Template Tagger 318 may be employed to create a template object 319 with the relevant information of the derived user intention. A possible template 319 for this example interaction may look as follows:

```
Template name="flight":>
    <TemplateObject slotKey="TO" priorityGroup=0 groupTogether=true value="New York"/>
    <TemplateObject slotKey="DEPARTUREDAY" priorityGroup=0 groupTogether=true value="April 9, 2012"/>
    <TemplateObject slotKey="RETURNDAY" priorityGroup=0 groupTogether=true value="April 15, 2012"/>
    <TemplateObject slotKey="FROM" priorityGroup=1 groupTogether=true value="Toronto"/>
    <TemplateObject slotKey="LUXURY" priorityGroup=2 groupTogether=false />
    <TemplateObject slotKey="RETURNTIME" priorityGroup=3 groupTogether=true />
    <TemplateObject slotKey="DEPARTURETIME" priorityGroup=4 groupTogether=true />
    <TemplateObject slotKey="PRICE" priorityGroup=4 groupTogether=false />
    <TemplateObject slotKey="SPECIFICGROUP" priorityGroup=5 groupTogether=false />
    <TemplateObject slotKey="CARRIER" priorityGroup=5 groupTogether=false />
    <TemplateObject slotKey="NUMBERATICKETS" priorityGroup=5 groupTogether=false />
    <TemplateObject slotKey="NUMBERCTICKETS" priorityGroup=5 groupTogether=false />
    <TemplateObject slotKey="NUMBERSTICKETS" priorityGroup=5 groupTogether=false />
</Template>
```

As shown above, example template 319 is in the form of an XML file; however, other formats can be used to store and communicate domains, subgroups, entities, etc. between modules of the Conversational Agent 150. The tag "value" with an associated string in quotations indicates that a particular entity has been filled. In this example, TO, FROM, DEPARTUREDAY, and RETURNDAY have their respective "value" field filled. It will of course be appreciated that the above tag names and entity types are merely exemplary, and that embodiments of the invention may employ a variety of template formats, tag names, specific entities for a particular domain and across several domains.

Dialogue Manager 116 may access template 319 from Topic Board 1830 as described above and generate dialogue to elicit additional entities from the user. Continuing the example, Dialogue Manager 116 may employ logic to determine which entities must be filled so that Services Manager 130 may correctly interface with a service 118,120. Say for example that in one embodiment the entities LUXURY and NUMBERATICKETS must be filled for Services Manager 130 to interface with services 118,120. Dialogue Manager 116 may access a dialogue collection to generate dialogue configured to elicit entity information from the user. The dialogue questions identified may related to each entity, a collection of entities, and/or may be created by concatenating several dialogue statements together using natural language generation. Dialogue Manager 116 may produce an output question such as "How many tickets would you like to purchase for this flight?" Display Manager 142 may format the dialogue question together with any flight results already found by Services Manager 130 and format the presentation of the output in an appropriate format. Ux Manager 103 displays the flight results together with the output question "How many tickets would you like to purchase for the flight". A user may respond to the questions by expressing a query 302 such as "two tickets", "two", "two please", "please give me two tickets", and the like, and/or by inputting the number of tickets in another input mode such as via the touchscreen In one embodiment, Dialogue Manager 116 is operable to generate compound entity-eliciting questions. In the above example, Dialogue Manager 116 may generate a question such as "Please tell me the luxury level and the number of tickets you would like?" In one embodiment, Dialogue Manager 116 may randomly select an appropriate entity eliciting question from a corpus of suitable questions (i.e. questions designed to elicit one or more particular entities), so that the interaction between a user and the Conversational Agent is unpredictable and refreshing to a user as different dialogue questions may be outputted to the user for a single entity.

Figure 10:
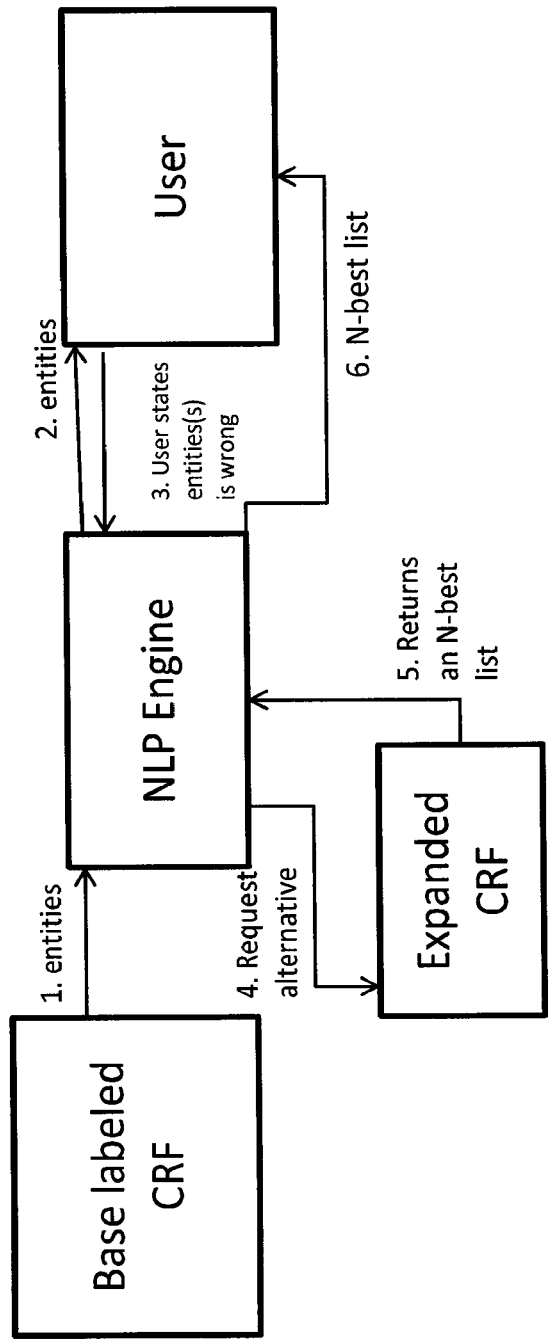
FIG. 10 illustrates a block diagram of a natural language processing engine interfacing with conditional random fields in accordance with one embodiment.

Referring to FIG. 10, a process and system are illustrated for extending the entities supported by a particular domain using minimal tagged data (i.e. using a training data set of a relatively small size). A Base labeled CRF is trained using the training data in which entities are already tagged. When a user asks a query, the NLP Engine communicates with the Base labeled CRF and requests the Base labeled CRF to extract any entities from the query. The Base labeled CRF extracts the entities embodied in the query, and directs such entities to the NLP Engine (1). The NLP Engine provides the extracted entities to the user by displaying or otherwise communicating the entities to the user (2). The user proceeds with their interaction by accepting the entities provided at (2) or communicating that the entities are incorrect (3) and/or not acceptable to the user's intention in asking the query.

The NLP Engine may interface with a second CRF (Expanded CRF) that is configured to provide additional entities that may better match the entities embodied with the query (4). In various embodiments, the Expanded CRF may be a CRF such as the Base labeled CRF together with one or more data sources of similar entities supported by the Base labeled CRF. For example, the Expanded CRF may include one or more data sources having synonyms, geographic data, restaurant data, contact information, etc. that may be used in conjunction with the Base labeled CRF to extend the breadth of entities that are supported by the Base labeled CRF. The Expanded CRF returns an "N-best list" of possible entities to the NLP Engine (5), which are then displayed or otherwise communicated to the user (6). "N" is a whole number such as 5 that may be set by an administrator of the system and/or the user. The user may choose one of the entities provided as best matching the user's intention, or the user may reject all of the entities provided by the Expanded CRF.

Figures 11, 12, 13:
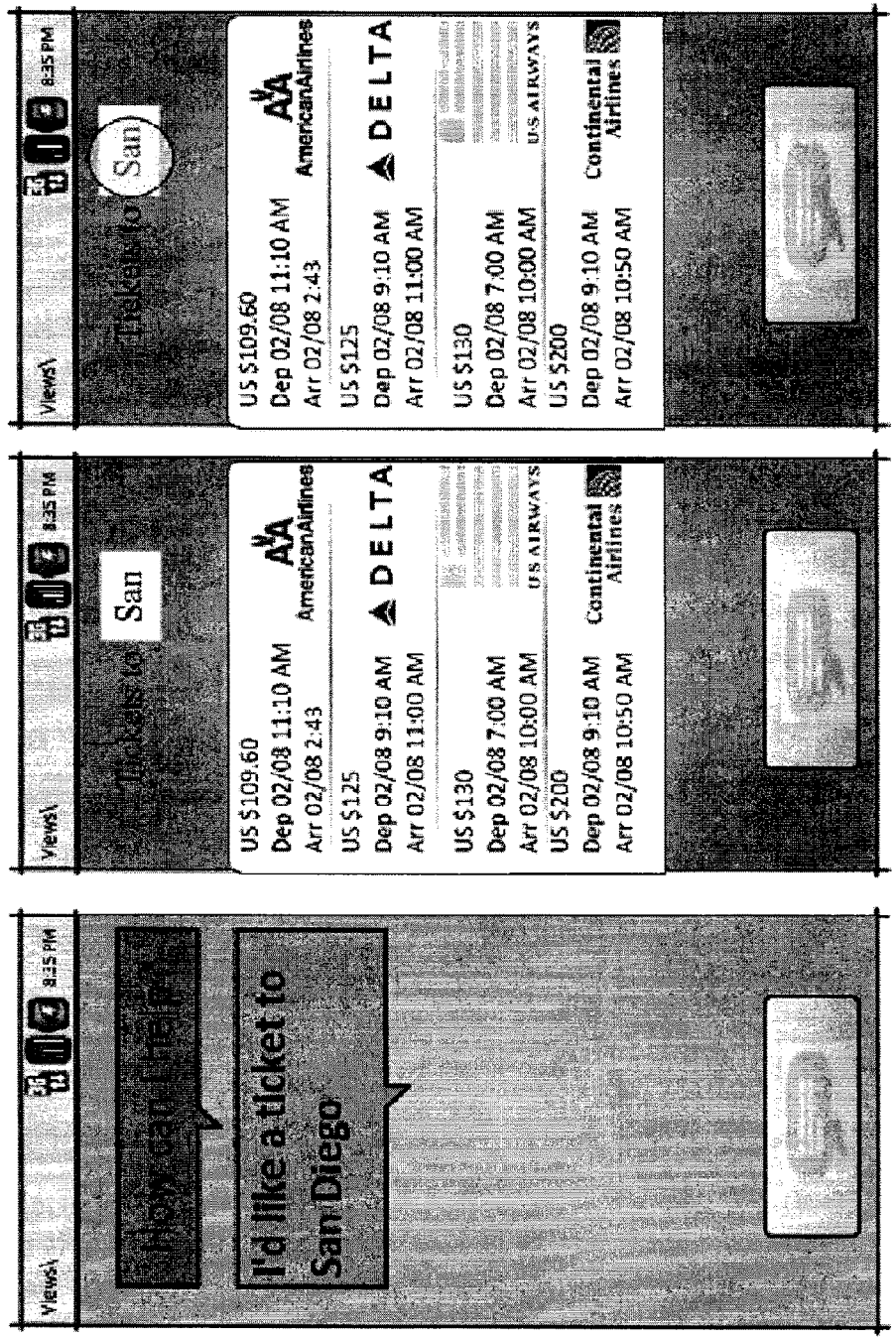
FIG. 11 shows an example user interface displaying an example interaction with one embodiment.
FIGS. 12 and 13 show an example user interface continuing the user interaction from FIG. 11.

FIGS. 11-15 illustrate the interaction of the user with the entities provided by the CRFs described with respect to the FIG. 10. In FIG. 11, the user utters a query to the conversational agent 150 such as "I'd like a ticket to San Diego". As shown in FIG. 10, the query is provided to the NLP Engine which may request the base labeled CRF to extract entities from the query, which are then directed and communicated to the user. As shown in FIG. 12, the entity extracted by the base labeled CRF and presented to the user on the display of the user's computing device is "San". In FIG. 13, the user selected the entity "San" (for example, by touching the computing device's touchscreen) which indicates that the user would like to see additional entities (i.e. the entity "San" is not acceptable to the user). The particular interaction shown in FIG. 13, in which the user touches the entity to indicate that the entity is not acceptable, is only one example of the how the interaction may be designed. The user's rejection of the entity may be communicated to the NLP Engine, and as shown in FIG. 10, and the NLP Engine may communicate with the Expanded CRF and request the Expanded CRF to extract additional entities from the query which can then be communicated to the user.

Figure 15:
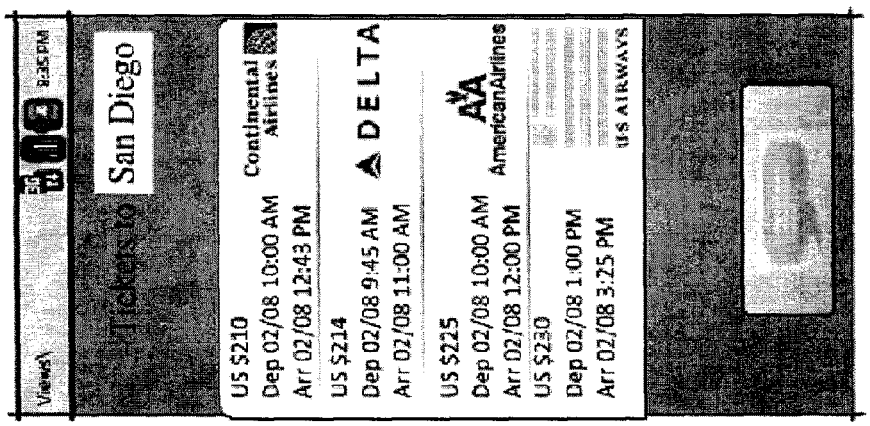
FIG. 15 shows an example user interface continuing the user interaction from FIG. 14.
Figure 14:
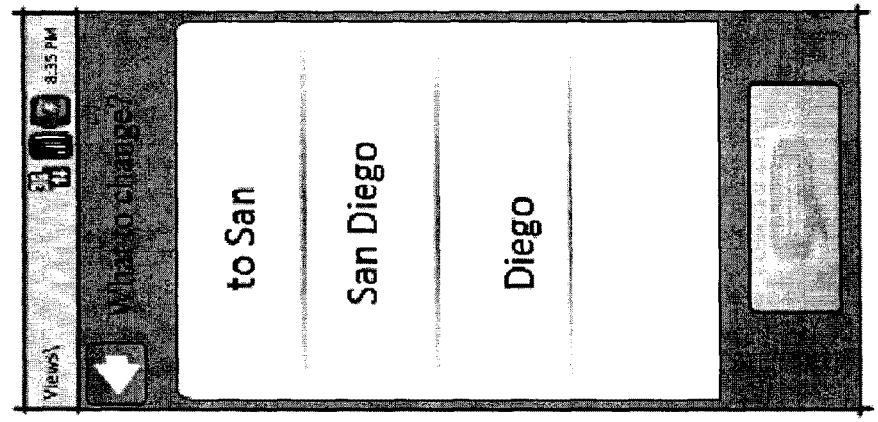
FIG. 14 shows an example user interface continuing the user interaction from FIG. 13.

FIG. 14 shows the additional entities that have been extracted by the Expanded CRF and provided to the user for selection. The N-best list includes three possible entities which as indicated previously may vary depending on the number of entities that are extracted and/or on the settings of the system. The user may select the entity "San Diego", and the conversational agent provides a list of flights to this location (i.e. San Diego) on the device display as shown in FIG. 15.

Figure 16:
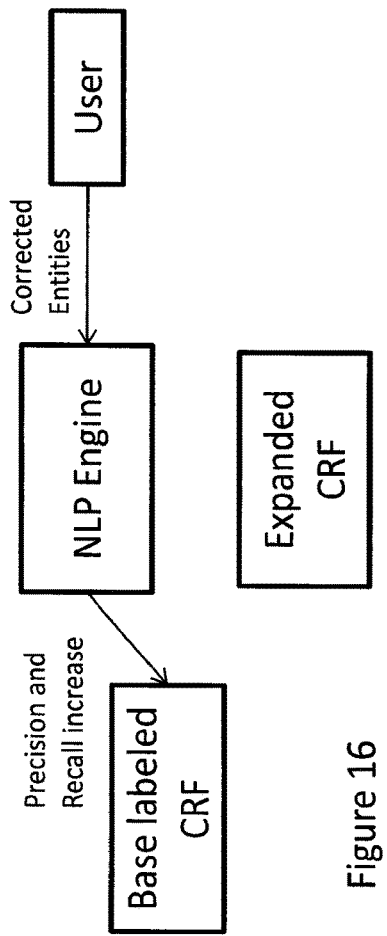
FIG. 16 illustrates a block diagram of natural language processing in which a user selects an option from a list in accordance with one example embodiment.
Figure 17:
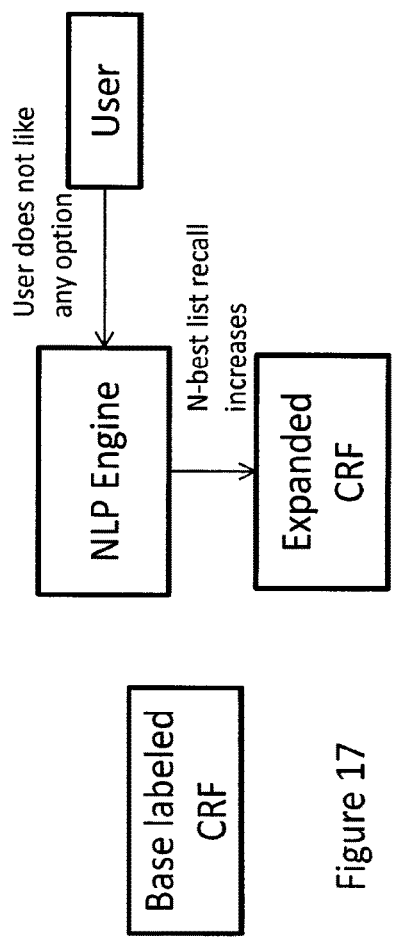
FIG. 17 illustrates a block diagram of natural language processing in which a user does not select an option from a list presented by the user interface.

FIG. 16 illustrates how the process of FIG. 10 (as illustrated by an example in FIGS. 11-15) may improve the performance of the conversational agent 150. If the user selects one of the corrected entities provided by the Expanded CRF, the NLP Engine may provide the selected entity to the Base labeled CRF which increases the precision and recall of the Base labeled CRF. In various embodiments, the Base labeled CRF does not need to be retrained, because the selected entity may be entered into a data source which is referenced by the Base labeled CRF. In other embodiments, the Base labeled CRF may be retrained with the additional entity. As shown in FIG. 17, the recall of the Expanded CRF may be increased in the event that the user does not like any option (i.e. any of the entities communicated to the user) because the Expanded CRF may be modified such that the probability that the entities will be provided to the user based on the same or similar query may be lowered.

Multiple Conversations

Input pipeline 1910, output pipeline 1920 and Topic Board 1830 provide an architecture that allows a user of smartphone 102 to engage in multiple conversations with the Conversational Agent 150 simultaneously and across domains. For example, a user can simultaneously carry on an interactive voice session with the Conversational Agent 150 about diverse domains such as FLIGHTS, WEATHER, RESTAURANTS, NEWS, SOCIAL, SEARCH, KNOWLEDGE, MOVIES, STOCKS, TIME AND ALARM, CALENDAR, etc., the given domains and domain tags (i.e. SEARCH) being purely exemplary.

By way of example, a user may engage in the following conversation with the Conversational Agent 150 by using application 101 on his/her smartphone 102:

U: What's the cheapest flight to Singapore leaving Friday, coming back in two weeks?
CA: Give me a moment please . . .
U: How did the Leafs do last night?
CA: Toronto beat Buffalo 4-1
U: How are they in the standings?
CA: Toronto is 9th place in the Eastern Conference
U: What will the weather be like in Singapore in two weeks:
U: Can you update me on my portfolio please?
CA: I have your flight. Here are the details . . .
. . . user selects and purchases tickets . . .
CA: Here is the forecast in Singapore for the next 14 days
. . . Ux Manager 103 presents forecast on smartphone 102.
CA: Your portfolio is up 1.4% today, here are some more details . . .

In the above interaction the letter 'U' denotes a user query 302 and "CA" denotes a response generated by the Conversational Agent 150 and presented on user interface 105 by Ux Manager 103. The user queries 302 above have initiated processing by the Conversational Agent 150 in several domains, for example TRAVEL, SPORTS, WEATHER, and STOCKS.

FIGS. 43a to 43c illustrate in one embodiment how Topic Board 1830 is used and modified by various modules of the Conversational Agent 150 to accomplish multiple intended actions as derived from user queries 302. Turning to FIG. 43a, Topic Board 1830 has two entries: entry 4310 relating to an intended action in the TRAVEL domain (i.e. flight to Singapore), and entry 4320 relating to an intended action in the SPORTS domain (i.e. Leafs score from last night). NLP Engine 114 receives user query 302 relating to a flight to Singapore and formulates a template object 319. In the process, NLP Engine 114 may make assumptions and/or refer to user preferences regarding other entities such as FROM city, LUXURY, CARRIER, and the like. Services Manager 130 places template 319 onto the Topic Board 1830 at entry 4310 before interfacing with external service 118. Services Manager 130 then interfaces (via an API) with external service 118, which does not immediately return a result. Dialogue Manager 116 periodically scans Topic Board 1830 and identifies the entry 4310 relating to the Singapore flight. Given that action related to entry 4310 is pending, Dialogue Manager 116 generates as response to let the user know the pending status, for example as indicated above, "Give me a moment please . . . "

With query 302 "How did the Leafs do last night?" NLP Engine 114 creates a template object 319 with the domain, subgroup and entities, and directs the template 319 to the Services Manager 130. Services Manager 130 then interfaces with an external sports service 118 which returns the score of the game. Services Manager 130 adds entry 4320 to Topic Board 1830 (including the result from the external sports service 1830) and the memory associated with Services Manager 130 is released. In one embodiment, Services Manager 130 creates a separate entry for each domain to accomplish the command desired by the user according to the derived intent. For example, Services Manager 130 may create a Sports Service that interfaces with external sports service 118 to process sports-related commands.

Dialogue Manager 116 periodically scans Topic Board 1830 and identifies entry 4320. Dialogue Manager 116 removes entry 4320 and Display Manager 142 formats the output for communication to smartphone 102 (FIG. 43b). Ux Manager 103 presents the results to the user with a response such as "Toronto beat Buffalo 4-1".

Referring next to FIG. 43c, the user has expressed two additional queries, one relating to the weather in Singapore, and the second relating to the user's stock portfolio. In each case, NLP Engine has formulated templates 319 and Services Manager 130 has called an appropriate service 118, 120. Given that the queries are not expressed exactly simultaneously, but sequentially by the user, the Conversational Agent 150 may employ two separate Services Managers 130 (i.e. one for each query), each of which is created by the Delegate Service 108 when a new user query 302 is received. The Services Managers 130 add entries 4340 and 4350 indicated that the action is pending before the appropriate external services 118 are called.

Dialogue Manager 116 identifies the entries 4340, 4350 on Topic Board 1830, and this case, decides not to present dialogue to the user interface 105 on the smartphone 102.

In FIG. 43d, the Services Manager 130 related to the flight to Singapore receives a response from the external flight service 118 and Services Manager 130 modifies entry 4310 on Topic Board 1830 by changing the status of entry 4310 from "pending" to "complete". Dialogue Manager 116 picks up the modified entry 4310, recognizes that the travel-related action is complete, and formats the result data with Display Manager 142. Dialogue Manager 116 then removes entry 4310 from Topic Board 1830. Ux Manager 103 presents the flight results to the smartphone 102 with a message such as "I have your flight. Here are the details . . . " and also presents a list of flights results. In this example, the user may select and purchase a ticket, and the confirmation information will also be presented to the user by the Ux Manager 103.

Referring to FIG. 43e, Topic Board 1830 shows that entries 4340 (related to the weather in Singapore) and 4350 (related to the user's stock portfolio) have been updated by changing the result from "pending" to "complete", and the results for each have been stored on Topic Board 1830. As described herein, one services manager 130 performed a command (via interface 118) according to the user's weather query and another services manager 130 performed a command (via interface 118) according to the user's stock query. Each of the Services Managers 130 creates a respective entry in the Topic Board 1830 and includes the result provided by interfaces 118. Dialogue Manager 116, which periodically scans Topic Board 1830, identifies entry 4340 and formats output to send to smartphone 102 using Display Manager 142, the output being presented on the device 102 by Ux Manager 103. Dialogue Manager 116 then removes entry 4340 from Topic Board 1830. Continuing with its scanning of the Topic Board 1830, Dialogue Manager 116 identifies entry 4350 and determines that its status is "complete" and that results are available in the Topic Board 180. Dialogue Manager 116 may then remove entry 4350 from the Topic Board 1830 (which now becomes clear of all entries) and formats output to communicate to the smartphone 102 using Display Manager 142. Ux Manager 103 receives the formatted output and presents the result to the user on the user interface 105 of App 101.

In one embodiment, entries on Topic Board 1830 are given an initial priority level by NLP Engine 114 and/or Services Manager 130. A given entry in Topic Board 1830 may be reassigned a priority level by Dialogue Manager 116, NLP Engine 114 and/or services manager 130 as additional information is elicited from the user. For example, a pending command may receive a priority level of 3, a command that cannot be performed without additional information may receive a priority of 1, and a command that can be performed (i.e. there is sufficient entity information available) however the user should be given a chance to add entities may receive a priority of 2.

Topic Board 1830 may set a priority for each query using a variety of techniques. In one embodiment, Topic Board 1830 may establish a first in has highest priority rule in which each new query receives a highest priority rank as soon as it is passed to Topic Board 1830 by Delegate Service 108. Entries that are already in the Topic Board 1830 may all have their priority decreased using this technique. Topic Board 1830 may also use intelligent logic to determine the priority of each query. For example, Topic Board 1830 may determine that the query "What's the cheapest flight to Singapore leaving Friday, coming back in two weeks?" is a high priority query because the query relates to finding a flight and possible booking tickets for a flight. A user may establish preferences using the Conversational Agent 150 to set which types of queries will automatically have the highest priorities on the Topic Board 1830.

When Dialogue Manager 116 is asked for dialogue from the DelegateService 108, Dialogue Manager 116 takes the highest priority topic and generates dialogue from it. This topic may then be updated with a new priority and put back into the Topic Board 1830. Many different services may put topics into the Topic Board 1830 directly or via another service such as Delegate Service 108.

Delegate Service may ask for dialogue from the Dialogue Manager 116 periodically, in response to returns from service calls and/or at a predefined rate, for example, a certain number of times per second.

In one embodiment, dialogue manager 116 is configured to elicit entities that may be required for a pre-determined template 319 (as required by a specific service 118,120). By way of example, Services Manager 130 may expect flight template 318 to contain the following entities before template is provided to flight service 120: TO, DEPARTUREDAY, RETURNDAY, FROM, LUXURY, RETURNTIME, DEPARTURETIME, PRIVE, SPECIFICGROUP, CARRIER, NUMBERATICKETS In an embodiment, the dialog manager may be operable to elicit the entity information required to call a service and/or entity information may be intelligently filled in depending on user information, user history, GPS coordinates, rules and the like.

For example, in an embodiment, the Conversational Agent may only require the "TO" entity (i.e. the destination city) to be obtained from the user via an input command such as a voice command. The Conversational Agent may then apply a variety of rules to determine the remaining entities that are required to call flight service API. In such an embodiment, Conversational Agent may assume the following:

"FROM" entity (i.e. departure city) is the city where the user is current located. This can be determined by obtaining the GPS coordinates of the smartphone;

"DEPARTUREDAY" entity is as soon possible;

"RETURNDAY" entity is not applicable since the Conversational Agent may assume that the flight is one-way.

FIG. 19 shows a threaded conversation diagram of an embodiment of the Conversational Agent 150. Conversational Agent 150 may implement a service-oriented architecture to provide a horizontally scaled system that provides services to a large volume of simultaneous users. Service oriented architecture implementations may rely on a mesh of software services. Services comprise unassociated, loosely coupled units of functionality that have no calls to each other embedded in them. Each service implements one action, such as checking the news, buying plane tickets or performing an internet search. Rather than services embedding calls to each other in their source code, they use defined protocols that describe how services pass and parse messages using description metadata.

A conversation thread may include an input pipeline 1910 and an output pipeline 1920. A query on a client device is passed to the Delegate Service which is actually a web service. Delegate Service may direct query to NLP which determines a representation of user intent. NLP may communicate the represented user intent feature manager service. Topic Board 1830 and emotion board 1880 are data storage that may comprise any or all of Internal—(Processor registers and cache), Main (the system RAM and controller cards), On-line mass storage (Secondary storage) or Off-line bulk storage (Tertiary and Off-line storage). A conversation thread may be created for every query expressed by the user that is processed by the delegate. Conversation thread is routed by delegate to the appropriate service to derive a representation of the user intent and to extract the features of the query. NLP Engine derives user intent and passes back to Delegate Service.

Domain Manager

According to one embodiment, the conversational agent 150 of the invention may include and/or interface with a dynamic domain knowledge set to intelligently converse with the user, provide information and perform tasks requested by the user, etc. The domain knowledge set may include one or more domain models that are associated with a specific domain. For example, the domain TRAVEL may be associated with a travel model, the domain SPORTS may be associated with a sports model, etc. In one embodiment, each domain model includes one or more statistical models (such as but not limited to SVMs, CRFs, optimized feature sets, naïve Bayes, random forests, neural networks, etc.) that are trained in advance by the Learning Manager 128 (as described below), another component of the Conversational Agent 150, and/or are provided by another service. Each domain model may interface and/or contain data from internal and/or external knowledge sets such as gazetteers. The term Gazetteer in the context of this specification may refer to geographic directory as well as domain-specific lists such as professional jargon (for example, Medical, legal, etc.), regional and/or cultural terms, names of people, song, artist and album list, movie titles, famous personalities, etc.

The domain knowledge set is dynamic in that new domain models may be added to the domain knowledge set in real-time, and existing domains models are constantly being updated with user queries, common phrases, sentences, synonyms, technical terms, etc. to make the system more accurate. The domains models available to a particular user may be circumscribed depending on the user's account status, preferences, commonly accesses subject matter, etc.

The domain manager 126 may add new domains to the system of the invention without necessarily changing the underlying code and architecture of the conversational agent 150 significantly and/or at all. New domain models may be added to the conversational agent 150 in a plug and play manner allowing a user to converse about a new topic (related to the newly added domain models) and obtain new functions related to the new domain models.

In one embodiment, domain manager 126 communicates with learning manager 128 to ensure that new domain models are pretrained prior to the domain manager 126 incorporating a new domain model into the functionality of the conversational agent 150. In one embodiment, the dialogue manager 116 may inform the user of new functionality by presenting and/or voicing a "new domain added" message, and display manager 142 may also add examples of new example interactions that that the user may now engage in.

Example Domains and Interactions

Alarms and Reminders

The Conversational Agent 150 of the invention may provide an alarm and reminder service for a user of a smartphone 102. A user interacts with the alarm/reminder service by entering input into the smartphone, for example, by expressing a user query 302, using the touchscreen, keyboard, and the like, and any combination thereof. For example, a user may set an alarm by expressing a user query such as "Set an alarm for 6 am tomorrow". As described above, one or more microphones on the smartphone convert the sound waves of the expressed query into a digital audio format such as a pulse-code modulation format (PCM). A speech recognition engine receives the PCM audio file and may convert the audio file to text. The speech recognition engine 112 may reside on the device 102 and/or in the cloud-based infrastructure 104. The text string generated by the speech recognition module from the PCM audio file is the user query 302. The user query 302 may be passed to the Delegate Service 108 for processing which may direct the user query to the NLP Engine 114, which is adapted to derive a representation of the desired user intent, including identifying a domain and/or subdomain, at least one command, and at least one parameter and/or entity relating to the command.

In the example given above, the NLP Engine 114 determines that the user query 302 relates to a command in the ALARM/REMINDER domain. NLP Engine 114 may further determine that the user query 302 relates to a command such as "set an alarm" which may use parameters, such as "6 a.m." and a date, for example, "Apr. 8, 2012". NLP Engine 114 may create an object (such as template object 319) that is then passed to the Services Manager 130 for processing.

The Conversational Agent 150 of the invention may provide a reminder service for a user of a smartphone 102. A user may express a user query such as "Remind me to go to the gym at 3 pm" to accomplish a desired command such as setting a reminder. The NLP Engine 114 processes this user query 302 and determines that it relates to a command such as "set a reminder" which may use parameters, such as "3 p.m." as well as a string, for example, "Go the gym". After determining the user intent, NLP Engine 114 may pass a template object 319 with this information to the Services Manager 130 for performing the reminder command. Alarms, reminders, timers and the like may use an internal service 120 on smartphone 102 which may be accessible an API 120. The internal 120 service may then process the reminder and/or alarm command according to the functionality of the particular service available on the smartphone 102

In one embodiment, conversational agent 150 may transfer control to the internal service 120 called so that a result may be displayed to a user on the smartphone 102. In one embodiment, conversational agent 150 instructs service 120 to perform a command, however, conversational agent 150 displays a confirmation message that the command has been performed and/or embeds the service 120 into the user interface 105 so that the service becomes an interactive control on the conversational agent 150.

In another embodiment, the Conversational Agent 150 may provide its own alarm/reminder service to use in combination with and/or in place of the internal alarm/reminder service. The alarm/reminder service may reside in cloud-based infrastructure 104 and/or on a client device 102.

In one embodiment, the Conversational Agent 150 is configured to implement an event notification service 110 for monitoring events, including events generated by services 120 that may be desirable to communicate to a user via the user interface 105. For example, a user may set a reminder by conversationally interacting with the conversational agent 150 such as "Remind me at 6 pm to pick up groceries". In this example, Conversational Agent 150 calls an internal service 120 and the internal service executes the desired command (i.e. service 120 sets the reminder and includes the reminder message). The internal service 120 may process the reminder and notify the user at 6 pm. Event notification service 110 may monitor smartphone events 102, such as reminders that go off, and process the reminder through the user interface 105 to communicate the reminder to the user.

In one embodiment, the Conversational Agent 150 may provide an alarm/reminder service 120 that is able to provide functionality based on location and/or another class of parameters. For example, a user may express the user query "remind to pick up milk when I am near a grocery store". Such a user query 302 contains ambiguous terms such as "near" and undefined location such as "a grocery store". The Conversational Agent 150 of the invention is able to process and make semantic sense of such a query 302, as well as provide useful functionality to the user according to the derived user intent. For example, the NLP Engine 114 may determine that the user query 302 relates to the ALARM/REMINDER domain, and perhaps the "set reminder" subdomain. NLP Engine 114 may further determine the "a grocery store" is a general class of locations; the applicability of any given grocery store being undetermined. In addition, NLP Engine 114 may attach meaning to the word "near" such as within a 1 km radius, or 100 m radius etc. The applicable radius for this user query 302 may be based on a user preference, intelligent information derived from user mobility patterns, default settings and the like.

In this example, after receiving template 319 with a representation of the derived user intent, Services Manager 130 may build a list of all grocery stores within a certain distance from the user's current location (as provided by GPS service 120). Services manager 130 may periodically obtain the user's current GPS coordinates and compare the GPS coordinates to the location of grocery stores in the list. Once the user's position is within a predefined distance from any given grocery store, the conversational agent 150 may notify the user that he/she is near a grocery store and may also provide directions to the grocery store.

In one embodiment, the Conversational Agent 150 optimizes its use of an internal GPS service 120, because scanning the GPS coordinates of a device 102 uses the smartphone's battery power. Calling a GPS service 120 too often may result in the battery of the device 102 draining faster than is acceptable to a user. In this embodiment, Conversational Agent 150 varies its rate of interfacing with GPS service 120 depending on the distance between the smartphone 102 and the grocery stores that are in the list of grocery stores previously created and/or updated by the conversational agent 150. For further clarity, say that the closest grocery store to the user's current location is located 15 kilometers away from the user's current location as provided by GPS service 120. Conversational Agent 150 may determine that a user cannot get to the closest grocery store in less than fifteen minutes (for example), and therefore, may not access GPS service 120 for another fifteen minutes. After each call to the GPS service 120, Conversational Agent 150 may compute the length of time to wait before calling GPS service 120 again, based at least partly on the user's current location relative to the closest location in the list.

Music

The Conversational Agent 150 according to an embodiment of the invention may provide music functionality to a user of a smartphone 102. In an embodiment, the music functionality includes: playing a song by title, artist, album, genre, ratings; playing albums by artist, year, genre, rating, length; dynamically creating and playing playlists; locating, playing, downloading, etc. songs and albums from third party services, and well as additional functionality.

A user may interface with the music service 120 by expressing a query 302 and/or in combination with other modes of input such as the touchscreen.

For example, a user may interact with their smartphone 102 by voicing the query 302 "Play me some Madonna". The Delegate Service 108 receives the query 302 in a text string format and directs the query 302 to NLP Engine 114 for processing. By applying the query 302 to one or more CRFs (for example, 714,716) NLP Engine 114 derives that the user intent relates to the domain MUSIC with a entity "Madonna". NLP Engine 114 may create and/or fill a template 319 with the information according to the derived user intent, and pass the template 319 to Services Manager 130. Services Manager 130 receives the template 319 and may apply logic to further fill the template 319 entities. For example, Services Manager 130 may assume and/or use logic to determine that the user wants to hear a song by Madonna, an album by Madonna, a playlist contain Madonna songs, search the internet for Madonna music for download, and/or search and play Internet radio playing Madonna music.

In an embodiment, music service 120 searches music data that the user already has access to on their device 102, in cloud-based service infrastructure 104, and/or available on third-party web services 118 of which the user may or may not have an account. Music service 120 may find Madonna music data (songs, playlists, albums, etc.) that the user has access to and begin playing Madonna music randomly and/or based on previous listening habits of the user. For example, music service 120 may access the user's ratings of must and play Madonna music in order of highest rated to lowest rated. While music is playing, a user may continue to interact with the Conversational Agent 150 by expressing other queries 302.

To optimize the operation of the user interaction with the music service 120 available via conversational agent 150, music service 120 may periodically search a user's device 302 and/or user accounts on the Internet to index songs, playlists, albums and the like. Music service 120 may index such music data every time a user launches the Conversational Agent 150, each time a user turns on their smartphone 102, each time a user accesses the music service 120, and/or at regular intervals.

Music service 120 may transfer some or all indexed music data to cloud-based service infrastructure 104 so that NLP Engine 114, music service 120, and other services 118,120 can easily access and process music data as a user inputs further user queries 302.

Search

According to one embodiment of the invention, the Conversational Agent 150 provides Internet search functionality for a user of a smartphone 302. In one embodiment, the user may express a query 302 that relates to internet search, knowledge search, database searching such as library catalogues, academic databases, mathematical calculations, and the like.

To obtain search results from the Conversational Agent 150, a user inputs a command, for example a voice command, to the App 101 of the Conversational Agent 150 running on smartphone 102. For example, a user may say the following to the Conversational Agent 150 via the App 101 running on the smartphone 102: "What are the tallest mountains in the World?" An automatic speech recognition service 112 receives the voice file in an appropriate format (for example, PCM, mp3, and the like) and performs speech to text operations. The ASR engine 112 may communicate the text user query 302 to the NLP Engine 114 (via the Delegate Service 108 in some embodiments) do derive the intent of the user.

NLP Engine 114 processes the user query 302 to identify a domain, subgroup/subdomain, desired command(s) to perform and any entities if applicable. In the current example, NLP Engine 114 may derive the intention of the user as relating to the SEARCH domain, with the entity "tallest mountains in the World" as a search string. NLP Engine 114 may further identify the query 302 as relating to the subdomain geography. NLP Engine 114 may formulate a template 319 and/or object containing the domain, subdomain and entity for processing by the Services Manager 130. Services Manager 130 receives the template 319 from the NLP Engine 114, the Delegate Service and/or another module and performs logic to identify the appropriate service 118, 120 to call. In one embodiment, Services Manager 130 uses one service 118 for queries 302 relating to mathematical calculations, mathematical and scientific facts and the like; and another service 118 for queries 302 relating to general knowledge. In yet another embodiment, Services Manager 130 interfaces with one or many internet search engines to obtain a result for the query 302. In an embodiment, the Conversational Agent may classify certain queries 302 as relating to a SEARCH domain (which may result in service calls to internet search engines) and other queries 302 as relating to a KNOWLEDGE domain (which may results in service calls to knowledge databases such as TrueKnowledge, Wolfram-Alpha, academic and professional databases, and the like).

Continuing with the example, Services Manager 130 may determine that query 302 "What are the tallest mountains in the world" is a science question (which NLP Engine 114 has identified as relating to subgroup geography) and may therefore call an external API 118 that relates to science and/or geography, and the external service 118 may return a result. Services Manager 130 takes the result (which may be in an XML format, JSON format, and the like) and may add it to the template 319 as a result tag. The final template (with all its content) may be added to the Topic Board 1830 (as a database record for example) where it can be further processed by the Dialogue Manager 116 and produced on the smartphone by the Ux Manager 103.

In one example, NLP Engine 114 looks for keywords such as "search", "find" and the like within the query 302 to perform general internet searches with search engines 118 such as Google, Bing, True Knowledge, Yahoo, and the like. For example, a user may express the query 302 "Search the Internet for the best clubs in Toronto". NLP Engine 114 receives the text version 302 of the audio query and identifies that the user intends to perform an internet search with the string "best clubs in Toronto". NLP Engine 114 creates a template 319 identifying the domain as relating to SEARCH with the string query "best clubs in Toronto" (i.e. search entity) and passes the template 319 to the Services Manager 130. The Services Manager 130 receives the template 319 and may call a default search engine 118 with the entity string, a search engine generally preferred by the user, a search engine that the user prefers for entertainment-type queries, etc. When services manager 130 receives the result from search engine 118, services manager 130 may place the information from the template 319 together with the result on topic board 1830, where there result and any associated dialogue and/or display content such as images may be presented to the user on the app 101.

Chat

The Conversational Agent 150 according to one embodiment of the invention may provide general chat capabilities so that a user of a smartphone 102 may converse with the Conversational Agent 150 on an informal basis similar to how a group of people may converse.

For example, a user may input a voice command 302 such as "I'm feeling pretty excited about the presentation today" to the Conversational Agent 150. In this exemplary case, the user may not intend for their smartphone 102 to perform any action, but instead, the user may desire to engage in conversation with their device 102. The Conversational Agent 150 may process this query 302 in a manner similar to other domains. For example, the above query is converted to text by the ASR engine 112 and the text query 302 may be directed to the NLP Engine 114 for processing. NLP Engine 114 derives the user intent of the query 302 (by at least partly employing the methods illustrated in FIGS. 3 to 8) relating to domain CHAT. Services Manager 130 receives a template object 319 created by the NLP Engine 114 (which may be stored in the Topic Board 1830) and applies logic to call an appropriate service 118,120. Services Manager 130 may use an internal chat service 120, external chat service(s) 118 or a combination thereof. In one embodiment, the Chat Service 118,120 called by the Services Manager 130 receives the text query 302 and may perform one or several algorithms to identify candidate responses.

In one embodiment, the Chat Service 118,120 may include a comprehensive database of queries 302 mapped to candidate responses. The queries 302 may be organized by letter such that the Chat Service 118,120 compares the query string 302 to the database by letter 'I' (the first letter of "I'm feeling . . . ") and looks for the longest best match. Say for example that the longest best match found in the chat database is "I'm feeling pretty excited about the p*", the '*' character indicating a wildcard. The Chat service 118,120 may then look at the candidate responses for the match and select randomly if there are multiple candidate responses available. For example, the Chat service 118,10 may determine that three candidate responses are available for the query match "I'm feeling pretty excited about the p*" and output one of the three randomly for display on the user interface 105 of the app 101 running on smartphone 302. In another embodiment, Chat service 118,120 remembers the most recent output for a particular query 302 so that a different response is generated the next time a user inputs the same or similar query 302. The response received from the Chat service 118,120 may be added to the Topic Board 1830 for processing dialogue manager 116 which may extract the result from the topic board 1830, and together with display manager 142, format an output for display on the user interface 105 of App 101.

In another embodiment, the Chat Service 118,120 of the Conversational Agent 150 may include additional responses with the candidate response found in the chat database. For example, the candidate response chosen by the Chat service 118,120 for the above query 302 may be "That's great to hear". The Chat Service may also add information related to the holidays, the user's personal schedule, user interests such as sport, television, etc, and other customized information. The Chat Service may add this information to the candidate response to generate a longer response such as "That's great to hear, by the way, your favorite team also won the game last night". Another example related to holidays would be "That's great to hear, what a fine St. Patrick's day it is". Another example related to the user's schedule could be "That's great to hear, your afternoon is free by the way". The Chat service may append several different responses to the candidate response, include more information within the candidate response, and/or precede the candidate response with a customized message.

In one embodiment, the Chat service of the Conversational Agent 150 employs natural language generation (NLG) to respond to chat inputs (or inputs relating to other domains) from the user. NLG is the natural language processing task of generating natural language from a machine representation system such as a knowledge base or a logical form.

In one embodiment, the conversational chat dialogue may continue indefinitely. The Conversational Agent 150 may interrupt the chat when appropriate to ask random questions not contained in the chat database and/or to perform commands previously requested by the user. For example, a user may have set an alarm for 5 p.m. which occurs within a chat session. The Chat service may generate the dialogue "That's great to hear, by the way, you asked me to reminder you at 5 p.m. to pick up milk after work".

Transit

According to one embodiment, the Conversational Agent 150 of the invention may provide a Transit Service 118 so that a user of a smartphone 302 may access transit information in real-time. Information that a user may access via the Conversational Agent 150 includes bus, streetcar and subway routes, nearest transit stops, transit options from point A to point B, next arrival times, and the like.

Example queries 303 that a user may input include "What's the nearest transit stop", "how do I get from downtown to the Roxbury neighborhood", "How do I get to Fenway via transit", "When is the next bus coming", and the like.

The Conversational Agent 150 of the invention may maintain a database of transit information from transit authorities. The database may be updated by the learning/update manager as described herein. In one embodiment the database is populated by a comma-delimited file from each transit authority. The files may be organized according to the General Transit Feed Specification (GTFS).

An example transit interaction is as follows. A user expresses the voice query "What's the nearest station that will take me to Fenway Park". The Conversational Agent receives the query, performs speech-to-text operation and routes the query string 302 to the NLP Engine 114. NLP Engine 114 processes the query 302 and derives a representation of the user intent. In this case, NLP Engine 114 may recognize that the user query 302 relates to the domain TRANSIT, and perhaps subgroup "stops" and subgroup "directions". NLP Engine 114 populates a template object 319 with the derived entities (for example, current location, destination) which may also include the current GPS coordinates of the smartphone 102. Services Manager 130 receives the template object 319 and applies logic to determine the appropriate service to call, in this case Services Manager 130 may call an internal or external Transit Service 118,120. The Transit Service 118,120 may provide a result to the Services Manager 130 which then adds the information extracted from NLP engine 114 and the result to the Topic Board 1830 for presentation on the smartphone 102 by the Ux Manager 13.

Social

According to one embodiment, the Conversational Agent 150 may provide a social networking and social sharing service so that a user of a smartphone 102 may access social media sites, personal relationships, and share information and search results with friends and contacts in real time.

At certain time while interacting with the Conversational Agent 150, a user may choose to share relevant results with a contact by expressing an appropriate query 302, for example, "Share this result with Peter" or may add a result to a social media website by saying something like "Add this to Facebook". (Facebook™ is a trademark of Facebook, Inc.) NLP Engine 114 receives the user query 302 from the Delegate Service 108 and processes the query 302 as described above. NLP Engine 114 derives the intention of the user as relating to social media and creates a representation of the user intent in the form of a template object 319. NLP Engine 114 may identify the user query 302 as being related to the domain SOCIAL, and perhaps a subgroup such as share and contact such as "Peter".

NLP Engine 114 may communicate the template 319 to Services Manager 130 which identifies an appropriate service 118 to accomplish the intention of the user. In an embodiment, Services Manager 130 may interface with one or several external services 118 that may accomplish a variety of social media commands, such as for example, update status on various social media websites, write on own wall or contact's wall, upload pictures including profile pictures, share with contacts via email or instant messaging, make new connections with contacts, tag photos, interact with social media applications such as "Places I've visited", and the like.

Services Manager 130 may employ internal logic to determine which service 118 is appropriate for a given user intent, and calls the service 130 with the appropriate data (including entities). Service 118 provides a result to Services Manager 130 which directs the output to Display Manager 142 which creates a presentation layer for display on the user interlace 105 of smartphone 102.

In an example interaction, a user may receive a call from a person, for example, named "Peter Smith" regarding a potential business relationship. The user finishes the call and hangs up. If the Conversational Agent 150 is not already running, the user may launch the Conversational Agent 150 on the smartphone 102. Once the Conversational Agent 150 is running, the user may simply express a query such as "Add Peter to my LinkedIn account". The Conversational Agent 150 may recognize that the user is referring to the most recent caller; however, if there are already contacts with the name "Peter" in the address book the Conversational Agent 150 may ask a clarification question to the user with or without a list of options.

Continuing with the example, the Conversational Agent 150 may respond to the user "Would you like to add Peter Lee, Peter Hall, or Peter Smith to your LinkedIn account"? A "none of the above" option may also be presented. This response may be presented as an organized list in an example so that the user may simply select the option that applies to their intent. The user may also select the option by voicing an audio input such as "Peter Smith", "Smith", "the last guy" and/or the like.

Once a selection is made, NLP Engine 114 may add information to template 319 such as the name of the contact that the user would like to connect with on LinkedIn. NLP Engine 114 may not have to reprocess the user query 302 to derive an intention of the user if the user's response was an answer to the clarification question.

Figure 44:
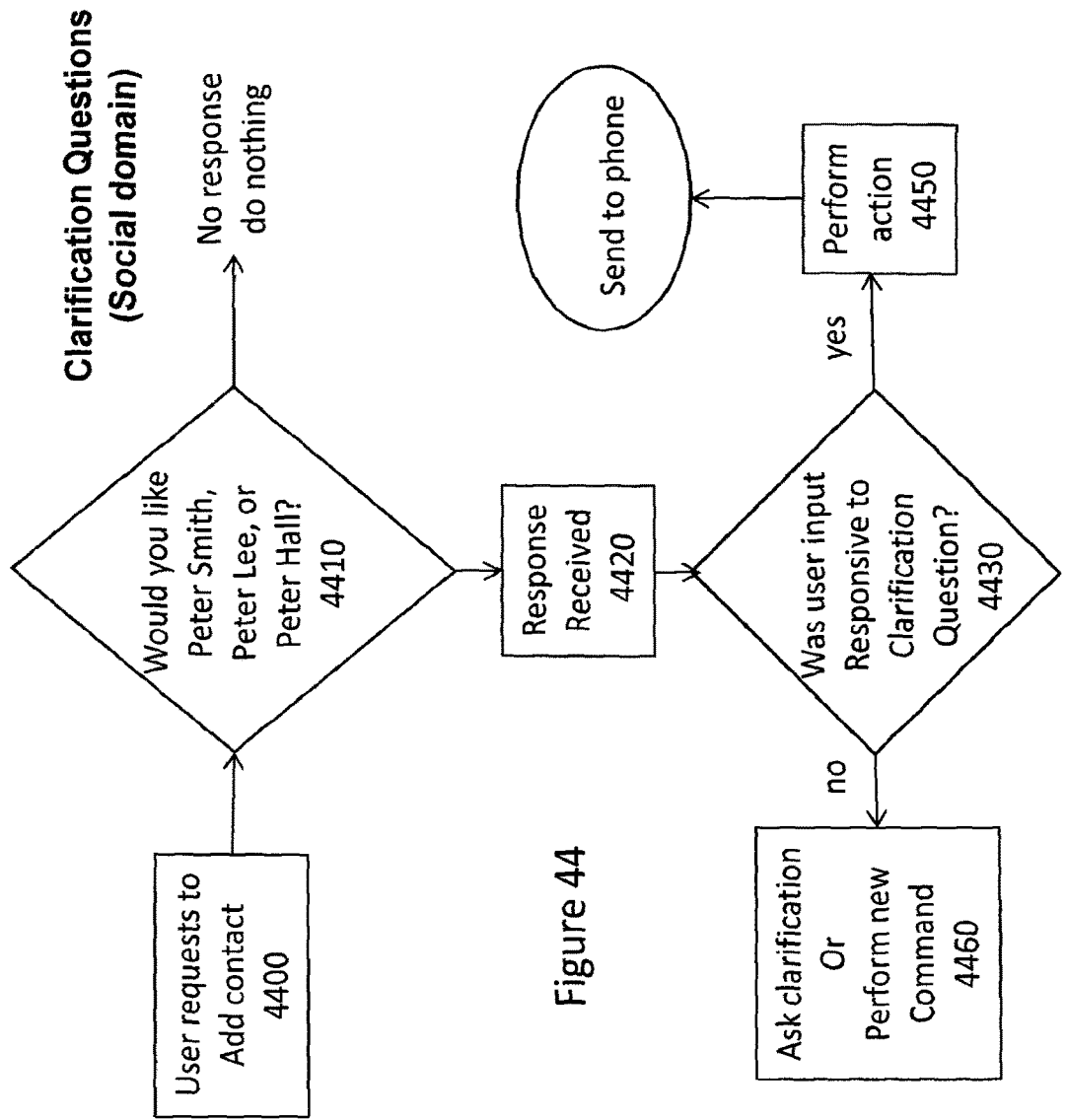
FIG. 44 shows operations (methods) of clarification questions and processing in the social domain according to one embodiment.

Referring to FIG. 44, the processing of clarification questions with respect to an intention of the user related to social media is shown. The general logic of FIG. 44 may also be employed with other domains as well. Referring to step 4410, NLP Engine 114 has identified potential ambiguity in the user query 302. NLP Engine 114 may have identified the user intent as relating to SOCIAL and the subgroup ADD_FRIEND. NLP Engine 114 may also have identified the SOCIAL_SITE as being LinkedIn™ and the CONTACT as having a first name of "Peter". NLP Engine 114 may create a template object 319 with the identified entities and may direct the template object 319 to Services Manager 130 for processing. Services Manager 130 receives template object 319 and determines that a clarification question should be presented to resolve the ambiguity. At step 4410, a clarification question is presented to the user which may include an ordered list of possible responses. At step 4420, the user input is received which may be in the form of a selection from the ordered list and/or a voice input from the user. At step 4430, the Conversational Agent 150 determines whether the user input was responsive to the clarification question posed. If the input from the user was responsive, then NLP Engine (or template service 318) further fills out the template object 319. Several methods may be used to determine if the user input was responsive to the clarification question. For example, the Conversational Agent 150 may look for keywords such as "first", "last", "second last", etc. in the user's response. Such logic would catch a scenario where the user expressed something like "the last option". Continuing the example of adding a new contact to LinkedIn, the Conversational Agent 150 may look for a response that included a person's name such as "Lee", "Hall" or "Smith". It will be appreciate that the logic employed to determine if the user's input was responsive to a clarification question may be unique for each domain. Once the template object has a minimum amount of information required to call a particular service.

In one embodiment, Conversational Agent 150 allows a user of a smartphone 102 to get social media updates by interacting with the Conversational Agent 150. In an example interaction, a user may express a query along the lines of "Give me a Facebook update". NLP Engine 114 may identify the intention of the user as relating to a command that reads the update section of user's profile page. Conversational agent 150 may associate certain queries 302 (or words in a query 302) with a desired command and store this association in a user preferences database. For example, the conversational agent 150 may intelligently determine that the user prefers to get updates for a few "close" friends instead of all contacts on a social media site.

In one embodiment, the user of a smartphone 150 may quickly share results such as webpages, media, photos, and the like to friends by dragging the results obtained by services 118,120 (and displayed on the user interface 105) to a predetermined "share" area of the touchscreen. This feature is described in more detail with respect to FIGS. 34 to 38.

Restaurants

The Conversational Agent 150 of the invention according to one embodiment may provide restaurant functionality so that a user of a smartphone 102 may locate restaurants by location, price, cuisine, atmosphere, handicap accessibility, size of a dinner party, and other search criteria. A user may also book a restaurant using the Conversational Agent 150, which in some cases, necessitates entering financial information such as a credit card number.

In an example interaction, a user may look for a restaurant by expressing a query 302 such as "Find me a Mexican restaurant in Chicago." As described herein, user query 302 is processed by NLP Engine 114 to derive the intention of the user. In this example, NLP Engine 114 may identify that the user query 302 relates to the domain of RESTAURANT, and a subgroup of "find restaurants", the domain and subgroup tags being purely exemplary. NLP Engine 114 may further identify the entities "Mexican" and "Chicago" which are relevant to the derived intention of the user.

NLP Engine 114 may create a template 319 with the relevant information (i.e. domain, subgroup and entities) for processing by services manager 130. Services Manager 130 may have a variety of external services 118 which are available to perform various commands related to restaurants. Services Manager 130 selects an appropriate service 118, perhaps by accessing user preferred restaurant providers, and calls the external restaurant service 118. External service 118 returns a result which is then formatted by Display Manager 142 and rendered to the device 102 screen by Ux Manager 103.

In an embodiment, Conversational Agent 150 is able to book a restaurant by accessing financial payment information associated with a user. Continuing the above example interaction, Conversational Agent 150 provides a list of restaurants servicing Mexican food in Chicago. A list of restaurants that satisfy the user query 302 is presented on the user interface 105 of the smartphone 102. User interface 105 may include an interactive application showing the restaurant results within the application 101 of Conversational Agent 150. Interactive results application within app 101 may allow a variety of user interaction, including for example, linking to a restaurant website, reviewing restaurant rankings, map restaurant, booking a restaurant, etc.

Continuing with the example, say that on the results screen the user clicks (via touchscreen) on a "book" link and/or voices a command with an intention of booking a particular restaurant. Ux Manager 103 receives the input, and in the case of a voice input, may direct the user query 302 to NLP Engine 114. NLP engine 114 then derives the intention of the user as relating to booking a particular restaurant. In the case of clicking on a "book" link, the Ux Manager 103 is already aware that the likely intention of the user is to book a particular restaurant.

Calendar

The Conversational Agent 150 according to one embodiment of the invention may provide a calendar service so that a user of a smartphone 102 may add, find, edit and delete meetings, events, and the like. A user may access their calendar using the Conversational Agent 150 by expressing a relevant query 302 such as "Show me my calendar for today". NLP Engine 114 of Conversational Agent 150 identifies the intention of the user as relating to the CALENDAR domain, and perhaps the subgroup "show calendar", and a identifies a relevant entity such as "today". In this example interaction, NLP Engine 114 communicates a template 319 with the relevant domain, subgroup, and entity information to the Services Manager 130 to accomplish the identified intention of the user.

Services Manager 130 may interface with one or more services 118, 120 to accomplish the user's intention. In this example, Services Manager 130 may identify an internal calendar service 120 as a suitable service, and will call the calendar service 120 according to a predetermined interface. Ux Manager 103 may display the results from calendar service 120 as an interactive application within the application 101 of Conversational Agent 150. Application 101 may allow user interaction commonly found in calendar applications, such as adding, modifying and deleting meetings, viewing holidays, viewing the user's calendar by month, week, year, and other common functions.

In an embodiment, Ux Manager 103 may also present the calendar results with audio output. In the above, example, Ux Manager 103 may read out the calendar events that the user has booked for the day. In one embodiment, the Ux Manager 103 may read out a confirmation message such as "your meeting has been booked for 10 am". If a scheduling conflict occurs Conversational Agent 150 may read a message such as "You are already busy at 10 am, would you like to book the meeting for another time". Conversational Agent 150 may have access to a dialogue database as described herein, and the Dialogue Manager 116 is configured to select an appropriate dialogue to present to the user depending on the state of the command intended by the user. For example, Dialogue Manager 116 may access different dialogue messages that are associated with certain command states such as "pending", "results available", "confirmation that command has been performed", "clarification necessary", "scheduling conflict found", etc.

Figure 40:
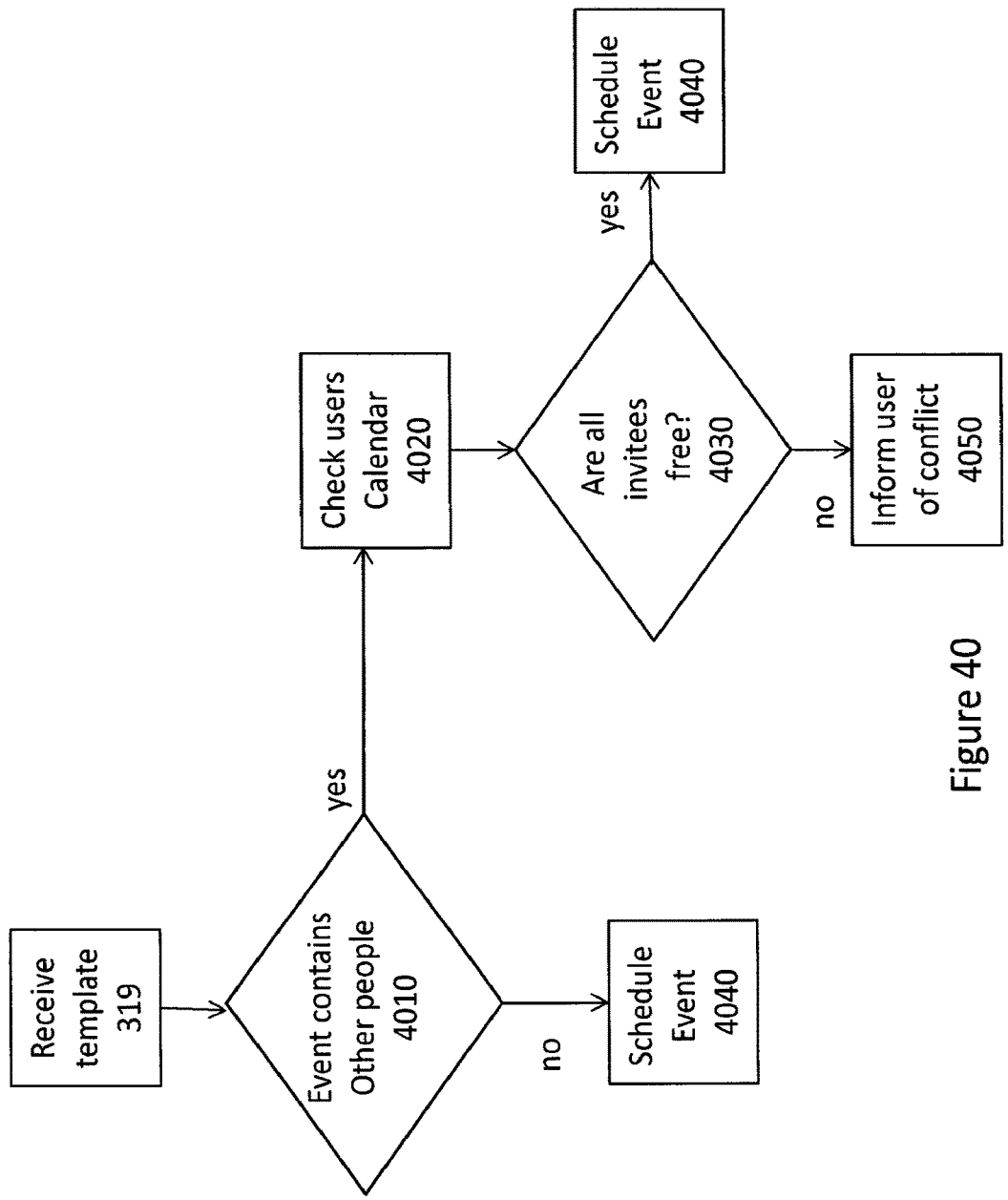
FIG. 40 shows example operations of calendar-related actions according to an example embodiment.

In another example interaction, a user may create a new calendar event using the Conversational Agent 150 by expressing a suitable query such as "Book me a meeting for Friday at 10 am for the Matrix Boardroom, include Peter and James". NLP Engine 114 processes the user query 302 as described herein and identifies the user's intention as relating to the CALENDAR domain, the add meeting subgroup, and possibly identifies the entities of "Friday", "10 am", "Matrix Boardroom" as well as contacts "Peter" and "James". Using Template Tagger 318, NLP Engine 114 creates and populates a template 319 which may be directed to Services Manager 130. Services Manager 130 processes the intended command according to the flowchart shown in FIG. 40. As shown in FIG. 40, at 4010-4030, Services Manager 130 may determine if the event requested by the user to be scheduled conflicts with any of the requested participant's schedule. If the requested event has no other invitees, or all the invitees are free at the requested time then the services manager 130 schedules the event (using internal calendar service 120 or external service 118) and informs the user via the app 101. If, however, one of the requested invitees is not available at the requested time, then at step 4050 the services manager 130 informs the user of the conflict and gives the user an opportunity to pick another time. The user may pick another time, at which point services manager begins processing at step 4010, or the user may keep the original time despite the conflict and services manager 130 may go ahead and book the event as requested.

In one embodiment, the Conversational Agent 150 is configured to add events to a user's calendar automatically (i.e. even if the user does not explicitly ask the Conversational Agent 150 to add an event to his/her calendar). For example, a user may book a flight as described herein by expressing a query 302 related to booking flights. Service manager 130 processes the request, and may determine that the command (i.e. book a flight) has blocked off a period of the user's calendar. Services manager 130 may then add an event corresponding to the flight booking to the calendar with the relevant time of the event. In one embodiment, services manager 130 adds an alarm to remind the user of certain events in advance of the event occurring. In one embodiment, Services manager 130 may keep a list of commands that correspond to calendar events (i.e. commands that are to be added to a user's calendar), as well as predefined alarm settings such as the length of time before an event starting that a user should be reminded about the event. In the flight example, services manager 130 may add the booked flight to the user's calendar as well as an alarm set for the day before, 3 hours before, 1 hour before and 30 minutes before, the scheduled flight. These alarm settings may be predefined and may also be modified by a user for a particular event (i.e. a particular flight), or a for a class of events (i.e. all flights).

E-Commerce

Figure 39:
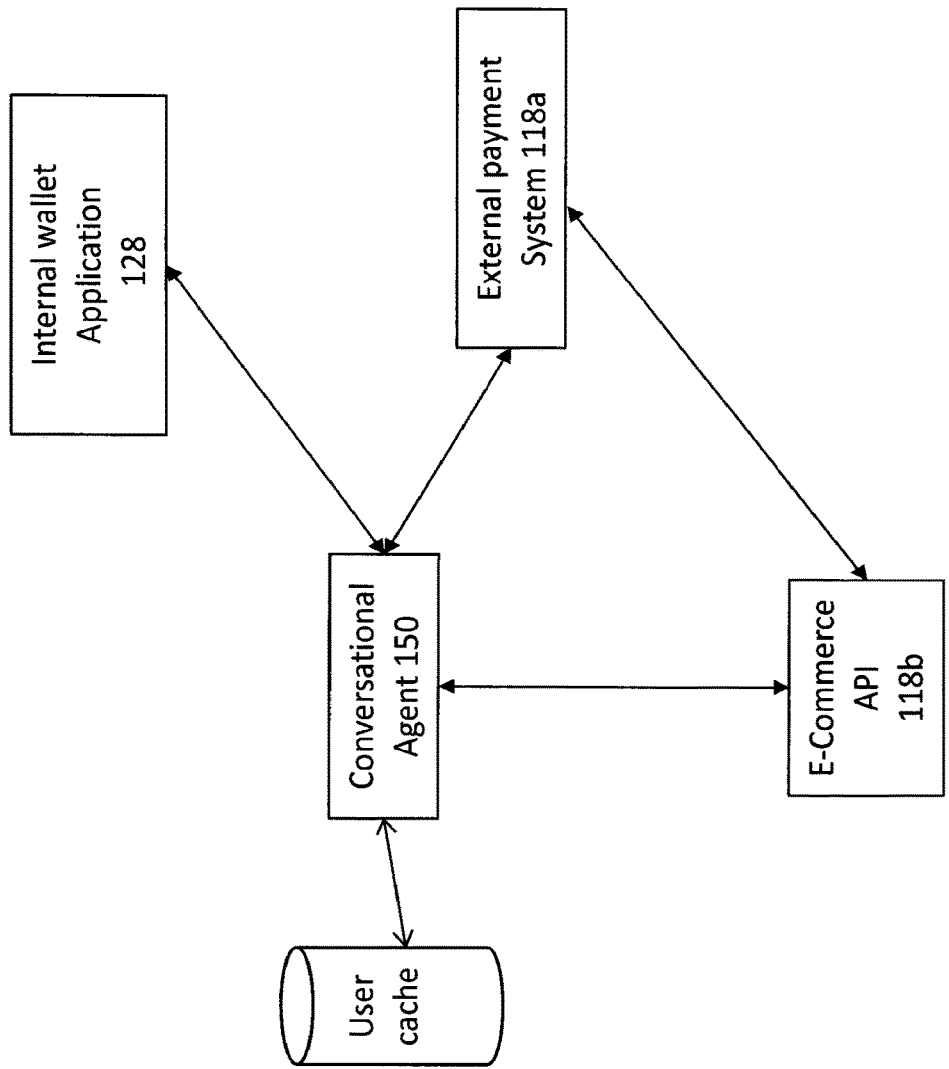
FIG. 39 shows a block diagram of an electronic payment system according to one embodiment.

Reference is made to FIG. 39 to illustrate the e-commerce functionality of the Conversational Agent 150 according to one embodiment. Conversational Agent 150 may interface (via the Services Manager 130) with one or more internal payment systems 128 and/or external payment systems 118a. Access to external payment system 118a may be provided by an application programming interface 118b, and likewise, internal payment wallet 128 may be accessed via an API (not shown). In one embodiment, Services Manager 130 is notified of a user's desire to make an electronic purchase via NLP Engine 114, Ux Manager 103, and/or other components of Conversational Agent 150. Services Manager 130 may maintain a list of payment systems 128,118a that are acceptable to a particular external service 118. When a user accesses an external service 118 (such as a travel-booking service) and expresses (or chooses via touchscreen) an intention to book a flight, Services Manager 130 references the payment systems acceptable to the particular travel-booking service 118 and the payment systems preferred by the user.

If a user has access to a payment system 118b that is acceptable to the external service 118, Services Manager 130 will coordinate the payment via payment system 118b. In another embodiment, if the user does not have access to a payment system required by the external service 118, Conversational Agent may provide an interface and/or instructions so that a user can sign up for the payment system.

In another embodiment, Conversational Agent may interface with one or more internal payment systems (also referred to as "wallet" applications) that are available on smartphone 102. Internal wallet applications 128 may comprise a pre-loaded debit and/or credit card, and/or may interface directly with the user's bank accounts at a financial institutions.

Language Models

Figure 9:
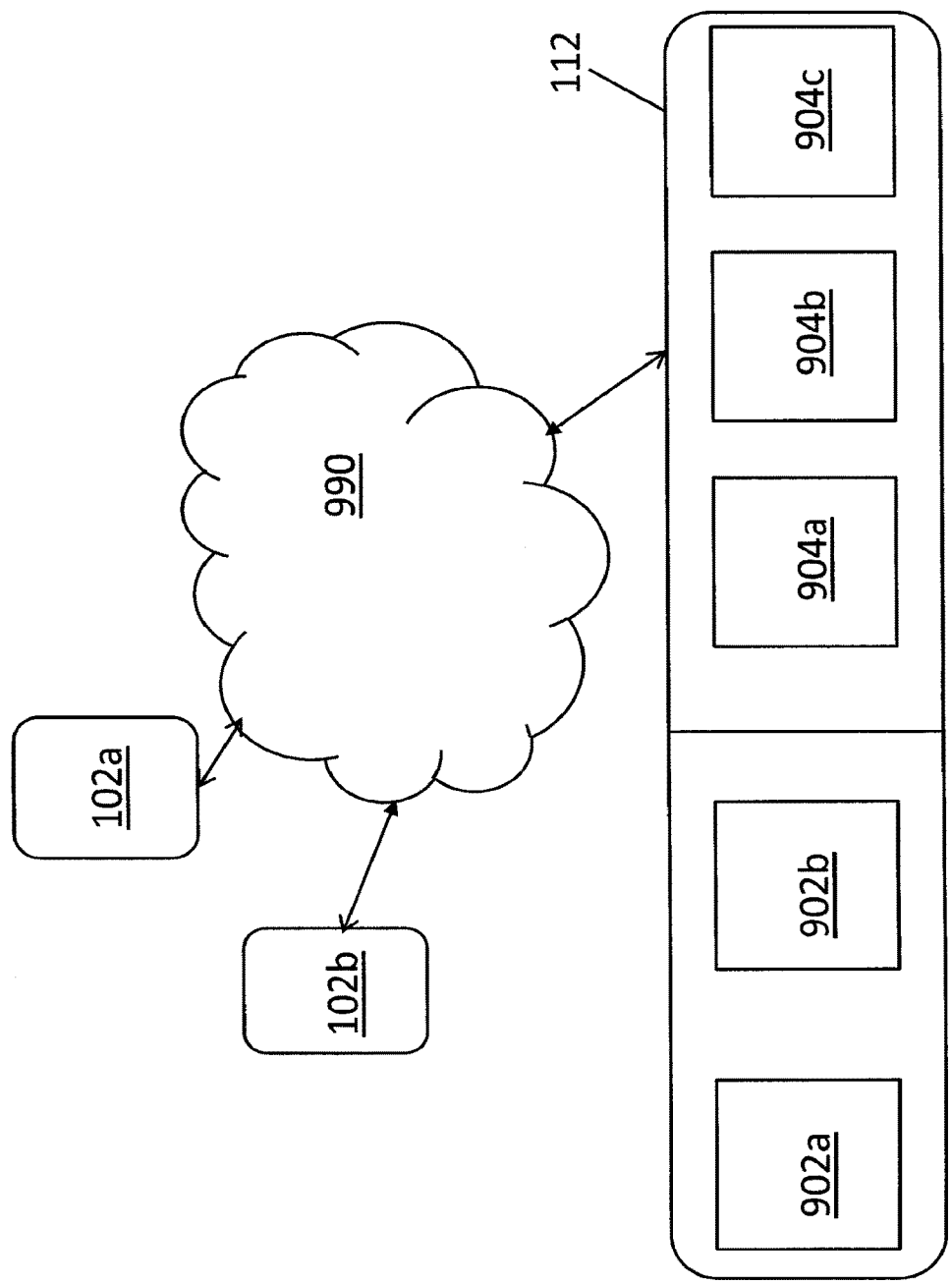
FIG. 9 illustrates a block diagram of a speech recognition service in accordance with one embodiment.

Reference is next made to FIG. 9 to describe an embodiment of the speech service 112 in accordance with one embodiment of the Conversational Agent 150 of the invention. Speech service 112 may be cloud-based so that speech language processing is performed by computing resources in the cloud 900, and therefore offloaded from smartphone 102. Such an architecture allows the offloading of speech processing from smartphones 102a, 102b so smartphone processor resources may be applied to providing other functionality to the users. In one embodiment, smartphones 102a,b include a speech processing engine 112 partly or entirely resident on smartphones 102a,b In one embodiment, speech service 112 may include general language models 904a,b,c and user-specific language models 902a,b. General language models 904a,b,c may be applicable to all users of the Conversational Agent 150 and each language model may correspond to domain-specific language. For example, language model 904a may contain common terms and phrases relating to the TRAVEL domain, language model 904b may contain common terms and phrases related to the RESTAURANT domain, and language model 904C may contain common terms and phrases related to the SOCIAL MEDIA domain. Learning manager 128 (described further below) may add, modify, substitute, delete, etc. language models 904 as appropriate to increase the accuracy of speech service 112 and/or to add new domain functionality to the Conversational Agent 150.

In one embodiment, Conversational Agent 150 maintains user specific language models 902a,b. User specific language models 902a,b may contain user-specific information from smartphones 102a,b, such as but not limited to, address book contacts, aliases, commonly used words and phrases uttered by a particular user, and the like. In one embodiment, App 101 is adapted to periodically upload information from smartphone 102 to cloud-based service infrastructure 104 to create user-specific language model 904. As will be described further, learning manager 128 may be employed to create language models 904 dynamically as they are uploaded to the cloud 990 by App 101.

Learning Manager

The Conversational Agent 150 may include a Learning Manager 128 for updating, training, and/or reinstating any of the modules used by the Conversational Agent 150. Modules that may be modified by the Learning Manager 128 include support vector machines, conditional random fields, naïve Bayesian classifiers, random forest classifiers, neural networks, previous query score classifiers and the like.

Learning Manager 128 may update some or all of the intelligent modules of the invention periodically according to a set schedule and/or when initiated by an administrator. The Conversational Agent 150 may gather feedback from users based on their interaction with the Conversational Agent 150 for training purposes. Examples of how the Conversational Agent 150 uses feedback from user interaction are shown in FIGS. 11-17. For example, the Conversational Agent 150 may determine whether each outputted response was useful to the user. In one embodiment, the Learning Manager 128 of Conversational Agent 150 classifies each response as either "correct", "incorrect" and/or "neutral". Learning manager 128 may also assign a weight to each of the above categories such that a response is determined to be a certain percentage "correct" or "incorrect". In an example interaction, the user may express a query 302 of "Find me some French cuisine in St. Louis". ASR service 112 processes the voice query and provides a text representation of the query 302 to NLP Engine 114. NLP Engine 114 provides a template object 319 to Services Manager 130, the template object including the DOMAIN (in this example, RESTAURANTS) and several entities (St. Louis and "French"). Services Manager 130 determines an appropriate service 118 to perform the derived intention of the user calls that service (external service 118 in this example). External service 118 provides a response to Services Manager 130 which is presented to the user by the Ux Manager 103.

Continuing with the example, say that NLP Engine 114 misinterprets the user query 302, and instead of identifying French restaurants in St. Louis, instead identifies the user intention as relating to "kitchen supplies in St. Louis". A user may react to this incorrect interpretation in a number of ways. A user may say for example "No, actually I would like French restaurants in St. Louis" or "What I really want is restaurants serving French food in St. Louis", etc. The Conversational Agent 150 may be configured to identify certain words, phrases, intonations, etc. in the user's response to a given output to classify the response as "correct", "incorrect" and/or "neutral" and to possible assign a weighing in relation thereto. Continuing with the example, the Conversational Agent 150 may realize with the user's response "No, actually I would like . . . " as feedback that the output from speech service 112 of "kitchen supplies in St. Louis" was incorrect according to the user's intention. Learning manager 128 may store this information in a database for retraining purposes. The database may include for example the user query 302, the output generated by speech service 112, and/or a classification of the "correctness" of the output, as well as perhaps additional information. It will be appreciated that information about the correctness of the Conversational Agent's 150 response may be collected and stored for a significant percentage of responses for each particular user. Therefore, over a period of time, Learning Manager 128 will collect, store, and may use a large corpus of correctness data gathered in real-time for real interaction that may be used to train any or all of the intelligent modules of the invention.

In another example, let's say that NLP Engine 114 determines that the user intention relates to French restaurants in St. Louis, Mich.; however the user was looking for French restaurants in St. Louis, Mo.

The user may respond in any number of ways, for example, by saying "Actually, I'm talking about St. Louis, Mo.". The Learning Manager 128 may determine that NLP Engine 114 incorrectly derived the intention of the user; however, Learning Manager 128 may instead determine that the correction initiated by the user relates to a user preference. Learning Manager 128 may store the user preference in a user preferences database so that Conversational Agent 150 in future interactions will add location specific information to some queries, in particular, to queries relating to locations.

Authentication Manager

The Conversational Agent of the invention 150 may include an Authentication Manager 122 as shown in FIG. 1. Authentication Manager 122 may provide functionality for authenticating users and devices 302 as well as providing backup services when existing users switch over to new devices 302 and/or if their smartphone 102 becomes damaged.

The authentication of users may be accomplished by having a user input one or more of the following: userid, password, keyword, phrases, and the like. Authentication Manager 122 receives the authentication information provided by the user and compares the received input to the authentication information for the particular user in user database. Authentication information received from the user and data in the user database may be encrypted.

In an embodiment, authentication of a user is tied to a particular smartphone 102 so that any user of a particular smartphone 102 may have access to some or all features of the Conversational Agent 150. In one embodiment, authentication of a user may be accomplished entirely or in part by voice recognition. The Conversational Agent may store a representative voice pattern of each user on the smartphone 102 and/or on cloudfront server 106. When a particular user wants to use the Conversational Agent 150, the user is prompted to say a particular name and/or predefined phrase. Conversational Agent 150 receives the phrase expressed by the user from the smartphone 102 microphone(s) and compares the received voice pattern to voice patterns stored in user database. If there is a match between the received voice pattern and user voice patterns stored in user database, Conversational Agent 150 may welcome the user and provide the user with functionality provided via App 101.

In one embodiment, the functionality available to a particular user may be limited depending on the subscription purchased by the user (via carrier for example), the type of smartphone 102, and/or other factors. For example, a user may buy smartphone version 1 which includes access to Conversational Agent 150 with limited functionality. Say for example that the user uses the Conversational Agent 150 for 2 years. In that time, Conversational Agent 150 will intelligently gather and store a variety of information that is used to provide an efficient user experience. Each time that a user accesses Conversational Agent 150, authentication manager 122 may authenticate the user and determine the set of functionality available to the user. Authentication manager 122 may communicate with user experience manager 103 and user experience manager 103 controls the functionality which is available to the user. The user may upgrade to smartphone version 2, at which time, authentication manager 122 changes the user's status to include more functionality and communicates to Ux Manager 103 to make additional functionality available to the user.

In one embodiment, authentication manager 122 may backup device data and user data to cloudfront server 106 or may interface with backup manager 138 which is configured to backup sensitive device data and cloud-based data. Backups may be performed periodically and/or when a user initiates a backup. The backups ensure that a user does not lose information that is used and/or generated by the Conversational Agent 150 should the smartphone 102 become damaged. In an embodiment, authentication manager 122 backups information such as user preferences, address books, calendar, songs/movies/images, files, user defined aliases for contacts and files, and learned information such as speaking style, accents, etc.

When a user switches smartphone 102, authentication manager 122 receives user authentication information (as described above, such as a password, userid, telephone number, inputted voice phrase, etc.) and determines whether the user has access to the Conversational Agent 150, and the status of the user's account. For example, authentication manager 122 may authenticate the user of a new smartphone 102b based on the fact that the new smartphone 102b has the same phone number as the old smartphone 102a. Authentication manager 122 may communicate with Ux Manager 103 to make certain functionality available to the user. Authentication manager 122 may also ask the user via a prompt and/or a voice output whether the user wishes the Conversational Agent 150 to download certain data onto the new smartphone 102b. The data may substantially correspond to the user data that resided on smartphone 102a. In this way, Conversational Agent 150 allows a user to seamlessly switch between smartphones at any time without losing any data that is gathered by and/or used by Conversational Agent 150.

Ux Manager 103

User Experience Manager 103 is for managing the interaction layer of the Conversational Agent 150, for example, by providing a user interface 105 on the display of the smartphone 102 via App 101. User Experience Manager 103 may provide a multi-modal input/output environment so that the Conversational Agent 150 may communicate and provide output to a user with one or more output modes, for example, by sound, video, images, text, vibration and the like. Likewise, the user may interact with the Conversational Agent 150 by providing input in one or more supported modes.

User Experience Manager 103 provides a user interface 105 for visually (as well as perhaps using other modes) presenting responses to queries 302, including for example, formatted output from services 118, 120, and clarification questions.

Example user interfaces 105 are illustrated in FIGS. 34 to 38. FIG. 34 shows a user interface 105 on smartphone 102. The user interface 105 shows an example dialogue interaction between a user and the App 101 of Conversational Agent 150. Dialogue bubble 3420 shows the user query 302 expressed by the user, for example, "show me some Mexican restaurants in Portland". Dialogue bubble 3422 shows a response generated by Dialogue Manager 116, for example, "Okay, give me a moment to find what you asked for . . . "

Result window 3410 shows the results of the Conversational Agent's (150) search, the results having been found by Services Manager 130 interfacing with an external service 120 in an embodiment.

Buttons 3402, 3404, 3406 and 3408 in the example user interface 105 may provide quick access to common features of the Conversational Agent 150. For example, button 3402 may provide "Bookmark" functionality, button 3404 may provide "Share" functionality (i.e. social media), button 3406 may provide "Email/sms/phone" functionality, and button 3408 may provide "Map" functionality. The number of buttons and the assigned functionality may be changed by a user and/or dynamically changed by the Conversational Agent 150 depending on several factors, such as, the capabilities of the smartphone 102, the domain to which the user query 302 relates, etc.

A user may access the functionality of buttons 3402,3404, 3406,3408 by dragging an entry from the result screen to the button desired and/or by pressing the area of touchscreen corresponding with buttons 3402,3404,3406,3408. Example arrow 3510 illustrates the general interaction. For example, a user may desire to Email and/or SMS a particular restaurant to a friend. A may drag the entry to button 3406 which may launch another screen (or a window that appears from the side of the display) that asks the user to confirm the desire to email and/or sms a restaurant listing to a contact.

Figure 38:
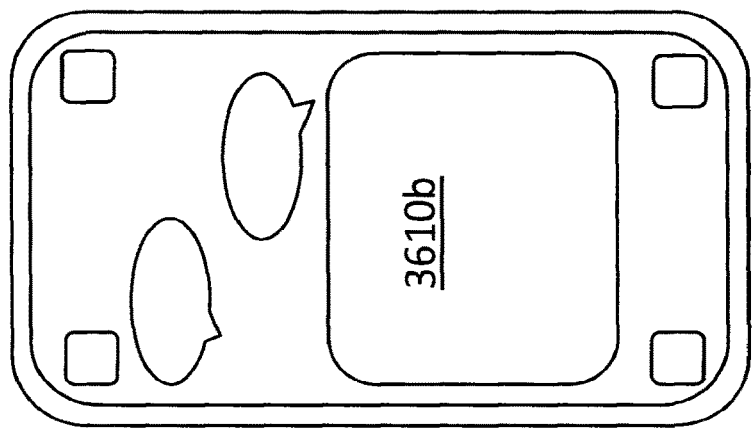
Figure 37:
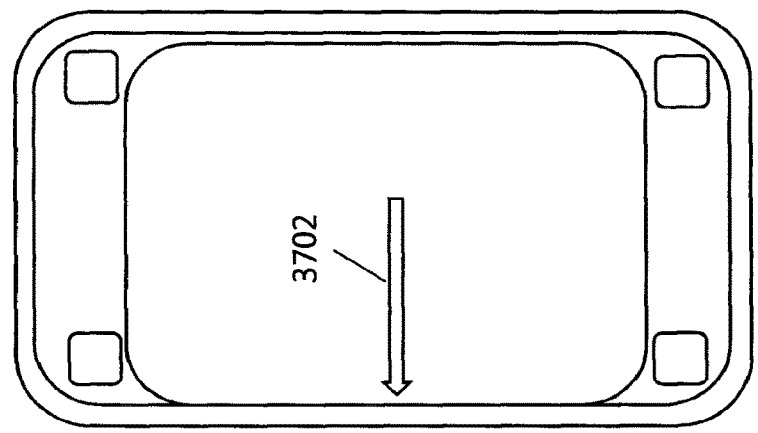
Figure 36:
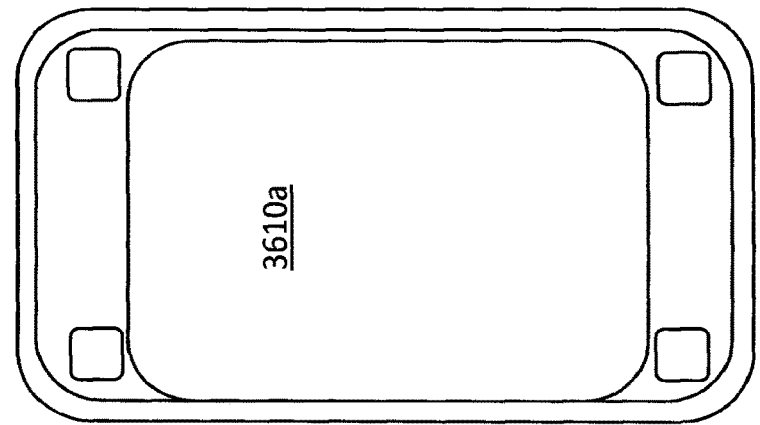

FIGS. 36 and 37 illustrate another exemplary user interface 105 that may be implemented by the Conversational Agent 150 according to one embodiment. Results screen 3610a may contain a listing of results from a user query, such as is shown in FIG. 34. Results screen 3610a may be an interactive application within application 101. For example, results screen 3610a may provide functionality such as mapping locations, checking ratings of services, linking to home pages of services, and the like. A user may close results screen 3610a by dragging results screen 3610a towards the side of the display as is shown generally by arrow 3702 in one example. In an embodiment, results screen may then be transferred to a smaller window as is shown by results list 3610b as is shown in FIG. 38.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computing device comprising one or more processors and one or more non-transitory storage devices storing instructions that, when executed by the one or more processors, configure the computing device to:
   receive at least one user query from an input device, wherein the at least one user query includes a user intent and at least one command, the at least one user intent being associated with a set of functions to be carried out by the computing device;
   derive, using a natural language processing (NLP) engine, the user intent from the user query;
   identify, using the NLP engine, at least one domain and the at least one command associated with the derived user intent, wherein the NLP engine performs entity extraction on the at least one user query to identify at least one entity associated with the at least one command, wherein the at least one command is associated with the domain;
   execute the at least one command associated with the user intent, wherein the at least one command is configured to direct the computing device to carry out at least one function selected from the set of functions; and
   generate output of at least one result of the executed at least one command from at least one component of the computing device.

2. The computing device of claim 1, wherein the NLP engine selects at least one conditional random field (CRF) in response to the at least one domain.

3. The computing device of claim 2, wherein the instructions further configure the computing device to:
   store at least one optimized feature set associated with the at least one domain, the at least one CRF configured to access the at least one feature set.

4. The method of claim 2, further comprising:
   identifying at least one unfilled entity relating to the at least one command; and
   generating at least one dialogue response comprising a prompt to obtain the at least one unfilled entity.

5. The computing device of claim 1, wherein the instructions further configure the computing device to:
   assign one of the priority levels to one or more commands when the received at least one user query indicates more than one user intent for simultaneous multiple conversations, wherein each of the more than one user intents constitutes one conversation;
   execute the one or more commands according to the assigned one of the priority levels;
   assign a pending status to the one or more commands until completed; and
   generate output indicating a pending status when the received at least one query is associated with the one or more commands with the pending status.

6. The computing device of claim 1, wherein the at least one command and at least one entity are provided to a services component for identifying at least one service capable of performing the at least one command, and for instructing the at least one service to perform the at least one command, the at least one service configured to return a service result to the services component in response to performing the at least one command.

7. The computing device of claim 1, wherein the instructions further configure the computing device to:
   identify at least one dialogue response to the at least one query.

8. The computing device of claim 7, wherein the instructions further configure the computing device to:
   format an output, the output comprising the at least one dialogue response.

9. The computing device of claim 8, wherein the at least one dialogue response is formatted in a conversational manner.

10. The computing device of claim 7, wherein the NLP engine is configured to create a list of candidate interpretations of the at least one user query, and wherein the at least one dialogue response is presented in the list for selection.

11. The computing device of claim 7, wherein the instructions further configure the computing device to:
   identify at least one unfilled entity relating to the at least one command; and
   generate at least one dialogue response comprising a prompt to obtain the at least one unfilled entity.

12. A method of processing a user query performed by a computing device, the method comprising:
  receiving at least one user query from an input device, wherein the at least one user query includes a user intent and at least one command, the at least one user intent being associated with a set of functions to be carried out by the computing device;
  deriving, using a natural language processing (NLP) engine, the a user intent from the user query;
  identifying, using the NLP engine, at least one domain and the at least one command associated with the derived user intent, wherein the NLP engine performs entity extraction on the at least one user query to identify at least one entity associated with the at least one command and wherein the command is for performing by a service associated with the domain;
  execute the at least one command associated with the user intent, wherein the at least one command is configured to direct the computing device to carry out a function selected from the set of functions; and
  generate output of at least one result of the executed at least one command from at least one component of the computing device.

13. The method of claim 12, wherein performing the NLP engine comprises selecting at least one conditional random field (CRF) in response to the at least one domain identified.

14. The method of claim 13, further comprising storing at least one optimized feature set associated with the at least one identified domain, and wherein the at least one CRF is configured to access the at least one feature set.

15. The method of claim 13, further comprising:
  identifying at least one dialogue response to the at least one query.

16. The method of claim 15, further comprising:
  formatting an output, wherein the output comprises the at least one dialogue response.

17. The method of claim 15, further comprising:
  defining the at least one dialogue response in a conversational manner.

18. The method of claim 12, further comprising:
  identifying at least one service capable of performing the at least one command; and
  instructing the at least one service to perform the at least one command, the at least one service configured to return a service result to the services component in response to performing the at least one command.

19. A computer storage device storing computer-executable instructions that when executed by a processor cause the processor to:
  receive at least one user query from an input device, wherein the at least one user query includes a user intent and at least one command, the at least one user intent being associated with a set of functions to be carried out by the computing device;
  derive, using a natural language processing (NLP) engine, the user intent from the user query;
  identify, using the NLP engine, at least one domain and the at least one command associated with the derived user intent, wherein the NLP engine performs entity extraction on the at least one user query to identify at least one entity associated with the at least one command, wherein the at least one command is associated with the domain;
  execute the at least one command associated with the user intent, wherein the at least one command is configured to direct the computing device to carry out at least one function selected from the set of functions; and
  generate output of at least one result of the executed at least one command from at least one component of the computing device.

20. The A computer storage device of claim 19, the computer-executable instructions further causing the processor to:
  identify at least one dialogue response to the at least one query.

* * * * *